US012237471B2

(12) United States Patent
Honda et al.

(10) Patent No.: US 12,237,471 B2
(45) Date of Patent: Feb. 25, 2025

(54) NON-AQUEOUS ELECTROLYTE AND NON-AQUEOUS ELECTROLYTE BATTERY

(71) Applicants: Mitsubishi Chemical Corporation, Tokyo (JP); MU IONIC SOLUTIONS CORPORATION, Tokyo (JP)

(72) Inventors: Tatsuhiko Honda, Tokyo (JP); Hiroyuki Tokuda, Tokyo (JP); Daisuke Kawakami, Tokyo (JP); Ryo Yamaguchi, Tokyo (JP)

(73) Assignees: Mitsubishi Chemical Corporation, Tokyo (JP); MU IONIC SOLUTIONS CORPORATION, Tokyo (JP)

( * ) Notice: Subject to any disclaimer, the term of this patent is extended or adjusted under 35 U.S.C. 154(b) by 568 days.

(21) Appl. No.: 17/457,102

(22) Filed: Dec. 1, 2021

(65) Prior Publication Data

US 2022/0093973 A1 Mar. 24, 2022

Related U.S. Application Data

(63) Continuation of application No. PCT/JP2020/022088, filed on Jun. 4, 2020.

(30) Foreign Application Priority Data

| | | |
|---|---|---|
| Jun. 4, 2019 | (JP) | 2019-104306 |
| Jun. 26, 2019 | (JP) | 2019-118074 |
| Jun. 26, 2019 | (JP) | 2019-118145 |
| Jun. 26, 2019 | (JP) | 2019-118148 |
| Apr. 15, 2020 | (JP) | 2020-073075 |

(51) Int. Cl.

| | |
|---|---|
| ***H01M 10/0569*** | (2010.01) |
| ***H01G 11/46*** | (2013.01) |
| ***H01G 11/58*** | (2013.01) |
| ***H01G 11/64*** | (2013.01) |
| ***H01M 4/505*** | (2010.01) |
| ***H01M 4/525*** | (2010.01) |
| ***H01M 10/052*** | (2010.01) |
| ***H01M 10/0525*** | (2010.01) |
| ***H01M 10/0563*** | (2010.01) |
| ***H01M 10/0567*** | (2010.01) |
| ***H01M 10/0568*** | (2010.01) |

(52) U.S. Cl.

CPC ........ *H01M 10/0569* (2013.01); *H01G 11/46* (2013.01); *H01G 11/58* (2013.01); *H01G 11/64* (2013.01); *H01M 4/505* (2013.01); *H01M 4/525* (2013.01); *H01M 10/052* (2013.01); *H01M 10/0525* (2013.01); *H01M 10/0563* (2013.01); *H01M 10/0567* (2013.01); *H01M 10/0568* (2013.01); *H01M 2300/0025* (2013.01)

(58) Field of Classification Search
None
See application file for complete search history.

(56) References Cited

U.S. PATENT DOCUMENTS

| | | | | |
|---|---|---|---|---|
| 2007/0082269 | A1* | 4/2007 | Akita ................ | H01M 10/0567 429/231.95 |
| 2008/0057396 | A1* | 3/2008 | Fujihara .................. | H01M 4/60 429/231.95 |
| 2010/0099031 | A1 | 4/2010 | Kato et al. | |
| 2012/0308881 | A1 | 12/2012 | Tokuda et al. | |
| 2015/0125761 | A1 | 5/2015 | Shimamoto et al. | |
| 2018/0241084 | A1* | 8/2018 | Miyasato ............ | H01M 10/052 |
| 2020/0176807 | A1 | 6/2020 | Nishio et al. | |

FOREIGN PATENT DOCUMENTS

| | | | |
|---|---|---|---|
| JP | 2003-346900 | A | 12/2003 |
| JP | 2008-269978 | A | 11/2008 |
| JP | 2010073354 | A * | 4/2010 |
| JP | 2013-239426 | A | 11/2013 |
| JP | 2014-127313 | A | 7/2014 |
| JP | 2015-37012 | A | 2/2015 |
| JP | 2019-40721 | A | 3/2019 |
| WO | WO 2011/099585 | A1 | 8/2011 |
| WO | WO 2013/168821 | A1 | 11/2013 |
| WO | WO 2019/031508 | A1 | 2/2019 |
| WO | WO 2019/093159 | A1 | 5/2019 |

OTHER PUBLICATIONS

Machine English translation of JP2010073354A originally published to Yoshimura Apr. 2, 2010 (Year: 2010).*
Indonesian Office Action issued on Mar. 24, 2023 in Indonesian Patent Application No. P00202112365 (with unedited computer-generated English translation), 6 pages.
International Search Report issued Sep. 1, 2020 in PCT/JP2020/022088 filed Jun. 4, 2020, 2 pages.
English translation of International Preliminary Report on Patentability and Written Opinion issued Dec. 7, 2021 in PCT/JP2020/022088, 4 pages.
First Examination Report issued Jun. 6, 2022, in Indian Patent Application No. 202147060873 (with English translation), 5 pages.
Extended European Search Report issued Jun. 22, 2022, in European Patent Application No. 20818861.5, 6 pages.

* cited by examiner

*Primary Examiner* — Ula C Ruddock
*Assistant Examiner* — Mary Grace Byram
(74) *Attorney, Agent, or Firm* — Oblon, McClelland, Maier & Neustadt, L.L.P.

(57) ABSTRACT

Provided are: a non-aqueous electrolyte solution that can improve the charged storage characteristics of a non-aqueous electrolyte battery under a high-temperature environment while containing $FSO_3Li$; and a non-aqueous electrolyte battery having excellent charged storage characteristics under a high-temperature environment. The non-aqueous electrolyte solution contains $FSO_3Li$ and a specific amount of ions of a specific metal element.

12 Claims, No Drawings

NON-AQUEOUS ELECTROLYTE AND NON-AQUEOUS ELECTROLYTE BATTERY

CROSS-REFERENCE TO RELATED APPLICATION

This is a continuation of International Application PCT/JP2020/022088, filed on Jun. 4, 2020, and designated the U.S., (and claims priority from Japanese Patent Application 2019-104306 which was filed on Jun. 4, 2019, Japanese Patent Application 2019-118074 which was filed on Jun. 26, 2019, Japanese Patent Application 2019-118148 which was filed on Jun. 26, 2019, Japanese Patent Application 2019-118145 which was filed on Jun. 26, 2019 and Japanese Patent Application 2020-073075 which was filed on Apr. 15, 2020) the entire contents of which are incorporated herein by reference.

TECHNICAL FIELD

The present invention relates to a non-aqueous electrolyte solution and a non-aqueous electrolyte battery. More particularly, the present invention relates to: a non-aqueous electrolyte solution that contains a specific compound and a specific amount of ions of a specific metal element; and a non-aqueous electrolyte battery including the non-aqueous electrolyte solution.

BACKGROUND ART

In recent years, non-aqueous electrolyte batteries such as lithium secondary batteries have been practically used in the applications such as vehicle-mounted power sources for driving electric vehicles and the like.

As means for improving the properties of a non-aqueous electrolyte battery, numerous studies have been conducted in the fields of the active materials of positive and negative electrodes as well as the additives of non-aqueous electrolyte solutions.

For example, Patent Document 1 discloses: a non-aqueous electrolyte solution containing at least one fluorosulfonate represented by $M(FSO_3)_x$ for the purpose of improving the initial charging capacity and the input-output characteristics of a non-aqueous electrolyte secondary battery, wherein $LiPF_6$ is further added and a ratio of the fluorosulfonate and $LiPF_6$ is controlled to be in a specific range; and a non-aqueous electrolyte secondary battery.

Patent Document 2 aims at providing a non-aqueous electrolyte solution that can improve the electrochemical characteristics over a wide temperature range, and a power storage device using the same, and discloses: a non-aqueous electrolyte solution in which an electrolyte salt is dissolved in a non-aqueous solvent, the non-aqueous electrolyte solution being characterized by containing 0.001 to 5% by mass of a specific acyclic lithium salt; and a power storage device using the same.

Patent Document 3 aims at providing a non-aqueous electrolyte secondary battery capable of exhibiting a higher battery performance, in which a stable coating film is formed on the surface of a negative electrode active material (graphite material), and discloses a non-aqueous electrolyte secondary battery that includes: an electrode body containing a positive electrode and a negative electrode; and a non-aqueous electrolyte solution. This non-aqueous electrolyte secondary battery is characterized in that the negative electrode is provided with a negative electrode active material layer mainly composed of a graphite material, the amount of acidic functional groups in the graphite material is 1 μeq/$m^2$ or more, and a coating film containing sulfur (S) atoms and charge carriers is formed on the surface of the graphite material.

Patent Document 4 aims at providing a lithium ion secondary battery having excellent durability, and discloses a lithium ion secondary battery including: a positive electrode containing a positive electrode active material; a negative electrode containing a negative electrode active material; and a non-aqueous electrolyte, wherein tungsten exists on the surface of the positive electrode active material, and lithium fluorosulfonate is added to the non-aqueous electrolyte. In this document, it is described that the above-described constitution enables to provide a lithium ion battery having excellent durability, which can maintain a low reaction resistance over a prolonged period without elution of a metal element adhering to the surface of a positive electrode into a non-aqueous electrolyte even when the battery is used for an extended period.

RELATED ART DOCUMENTS

Patent Documents

[Patent Document 1] WO 2011/099585
[Patent Document 2] WO 2013/168821
[Patent Document 3] Japanese Laid-open Patent Application (Kokai) No. 2014-127313
[Patent Document 4] Japanese Laid-open Patent Application (Kokai) No. 2015-037012

SUMMARY OF THE INVENTION

Problems to be Solved by the Invention

The durability of a non-aqueous electrolyte battery tends to be improved by adding lithium fluorosulfonate ($FSO_3Li$) to its non-aqueous electrolyte solution. On the other hand, according to the studies conducted by the present inventors, it was revealed that a battery containing an $FSO_3Li$-containing non-aqueous electrolyte solution has insufficient charged storage characteristics under a high-temperature environment. Therefore, the present invention provides: a non-aqueous electrolyte solution that can improve the charged storage characteristics of a non-aqueous electrolyte battery under a high-temperature environment while containing $FSO_3Li$; and a non-aqueous electrolyte battery having excellent charged storage characteristics under a high-temperature environment.

Means for Solving the Problems

The present inventors intensively studied to solve the above-described problems and consequently discovered that the charged storage characteristics of a non-aqueous electrolyte battery under a high-temperature environment can be improved by further incorporating at least one metal ion selected from the group consisting of (a) nickel ions, (b) cobalt ions, (c) copper ions, (d) manganese ions, and (e) aluminum ions into an $FSO_3Li$-containing non-aqueous electrolyte solution and controlling the content of one of the metal ions (a) to (e) to be in a specific range, thereby arriving at the present invention.

That is, the present invention provides, for example, the following specific modes of [1] to [9].

[1] A non-aqueous electrolyte solution:

(1a) containing $FSO_3Li$;

(1b) containing at least one metal ion selected from the group consisting of (a) nickel ions, (b) cobalt ions, (c) copper ions, (d) manganese ions, and (e) aluminum ions; and (1c) satisfying at least one of the following conditions (i) to (v):

(i) the concentration of the (a) is 1 ppm by mass to 500 ppm by mass, (ii) the concentration of the (b) is 1 ppm by mass to 500 ppm by mass, (iii) the concentration of the (c) is 1 ppm by mass to 500 ppm by mass, (iv) the concentration of the (d) is 1 ppm by mass to 100 ppm by mass, and (v) the concentration of the (e) is 1 ppm by mass to 100 ppm by mass.

[2] The non-aqueous electrolyte solution according to [1], containing at least the (a) nickel ions.

[3] The non-aqueous electrolyte solution according to [2], containing the nickel ions in an amount of 40% by mass or more with respect to a total amount of the metal ions (a) to (e).

[4] The non-aqueous electrolyte solution according to [3], wherein a total concentration of the (a) to (e) is 1 ppm by mass to 120 ppm by mass.

[5] The non-aqueous electrolyte solution according to any one of [1] to [4], wherein the content of $FSO_3Li$ is 0.001% by mass to 10.0% by mass.

[6] A non-aqueous electrolyte battery, including:

a positive electrode and a negative electrode which are capable of occluding and releasing metal ions; and a non-aqueous electrolyte solution, wherein the non-aqueous electrolyte solution:

(1a) contains $FSO_3Li$;

(1b) contains at least one metal ion selected from the group consisting of (a) nickel ions, (b) cobalt ions, (c) copper ions, (d) manganese ions, and (e) aluminum ions; and (1c) satisfies at least one of the following conditions (i) to (v):

(i) the concentration of the (a) is 1 ppm by mass to 500 ppm by mass, (ii) the concentration of the (b) is 1 ppm by mass to 500 ppm by mass, (iii) the concentration of the (c) is 1 ppm by mass to 500 ppm by mass, (iv) the concentration of the (d) is 1 ppm by mass to 100 ppm by mass, and (v) the concentration of the (e) is 1 ppm by mass to 100 ppm by mass.

[7] The non-aqueous electrolyte battery according to [6], wherein the positive electrode includes a current collector and a positive electrode active material layer arranged on the current collector, and the positive electrode active material is a metal oxide represented by the following composition formula (1):

$$Li_{a1}Ni_{b1}Co_{c1}Md_{d1}O_2 \quad (1)$$

wherein, a1, b1, c1, and d1 satisfy $0.90 \le a1 \le 1.10$, $0<b1<0.4$, and $b1+c1+d1=1$; and M represents at least one element selected from the group consisting of Mn, Al, Mg, Zr, Fe, Ti, and Er.

[8] The non-aqueous electrolyte battery according to [6], wherein the positive electrode includes a current collector and a positive electrode active material layer arranged on the current collector, and the positive electrode active material is a metal oxide represented by the following composition formula (2):

$$Li_{a2}Ni_{b2}Co_{c2}M_{d2}O_2 \quad (2)$$

wherein, a2, b2, c2, and d2 satisfy $0.90 \le a2 \le 1.10$, $0.4 \le b2 < 1.0$, and $b2+c2+d2=1$; and M represents at least one element selected from the group consisting of Mn, Al, Mg, Zr, Fe, Ti, and Er.

[9] The non-aqueous electrolyte battery according to any one of [6] to [8], wherein the positive electrode is an NMC positive electrode, and the NMC positive electrode contains a nickel element in an amount of not less than 40% by mole.

The present inventors intensively studied to solve the above-described problems and consequently discovered that the charged storage characteristics of a non-aqueous electrolyte battery under a high-temperature environment can be improved by using an $FSO_3Li$-containing non-aqueous electrolyte solution which further contains nickel ions and in which the content of the nickel ions is in a specific range, thereby arriving at a mode A of the present invention.

That is, the mode A of the present invention provides, for example, the following specific modes of [A1] to [A8].

[A1] A non-aqueous electrolyte solution, containing $FSO_3Li$ and 1 ppm by mass to 500 ppm by mass of nickel ions.

[A2] The non-aqueous electrolyte solution according to [A1], wherein the content of $FSO_3Li$ is 0.001% by mass to 10.0% by mass.

[A3] A non-aqueous electrolyte battery, including:

a positive electrode and a negative electrode which are capable of occluding and releasing metal ions; and a non-aqueous electrolyte solution, wherein the non-aqueous electrolyte solution contains $FSO_3Li$ and 1 ppm by mass to 500 ppm by mass of nickel ions.

[A4] The non-aqueous electrolyte battery according to [A3], wherein the positive electrode includes a current collector and a positive electrode active material layer arranged on the current collector, and the positive electrode active material is a metal oxide represented by the following composition formula (1):

$$Li_{a1}Ni_{b1}Co_{c1}M_{d1}O_2 \quad (1)$$

wherein, a1, b1, c1, and d1 satisfy $0.90 \le a1 \le 1.10$, $0<b1<0.4$, and $b1+c1+d1=1$; and M represents at least one element selected from the group consisting of Mn, Al, Mg, Zr, Fe, Ti, and Er.

[A5] The non-aqueous electrolyte battery according to [A3], wherein the positive electrode includes a current collector and a positive electrode active material layer arranged on the current collector, and the positive electrode active material is a metal oxide represented by the following composition formula (2):

$$Li_{a2}Ni_{b2}Co_{c2}M_{d2}O_2 \quad (2)$$

wherein, a2, b2, c2, and d2 satisfy $0.90 \le a2 \le 1.10$, $0.4 \le b2 < 1.0$, and $b2+c2+d2=1$; and M represents at least one element selected from the group consisting of Mn, Al, Mg, Zr, Fe, Ti, and Er.

[A6] The non-aqueous electrolyte battery according to any one of [A3] to [A5], wherein the positive electrode is an NMC positive electrode, and the NMC positive electrode contains a nickel element in an amount of not less than 30% by mole.

[A7] The non-aqueous electrolyte battery according to [A3], [A5] or [A6], wherein the positive electrode is an NMC positive electrode, and the NMC positive electrode contains the nickel element in an amount of not less than 40% by mole.

[A8] The non-aqueous electrolyte battery according to any one of [A3] to [A7], wherein the content of $FSO_3Li$ in the non-aqueous electrolyte solution is 0.001% by mass to 10.0% by mass.

The present inventors intensively studied to solve the above-described problems and consequently discovered that the charged storage characteristics of a non-aqueous electrolyte battery under a high-temperature environment can be improved by using an $FSO_3Li$-containing non-aqueous electrolyte solution which further contains cobalt ions and in which the content of the cobalt ions is in a specific range, thereby arriving at a mode B of the present invention.

That is, the mode B of the present invention provides, for example, the following specific modes of [B1] to [B8].

[B1] A non-aqueous electrolyte solution, containing $FSO_3Li$ and 1 ppm by mass to 500 ppm by mass of cobalt ions.

[B2] The non-aqueous electrolyte solution according to [B1], wherein the content of $FSO_3Li$ is 0.001% by mass to 10.0% by mass.

[B3] A non-aqueous electrolyte battery, including:

a positive electrode and a negative electrode which are capable of occluding and releasing metal ions; and a non-aqueous electrolyte solution, wherein the non-aqueous electrolyte solution contains $FSO_3Li$ and 1 ppm by mass to 500 ppm by mass of cobalt ions.

[B4] The non-aqueous electrolyte battery according to [B3], wherein the positive electrode includes a current collector and a positive electrode active material layer arranged on the current collector, and the positive electrode active material is a metal oxide represented by the following composition formula (1):

$$Li_{a1}Ni_{b1}Co_{c1}M_{d1}O_2 \quad (1)$$

wherein, a1, b1, c1, and d1 satisfy $0.90 \leq a1 \leq 1.10$, $0<b1<0.4$, and $b1+c1+d1=1$; and M represents at least one element selected from the group consisting of Mn, Al, Mg, Zr, Fe, Ti, and Er.

[B5] The non-aqueous electrolyte battery according to [B3], wherein the positive electrode includes a current collector and a positive electrode active material layer arranged on the current collector, and the positive electrode active material is a metal oxide represented by the following composition formula (2):

$$Li_{a2}Ni_{b2}Co_{c2}M_{d2}O_2 \quad (2)$$

wherein, a2, b2, c2, and d2 satisfy $0.90 \leq a2 \leq 1.10$, $0.4 \leq b2 < 1.0$, and $b2+c2+d2=1$; and M represents at least one element selected from the group consisting of Mn, Al, Mg, Zr, Fe, Ti, and Er.

[B6] The non-aqueous electrolyte battery according to any one of [B3] to [B5], wherein the positive electrode is an NMC positive electrode, and the NMC positive electrode contains a nickel element in an amount of not less than 30% by mole.

[B7] The non-aqueous electrolyte battery according to [B3], [B5] or [B6], wherein the positive electrode is an NMC positive electrode, and the NMC positive electrode contains a nickel element in an amount of not less than 40% by mole.

[B8] The non-aqueous electrolyte battery according to any one of [B3] to [B7], wherein the content of $FSO_3Li$ in the non-aqueous electrolyte solution is 0.001% by mass to 10.0% by mass.

The present inventors intensively studied to solve the above-described problems and consequently discovered that the charged storage characteristics of a non-aqueous electrolyte battery under a high-temperature environment can be improved by using an $FSO_3Li$-containing non-aqueous electrolyte solution which further contains copper ions and in which the content of the copper ions is in a specific range, thereby arriving at a mode C of the present invention.

That is, the mode C of the present invention provides, for example, the following specific modes of [C1] to [C8].

[C1] A non-aqueous electrolyte solution, containing $FSO_3Li$ and 1 ppm by mass to 500 ppm by mass of copper ions.

[C2] The non-aqueous electrolyte solution according to [C1], wherein the content of $FSO_3Li$ is 0.001% by mass to 10.0% by mass.

[C3] A non-aqueous electrolyte battery, including:

a positive electrode and a negative electrode which are capable of occluding and releasing metal ions; and a non-aqueous electrolyte solution, wherein the non-aqueous electrolyte solution contains $FSO_3Li$ and 1 ppm by mass to 500 ppm by mass of copper ions.

[C4] The non-aqueous electrolyte battery according to [C3], wherein the positive electrode includes a current collector and a positive electrode active material layer arranged on the current collector, and the positive electrode active material is a metal oxide represented by the following composition formula (1):

$$Li_{a1}Ni_{b1}Co_{c1}M_{d1}O_2 \quad (1)$$

wherein, a1, b1, c1, and d1 satisfy $0.90 \leq a1 \leq 1.10$, $0<b1<0.4$, and $b1+c1+d1=1$; and M represents at least one element selected from the group consisting of Mn, Al, Mg, Zr, Fe, Ti, and Er.

[C5] The non-aqueous electrolyte battery according to [C3], wherein the positive electrode includes a current collector and a positive electrode active material layer arranged on the current collector, and the positive electrode active material is a metal oxide represented by the following composition formula (2):

$$Li_{a2}Ni_{b2}Co_{c2}M_{d2}O \quad (2)$$

wherein, a2, b2, c2, and d2 satisfy $0.90 \leq a2 \leq 1.10$, $0.4 \leq b2 < 1.0$, and $b2+c2+d2=1$; and M represents at least one element selected from the group consisting of Mn, Al, Mg, Zr, Fe, Ti, and Er.

[C6] The non-aqueous electrolyte battery according to any one of [C3] to [C5], wherein the positive electrode is an NMC positive electrode, and the NMC positive electrode contains a nickel element in an amount of not less than 30% by mole.

[C7] The non-aqueous electrolyte battery according to [C3], [C5] or [C6], wherein the positive electrode is an NMC positive electrode, and the NMC positive electrode contains a nickel element in an amount of not less than 40% by mole.

[C8] The non-aqueous electrolyte battery according to any one of [C3] to [C7], wherein the content of $FSO_3Li$ in the non-aqueous electrolyte solution is 0.001% by mass to 10.0% by mass.

The present inventors intensively studied to solve the above-described problems and consequently discovered that the charged storage characteristics of a non-aqueous electrolyte battery under a high-temperature environment can be improved by using an $FSO_3Li$-containing non-aqueous electrolyte solution which further contains manganese ions and in which the content of the manganese ions is in a specific range, thereby arriving at a mode D of the present invention.

That is, the mode D of the present invention provides, for example, the following specific modes of [D1] to [D8].

[D1] A non-aqueous electrolyte solution, containing $FSO_3Li$ and 1 ppm by mass to 100 ppm by mass of manganese ions.

[D2] The non-aqueous electrolyte solution according to [D1], wherein the content of $FSO_3Li$ is 0.001% by mass to 10.0% by mass.

[D3] A non-aqueous electrolyte battery, including:

a positive electrode and a negative electrode which are capable of occluding and releasing metal ions; and a non-aqueous electrolyte solution, wherein the non-aqueous electrolyte solution contains $FSO_3Li$ and 1 ppm by mass to 100 ppm by mass of manganese ions.

[D4] The non-aqueous electrolyte battery according to [D3], wherein the positive electrode includes a current collector and a positive electrode active material layer arranged on the current collector, and the positive electrode active material is a metal oxide represented by the following composition formula (1):

$$Li_{a1}Ni_{b1}Co_{c1}M_{d1}O_2 \quad (1)$$

wherein, a1, b1, c1, and d1 satisfy $0.90 \le a1 \le 1.10$, $0 < b1 < 0.4$, and $b1+c1+d1=1$; and M represents at least one element selected from the group consisting of Mn, Al, Mg, Zr, Fe, Ti, and Er.

[D5] The non-aqueous electrolyte battery according to [D3], wherein the positive electrode includes a current collector and a positive electrode active material layer arranged on the current collector, and the positive electrode active material is a metal oxide represented by the following composition formula (2):

$$Li_{a2}Ni_{b2}Co_{c2}M_{d2}O_2 \quad (2)$$

wherein, a2, b2, c2, and d2 satisfy $0.90 \le a2 \le 1.10$, $0.4 \le b2 < 1.0$, and $b2+c2+d2=1$; and M represents at least one element selected from the group consisting of Mn, Al, Mg, Zr, Fe, Ti, and Er.

[D6] The non-aqueous electrolyte battery according to any one of [D3] to [D5], wherein the positive electrode is an NMC positive electrode, and the NMC positive electrode contains a nickel element in an amount of not less than 30% by mole.

[D7] The non-aqueous electrolyte battery according to [D3], [D5] or [D6], wherein the positive electrode is an NMC positive electrode, and the NMC positive electrode contains a nickel element in an amount of not less than 40% by mole.

[D8] The non-aqueous electrolyte battery according to any one of [D3] to [D7], wherein the content of $FSO_3Li$ in the non-aqueous electrolyte solution is 0.001% by mass to 10.0% by mass.

The present inventors intensively studied to solve the above-described problems and consequently discovered that the charged storage characteristics of a non-aqueous electrolyte battery under a high-temperature environment can be improved by using an $FSO_3Li$-containing non-aqueous electrolyte solution which further contains aluminum ions and controlling the content of the aluminum ions to be in a specific range, thereby arriving at a mode E of the present invention.

That is, the mode E of the present invention provides, for example, the following specific modes of [E1] to [E8].

[E1] A non-aqueous electrolyte solution, containing $FSO_3Li$ and 1 ppm by mass to 100 ppm by mass of aluminum ions.

[E2] The non-aqueous electrolyte solution according to [E1], wherein the content of $FSO_3Li$ is 0.001% by mass to 10.0% by mass.

[E3] A non-aqueous electrolyte battery, including:

a positive electrode and a negative electrode, which are capable of occluding and releasing metal ions; and a non-aqueous electrolyte solution, wherein the non-aqueous electrolyte solution contains $FSO_3Li$ and 1 ppm by mass to 100 ppm by mass of aluminum ions.

[E4] The non-aqueous electrolyte battery according to [E3], wherein the positive electrode includes a current collector and a positive electrode active material layer arranged on the current collector, and the positive electrode active material is a metal oxide represented by the following composition formula (1):

$$Li_{a1}Ni_{b1}Co_{c1}M_{d1}O_2 \quad (1)$$

wherein, a1, b1, c1, and d1 satisfy $0.90 \le a1 \le 1.10$, $0 < b1 < 0.4$, and $b1+c1+d1=1$; and M represents at least one element selected from the group consisting of Mn, Al, Mg, Zr, Fe, Ti, and Er.

[E5] The non-aqueous electrolyte battery according to [E3], wherein the positive electrode includes a current collector and a positive electrode active material layer arranged on the current collector, and the positive electrode active material is a metal oxide represented by the following composition formula (2):

$$Li_{a2}Ni_{b2}Co_{c2}M_{d2}O_2 \quad (2)$$

wherein, a2, b2, c2, and d2 satisfy $0.90 \le a2 \le 1.10$, $0.4 \le b2 < 1.0$, and $b2+c2+d2=1$; and M represents at least one element selected from the group consisting of Mn, Al, Mg, Zr, Fe, Ti, and Er.

[E6] The non-aqueous electrolyte battery according to any one of [E3] to [E5], wherein the positive electrode is an NMC positive electrode, and the NMC positive electrode contains a nickel element in an amount of not less than 30% by mole.

[E7] The non-aqueous electrolyte battery according to [E3], [E5] or [E6], wherein the positive electrode is an NMC positive electrode, and the NMC positive electrode contains a nickel element in an amount of not less than 40% by mole.

[E8] The non-aqueous electrolyte battery according to any one of [E3] to [E7], wherein the content of $FSO_3Li$ in the non-aqueous electrolyte solution is 0.001% by mass to 10.0% by mass.

Effects of the Invention

By using the non-aqueous electrolyte solution of the present invention, a non-aqueous electrolyte battery that exhibits improved charged storage characteristics under a high-temperature environment can be obtained.

MODE FOR CARRYING OUT THE INVENTION

Embodiments of the present invention will now be described in detail. The below-described embodiments are merely examples (representative examples) of the present invention, and the present invention is not restricted thereto. Further, modifications can be arbitrarily made to carry out the present invention, without departing from the gist of the present invention.

<1. Non-Aqueous Electrolyte Solution>

The non-aqueous electrolyte solution according to one embodiment of the present invention contains $FSO_3Li$, and further contains ions of a specific metal element in a specific amount range.

The non-aqueous electrolyte solution according to one embodiment of the present invention will now be described in detail. The descriptions in the respective sections of the present specification are applicable to all modes, except for the descriptions relating to specific metal element ions.

<1-1. $FSO_3Li$>

The non-aqueous electrolyte solution of the present embodiment contains $FSO_3Li$.

In the non-aqueous electrolyte solution, the content of $FSO_3Li$ is preferably not less than 0.001% by mass, more preferably not less than 0.005% by mass, still more preferably not less than 0.010% by mass, particularly preferably not less than 0.10% by mass. Meanwhile, an upper limit of the content of $FSO_3Li$ is not particularly restricted; however, it is preferably 10.0% by mass or less, more preferably 7.0% by mass or less, still more preferably 5.0% by mass or less, especially preferably 4.0% by mass or less, particularly preferably 3.0% by mass or less.

When the content of $FSO_3Li$ in the non-aqueous electrolyte solution is 10.0% by mass or less, a negative electrode reduction reaction is not enhanced by an increase in the internal resistance of a non-aqueous electrolyte battery, which is preferred, whereas when the content of $FSO_3Li$ is 0.001% by mass or more, the effects of the present invention attributed to the incorporation of $FSO_3Li$ are exerted, which is also preferred. Therefore, as long as the content of $FSO_3Li$ is in the above-described range, for example, a negative electrode reduction reaction under a high-temperature environment is inhibited, whereby the charged storage characteristics under a high-temperature environment can be improved.

As $FSO_3Li$, one synthesized by a known method may be used, or a commercially available product may be used. For the measurement of the amount of $FSO_3Li$ in an electrolyte solution contained in a non-aqueous electrolyte battery, a member containing a non-aqueous electrolyte solution may be removed from the non-aqueous electrolyte battery, and the non-aqueous electrolyte solution may be extracted therefrom and measured. The non-aqueous electrolyte solution can be extracted by, for example, using a centrifuge or an organic solvent. Ice-cooled pure water is added to the thus extracted non-aqueous electrolyte solution, and the resultant is quickly mixed and immediately subjected to anion chromatography (using, for example, ICS-2000 manufactured by Thermo Fisher Scientific, Inc.; column: AS23, eluent: 5.0 mM $Na_2CO_3$/0.9 mM $NaHCO_3$, detection method: electrical conductivity detection method with a suppressor (12.5 mM $H_2SO_4$)), after which the thus separated $SO_4^{2-}$ ions are detected, and $FSO_3^-$ ions can be quantified by conversion from a calibration curve of $SO_4^{2-}$ ions, assuming molar sensitivity ratio $[k(SO_4^{2-})/k(FSO_3^-)]=2.0$. Usually, in a non-aqueous electrolyte solution, the amount of $FSO_3^-$ ions can be regarded as the amount of $FSO_3Li$. Meanwhile, as described below, an $FSO_3^-$ ion-containing compound can be used as a specific metal ion source. For example, $Al(FSO_3)_3$ may be used as an aluminum ion source. In this case, the amount of $FSO_3Li$ may be determined by subtracting the amount of $Al(FSO_3)_3$-derived $FSO_3^-$ ions from a total amount of $FSO_3^-$ ions in the non-aqueous electrolyte solution. Alternatively, when it is not clear whether or not $Al(FSO_3)_3$ is being used as an aluminum ion source, the amount of $FSO_3^-$ ions in the non-aqueous electrolyte solution may be deemed as the amount of $FSO_3Li$.

<1-2. Metal Ions>

The non-aqueous electrolyte solution according to one embodiment of the present invention contains at least one metal ion selected from the group consisting of (a) nickel ions, (b) cobalt ions, (c) copper ions, (d) manganese ions, and (e) aluminum ions, and satisfies at least one of the following conditions (i) to (v):

(i) the concentration of the (a) is 1 ppm by mass to 500 ppm by mass, (ii) the concentration of the (b) is 1 ppm by mass to 500 ppm by mass, (iii) the concentration of the (c) is 1 ppm by mass to 500 ppm by mass, (iv) the concentration of the (d) is 1 ppm by mass to 100 ppm by mass, and (v) the concentration of the (e) is 1 ppm by mass to 100 ppm by mass.

In the present specification, the content of each of the specific ions (a) to (e) in a non-aqueous electrolyte solution means an ionic concentration of each specific metal element in the non-aqueous electrolyte solution (100% by mass). The ions of a specific metal element may have any valence, and may be a combination of metal ions having different valences. Further, the non-aqueous electrolyte solution may contain plural kinds of metal ions.

For the measurement of the amount of metal ions contained in an electrolyte solution of a non-aqueous electrolyte battery, a member containing a non-aqueous electrolyte solution may be removed from the non-aqueous electrolyte battery, and the non-aqueous electrolyte solution may be extracted therefrom and measured. The non-aqueous electrolyte solution can be extracted by, for example, using a centrifuge or an organic solvent. Using the thus extracted non-aqueous electrolyte solution, metal elements, namely metal ions, are quantified by an inductively-coupled high-frequency plasma emission spectrometric analysis (ICP-AES, e.g., iCAP 7600duo manufactured by Thermo Fischer Scientific, Inc.) in accordance with a Li and acid concentration matching calibration curve method.

The ions will now be described.

<1-2-1. Nickel Ions>

The non-aqueous electrolyte solution according to one embodiment of the present invention contains 1 ppm by mass to 500 ppm by mass of nickel ions. In the present specification, the content of nickel ions in a non-aqueous electrolyte solution means an ionic concentration of nickel element in the non-aqueous electrolyte solution. The valence of the nickel ions contained in the non-aqueous electrolyte solution is not particularly restricted, and the nickel ions may be divalent or trivalent. Further, the non-aqueous electrolyte solution according to one embodiment of the present invention may contain both divalent nickel ions ($Ni^{2+}$) and trivalent nickel ions ($Ni^{3+}$) at any ratio.

In the non-aqueous electrolyte solution, the content of nickel ions is usually not less than 1 ppm by mass, preferably not less than 2 ppm by mass, more preferably not less than 3 ppm by mass, still more preferably not less than 5 ppm by mass, especially preferably not less than 10 ppm by mass, particularly preferably not less than 25 ppm by mass. Meanwhile, an upper limit of the content of nickel ions is usually 500 ppm by mass or less, preferably 400 ppm by mass or less, more preferably 350 ppm by mass or less, still more preferably 300 ppm by mass or less, especially preferably 220 ppm by mass or less, particularly preferably 150 ppm by mass or less.

When the content of nickel ions is more than 500 ppm by mass, the internal resistance of a non-aqueous electrolyte battery is increased due to enhanced negative electrode reduction reaction, whereas when the content of nickel ions is less than 1 ppm by mass, the effect as an auxiliary agent is reduced since the different from a case of not containing nickel ions is small.

A compound serving as a nickel ion source may be used singly, or two or more thereof may be used in any combination at any ratio. Examples of the compound serving as a nickel ion source include Ni complexes, such as $Ni(EC)_n(PF_6)_2$ (EC=ethylene carbonate ligand, n=0 to 6). A ligand thereof is preferably, for example, a battery-constituting element, and examples thereof include organic solvents used as non-aqueous solvents, for example, cyclic carbonates such as ethylene carbonate, propylene carbonate, and fluoroethylene carbonate; chain carbonates such as dimethyl carbonate, ethyl methyl carbonate, and diethyl carbonate; carboxylic acid esters such as methyl acetate; organic solvents such as ether-based compounds, and sulfone-based compounds. Examples of the compound serving as a nickel ion source also include nickel halides, such as $Ni(CH_3COO)_2$, $Ni(OH)_2$, NiO, $NiCO_3$, $NiSO_4$, and nickel chloride. Further, the nickel ions may be those eluted from a battery constituent that may contain a nickel element, such as a positive electrode active material, a negative electrode active material, a positive electrode current collector, a negative electrode current collector, or an outer package.

In the non-aqueous electrolyte solution, the nickel ions usually form salts with counter anions. In the present embodiment, the nickel ions may be coordinated with counter anions other than $FSO_3^-$ ions to form complexes, or may form salts with one or more counter anions. The counter anions are preferably, for example, battery-constituting elements, and examples thereof include: fluorophosphate ions, such as $LiPF_6^-$ derived $PF_6^-$ ions and $LiPO_2F_2$-derived $PO_2F_2^-$ ions; $FSO_3Li$-derived $FSO_3^-$ ions; fluoride ions; carbonate ions; carboxylate ions; sulfonate ions; sulfonylimide ions; and (oxalato)borate ions. The counter anions are more preferably, for example, $PF_6^-$ ions, $FSO_3^-$ ions, or fluoride ions. Thereamong, $FSO_3^-$ ions have a higher coordination capacity with nickel ions than $PF_6^-$ ions and are thus particularly preferred.

In the present embodiment, it is presumed that, by incorporating specific amounts of nickel ions and $FSO_3Li$ into the non-aqueous electrolyte solution, for example, the reduction resistance of the nickel ions is improved through coordination or interaction of $FSO_3^-$ ions with the nickel ions, and a negative electrode reduction reaction under a high-temperature environment is inhibited, whereby the charged storage characteristics under a high-temperature environment can be improved.

<1-2-2. Cobalt Ions>

The non-aqueous electrolyte solution according to one embodiment of the present invention contains 1 ppm by mass to 500 ppm by mass of cobalt ions. In the present specification, the content of cobalt ions in a non-aqueous electrolyte solution means an ionic concentration of cobalt element in the non-aqueous electrolyte solution. The valence of the cobalt ions contained in the non-aqueous electrolyte solution is not particularly restricted, and the cobalt ions may be divalent or trivalent. Further, the non-aqueous electrolyte solution according to one embodiment of the present invention may contain both divalent cobalt ions ($Co^{2+}$) and trivalent cobalt ions ($Co^{3+}$) at any ratio.

In the non-aqueous electrolyte solution, the content of cobalt ions is usually not less than 1 ppm by mass, preferably not less than 2 ppm by mass, more preferably not less than 3 ppm by mass, still more preferably not less than 5 ppm by mass, especially preferably not less than 10 ppm by mass, particularly preferably not less than 25 ppm by mass. Meanwhile, an upper limit of the content of cobalt ions is usually 500 ppm by mass or less, preferably 400 ppm by mass or less, more preferably 350 ppm by mass or less, still more preferably 300 ppm by mass or less, especially preferably 220 ppm by mass or less, particularly preferably 150 ppm by mass or less.

When the content of cobalt ions is more than 500 ppm by mass, the internal resistance of a non-aqueous electrolyte battery is increased due to enhanced negative electrode reduction reaction, whereas when the content of cobalt ions is less than 1 ppm by mass, the effect as an auxiliary agent is reduced since the different from a case of not containing cobalt ions is small.

A compound serving as a cobalt ion source may be used singly, or two or more thereof may be used in any combination at any ratio. Examples of the compound serving as a cobalt ion source include Co complexes, such as $Co(EC)_n(PF_6)_2$ (EC=ethylene carbonate ligand, n=0 to 6) and $Co(EC)_n(PF_6)_3$ (n=0 to 6). A ligand thereof is preferably, for example, a battery-constituting element, and examples thereof include organic solvents used as non-aqueous solvents, for example, cyclic carbonates such as ethylene carbonate, propylene carbonate, and fluoroethylene carbonate; chain carbonates such as dimethyl carbonate, ethyl methyl carbonate, and diethyl carbonate; carboxylic acid esters such as methyl acetate; organic solvents such as ether-based compounds, and sulfone-based compounds. Examples of the compound serving as a cobalt ion source also include: $Co(CH_3COO)_2$; $Co(HCOO)_2$; $Co(OH)_2$; cobalt oxides, such as CoO and $Co_3O_4$; $CoLiO_2$; $CoCO_3$; $CoSO_4$; Co $(NO_3)_2$; and cobalt halides, such as cobalt(II) fluoride, cobalt(III) fluoride, cobalt(II) bromide, and cobalt(II) chloride. Further, the cobalt ions may be those eluted from a battery constituent that may contain a cobalt element, such as a positive electrode active material, a negative electrode active material, a positive electrode current collector, a negative electrode current collector, or an outer package.

In the non-aqueous electrolyte solution, the cobalt ions usually form salts with counter anions. In the present embodiment, the cobalt ions may be coordinated with counter anions other than $FSO_3^-$ ions to form complexes, or may form salts with one or more counter anions. The counter anions are preferably, for example, battery-constituting elements, and examples thereof include: fluorophosphate ions, such as $LiPF_6^-$ derived $PF_6^-$ ions and $LiPO_2F_2$-derived $PO_2F_2^-$ ions; $FSO_3Li$-derived $FSO_3^-$ ions; fluoride ions; carbonate ions; carboxylate ions; sulfonate ions; sulfonylimide ions; and (oxalato)borate ions. The counter anions are more preferably, for example, $PF_6^-$ ions, $FSO_3^-$ ions, or fluoride ions. Thereamong, $FSO_3^-$ ions have a higher coordination capacity with cobalt ions than $PF_6^-$ ions and are thus particularly preferred.

In the present embodiment, it is presumed that, by incorporating specific amounts of cobalt ions and $FSO_3Li$ into the non-aqueous electrolyte solution, for example, the reduction resistance of the cobalt ions is improved through coordination or interaction of $FSO_3^-$ ions with the cobalt ions, and a negative electrode reduction reaction under a high-temperature environment is inhibited, whereby the charged storage characteristics under a high-temperature environment can be improved.

<1-2-3. Copper Ions>

The non-aqueous electrolyte solution according to one embodiment of the present invention contains 1 ppm by mass to 500 ppm by mass of copper ions. In the present specification, the content of copper ions in a non-aqueous electrolyte solution means an ionic concentration of copper element in the non-aqueous electrolyte solution. The valence of the copper ions contained in the non-aqueous electrolyte solution is not particularly restricted, and the copper ions may be monovalent or divalent. Further, the non-aqueous electrolyte solution according to one embodiment of the present invention may contain both monovalent copper ions ($Cu^{2+}$) and trivalent divalent ions ($Cu^{3+}$) at any ratio.

In the non-aqueous electrolyte solution, the content of copper ions is usually not less than 1 ppm by mass, preferably not less than 2 ppm by mass, more preferably not less than 3 ppm by mass, still more preferably not less than 5 ppm by mass, especially preferably not less than 10 ppm by mass, particularly preferably not less than 25 ppm by mass. Meanwhile, an upper limit of the content of copper ions is usually 500 ppm by mass or less, preferably 400 ppm by mass or less, more preferably 350 ppm by mass or less, still more preferably 300 ppm by mass or less, especially preferably 220 ppm by mass or less, particularly preferably 150 ppm by mass or less.

When the content of copper ions is more than 500 ppm by mass, the internal resistance of a non-aqueous electrolyte battery is increased due to enhanced negative electrode reduction reaction, whereas when the content of copper ions is less than 1 ppm by mass, the effect as an auxiliary agent is reduced since the different from a case of not containing copper ions is small.

A compound serving as a copper ion source may be used singly, or two or more thereof may be used in any combination at any ratio. Examples of the compound serving as a copper ion source include Cu complexes, such as $Cu(EC)_n(PF_6)_2$ (EC=ethylene carbonate ligand, n=0 to 6). A ligand thereof is preferably, for example, a battery-constituting element, and examples thereof include organic solvents used as non-aqueous solvents, for example, cyclic carbonates such as ethylene carbonate, propylene carbonate, and fluoroethylene carbonate; chain carbonates such as dimethyl carbonate, ethyl methyl carbonate, and diethyl carbonate; carboxylic acid esters such as methyl acetate; organic solvents such as ether-based compounds, and sulfone-based compounds. Examples of the compound serving as a copper ion source also include: $Cu(CH_3COO)_2$; $Cu(HCOO)_2$; $Cu(OH)_2$; copper oxides, such as CuO and $Cu_2O$; $CuCO_3$; $CuSO_4$; $Cu(NO_3)_2$; and copper halides, such as copper(I) chloride and copper(II) chloride. Further, the copper ions may be those eluted from a battery constituent that may contain a copper element, such as a positive electrode active material, a negative electrode active material, a positive electrode current collector, a negative electrode current collector, or an outer package.

In the non-aqueous electrolyte solution, the copper ions usually form salts with counter anions. In the present embodiment, the copper ions may be coordinated with counter anions other than $FSO_3^-$ ions to form complexes, or may form salts with one or more counter anions. The counter anions are preferably, for example, battery-constituting elements, and examples thereof include: fluorophosphate ions, such as $LiPF_6$-derived $PF_6^-$ ions and $LiPO_2F_2$-derived $PO_2F_2^-$ ions; $FSO_3Li$-derived $FSO_3^-$ ions; fluoride ions; carbonate ions; carboxylate ions; sulfonate ions; sulfonylimide ions; and (oxalato)borate ions. The counter anions are more preferably, for example, $PF_6^-$ ions, $FSO_3^-$ ions, or fluoride ions. Thereamong, $FSO_3^-$ ions have a higher coordination capacity with copper ions than $PF_6^-$ ions and are thus particularly preferred.

In the present embodiment, it is presumed that, by incorporating specific amounts of copper ions and $FSO_3Li$ into the non-aqueous electrolyte solution, for example, the reduction resistance of the copper ions is improved through coordination or interaction of $FSO_3^-$ ions (fluorosulfonate ions) with the copper ions, and a negative electrode reduction reaction under a high-temperature environment is inhibited, whereby the charged storage characteristics under a high-temperature environment can be improved.

<1-2-4. Manganese Ions>

The non-aqueous electrolyte solution according to one embodiment of the present invention contains 1 ppm by mass to 100 ppm by mass of manganese ions. In the present specification, the content of manganese ions in a non-aqueous electrolyte solution means an ionic concentration of manganese element in the non-aqueous electrolyte solution. The valence of the manganese ions contained in the non-aqueous electrolyte solution is not particularly restricted, and the manganese ions may be divalent or trivalent. Further, the non-aqueous electrolyte solution according to one embodiment of the present invention may contain both divalent manganese ions ($Mn^{2+}$) and trivalent manganese ions ($Mn^{3+}$) at any ratio.

In the non-aqueous electrolyte solution, the content of manganese ions is usually not less than 1 ppm by mass, preferably not less than 2 ppm by mass, more preferably not less than 3 ppm by mass, still more preferably not less than 5 ppm by mass, especially preferably not less than 10 ppm by mass, particularly preferably not less than 25 ppm by mass. Meanwhile, an upper limit of the content of manganese ions is usually 100 ppm by mass or less, preferably 95 ppm by mass or less, more preferably 90 ppm by mass or less, still more preferably 85 ppm by mass or less, especially preferably 80 ppm by mass or less, particularly preferably 75 ppm by mass or less.

When the content of manganese ions is more than 100 ppm by mass, the internal resistance of a non-aqueous electrolyte battery is increased due to enhanced negative electrode reduction reaction, whereas when the content of manganese ions is less than 1 ppm by mass, the effect as an auxiliary agent is reduced since the different from a case of not containing manganese ions is small.

A compound serving as a manganese ion source may be used singly, or two or more thereof may be used in any combination at any ratio. Examples of the compound serving as a manganese ion source include Mn complexes, such as $Mn(EC)_n(PF_6)_2$ (EC=ethylene carbonate ligand, n=0 to 6). A ligand thereof is preferably, for example, a battery-constituting element, and examples thereof include organic solvents used as non-aqueous solvents, for example, cyclic carbonates such as ethylene carbonate, propylene carbonate, and fluoroethylene carbonate; chain carbonates such as dimethyl carbonate, ethyl methyl carbonate, and diethyl carbonate; carboxylic acid esters such as methyl acetate; organic solvents such as ether-based compounds, and sulfone-based compounds. Examples of the compound serving as a manganese ion source also include: manganese acetate hydrates, such as $Mn(CH_3COO)_2.2H_2O$, $Mn(CH_3COO)_2.4H_2O$, and $Mn(CH_3COO)_3.2H_2O$; $Mn(OH)_2$; manganese oxides, such as $MnO_2$ and $Mn_3O_4$; $MnCO_3$; $MnSO_4$; $KMnO_4$; $MnB_4O_7 \cdot 8H_2O$; and manganese halides such as manganese(II) chloride. Further, the manganese ions may be those eluted from a battery constituent that may contain a manganese element, such as a positive electrode active material, a negative electrode active material, a positive electrode current collector, a negative electrode current collector, or an outer package.

In the non-aqueous electrolyte solution, the manganese ions usually form salts with counter anions. In the present embodiment, the manganese ions may be coordinated with counter anions other than $FSO_3^-$ ions to form complexes, or may form salts with one or more counter anions. The counter anions are preferably, for example, battery-constituting elements, and examples thereof include: fluorophosphate ions, such as $LiPF_6^-$ derived $PF_6^-$ ions and $LiPO_2F_2$-derived $PO_2F_2^-$ ions; $FSO_3Li$-derived $FSO_3^-$ ions; fluoride ions; carbonate ions; carboxylate ions; sulfonate ions; sulfonylimide ions; and (oxalato)borate ions. The counter anions are more preferably, for example, $PF_6^-$ ions, $FSO_3^-$ ions, or fluoride ions. Thereamong, $FSO_3^-$ ions have a higher coordination capacity with manganese ions than $PF_6^-$ ions and are thus particularly preferred.

In the present embodiment, it is presumed that, by incorporating specific amounts of manganese ions and $FSO_3Li$ into the non-aqueous electrolyte solution, for example, the reduction resistance of the manganese ions is improved through coordination or interaction of $FSO_3^-$ ions with the manganese ions, and a negative electrode reduction reaction under a high-temperature environment is inhibited, whereby the charged storage characteristics under a high-temperature environment can be improved.

<1-2-5. Aluminum Ions>

The non-aqueous electrolyte solution according to one embodiment of the present invention contains 1 ppm by mass to 100 ppm by mass of aluminum ions. In the present specification, the content of aluminum ions in a non-aqueous electrolyte solution means an ionic concentration of aluminum element in the non-aqueous electrolyte solution.

In the non-aqueous electrolyte solution, the content of aluminum ions is usually not less than 1 ppm by mass, preferably not less than 2 ppm by mass, more preferably not less than 3 ppm by mass, still more preferably not less than 5 ppm by mass, especially preferably not less than 10 ppm by mass, particularly preferably not less than 25 ppm by mass. Meanwhile, an upper limit of the content of aluminum ions is usually 100 ppm by mass or less, preferably 90 ppm by mass or less, more preferably 80 ppm by mass or less, still more preferably 70 ppm by mass or less, particularly preferably 60 ppm by mass or less.

When the content of aluminum ions is more than 100 ppm by mass, the internal resistance of a non-aqueous electrolyte battery is increased due to enhanced negative electrode reduction reaction, whereas when the content of aluminum ions is less than 1 ppm by mass, the effect of aluminum ions is reduced since the different from a case of not containing aluminum ions is small.

A compound serving as an aluminum ion source may be used singly, or two or more thereof may be used in any combination at any ratio. Examples of the compound serving as an aluminum ion source include Al complexes, such as $Al(EC)_n(PF_6)_3$ (EC=ethylene carbonate ligand, n=0 to 6). A ligand thereof is preferably, for example, a battery-constituting element, and examples thereof include organic solvents used as non-aqueous solvents, for example, cyclic carbonates such as ethylene carbonate, propylene carbonate, and fluoroethylene carbonate; chain carbonates such as dimethyl carbonate, ethyl methyl carbonate, and diethyl carbonate; carboxylic acid esters such as methyl acetate; organic solvents such as ether-based compounds, and sulfone-based compounds. Examples of the compound serving as an aluminum ion source also include aluminum salts, for example, $Al(FSO_3)_3$; $Al(CH_3COO)_3$; $Al(CF_3COO)_3$; $Al(CF_3SO_3)_3$; aluminum alkoxides, such as tris(2,4-pentanedionato)aluminum, aluminum ethoxide, aluminum isopropoxide, and aluminum n-butoxide; alkyl aluminum such as trimethyl aluminum; and Al halides such as aluminum chloride. Further, the aluminum ions may be those eluted from a battery constituent that may contain an aluminum element, such as a positive electrode active material, a negative electrode active material, a positive electrode current collector, a negative electrode current collector, or an outer package.

In the non-aqueous electrolyte solution, the aluminum ions usually form salts with counter anions. In the present embodiment, the aluminum ions may be coordinated with counter anions other than $FSO_3^-$ ions to form complexes, or may form salts with one or more counter anions. The counter anions are preferably, for example, battery-constituting elements, and examples thereof include: fluorophosphate ions, such as $LiPF_6$-derived $PF_6^-$ ions and $LiPO_2F_2$-derived $PO_2F_2^-$ ions; $FSO_3^-$ ions that may be derived from $FSO_3Li$; fluoride ions; carbonate ions; carboxylate ions; sulfonate ions; sulfonylimide ions; and (oxalato)borate ions. The counter anions are more preferably, for example, $PF_6^-$ ions, $FSO_3^-$ ions, or fluoride ions. Thereamong, $FSO_3^-$ ions have a higher coordination capacity with aluminum ions than $PF_6^-$ ions and are thus particularly preferred.

In the present embodiment, it is presumed that, by incorporating specific amounts of aluminum ions and $FSO_3Li$ into the non-aqueous electrolyte solution, for example, the reduction resistance of the aluminum ions is improved through coordination or interaction of $FSO_3^-$ ions with the aluminum ions, and a negative electrode reduction reaction under a high-temperature environment is inhibited, whereby the charged storage characteristics under a high-temperature environment can be improved. For the measurement of the amount of aluminum ions contained in an electrolyte solution of a non-aqueous electrolyte battery, a member containing a non-aqueous electrolyte solution may be removed from the non-aqueous electrolyte battery, and the non-aqueous electrolyte solution may be extracted therefrom and measured. The non-aqueous electrolyte solution can be extracted by, for example, using a centrifuge or an organic solvent. Using the thus extracted non-aqueous electrolyte solution, aluminum element, namely aluminum ion, is quantified by an inductively-coupled high-frequency plasma emission spectrometric analysis (ICP-AES, e.g., iCAP 7600duo manufactured by Thermo Fischer Scientific, Inc.) in accordance with a Li and acid concentration matching calibration curve method.

When the non-aqueous electrolyte solution according to one embodiment of the present invention contains at least one metal ion selected from the group consisting of nickel ions, cobalt ions, copper ions, manganese ions and aluminum ions, a total content of these metal ions in the non-aqueous electrolyte solution is usually not less than 1 ppm by mass, preferably not less than 2 ppm by mass, more preferably not less than 3 ppm by mass, still more preferably not less than 5 ppm by mass, especially preferably not less than 10 ppm by mass, particularly preferably not less than 25 ppm by mass. Meanwhile, an upper limit of the total content is usually 500 ppm by mass or less, preferably 400 ppm by mass or less, more preferably 300 ppm by mass or less, still more preferably 200 ppm by mass or less, particularly preferably 120 ppm by mass or less.

Further, the non-aqueous electrolyte solution according to one embodiment of the present invention contains at least nickel ions in an amount of preferably not less than 30% by mass, more preferably not less than 40% by mass, with respect to a total amount of the above-described five kinds of metal ions.

When the non-aqueous electrolyte solution according to one embodiment of the present invention contains plural kinds of metal ions selected from the group consisting of nickel ions, cobalt ions, copper ions, manganese ions and aluminum ions, the non-aqueous electrolyte solution preferably contains at least the following combination of metal ions:

a combination of: nickel ions and cobalt ions; nickel ions and copper ions; nickel ions and manganese ions; cobalt ions and copper ions; cobalt ions and manganese ions; copper ions and manganese ions; nickel ions, cobalt ions, and copper ions; nickel ions, cobalt ions, and manganese ions; nickel ions, copper ions, and manganese ions; cobalt ions, copper ions, and manganese ions; nickel ions, cobalt ions, copper ions, and manganese ions.

The combination is particularly preferably nickel ions and cobalt ions; nickel ions and copper ions; nickel ions and manganese ions; nickel ions, cobalt ions, and manganese ions; nickel ions, copper ions, and manganese ions; or nickel ions, cobalt ions, copper ions, and manganese ions.

The amounts of the respective metal ions contained in the above-described particularly preferred combinations are preferably as follows.

A combination of nickel ions and cobalt ions contains: nickel ions in an amount of usually not less than 1 ppm by mass, preferably not less than 10 ppm by mass, more preferably not less than 20 ppm by mass, still more preferably not less than 25 ppm by mass, but usually 300 ppm by mass or less, preferably 220 ppm by mass or less, more preferably 150 ppm by mass or less; and cobalt ions in an amount of usually not less than 1 ppm by mass, preferably not less than 5 ppm by mass, more preferably not less than 10 ppm by mass, but usually 300 ppm by mass or less, preferably 220 ppm by mass or less, more preferably 150 ppm by mass or less.

A combination of nickel ions and copper ions contains: nickel ions in an amount of usually not less than 1 ppm by mass, preferably not less than 10 ppm by mass, more preferably not less than 20 ppm by mass, but usually 300 ppm by mass or less, preferably 220 ppm by mass or less, more preferably 150 ppm by mass or less; and copper ions in an amount of usually not less than 1 ppm by mass, preferably not less than 10 ppm by mass, more preferably not less than 25 ppm by mass, but usually 300 ppm by mass or less, preferably 220 ppm by mass or less, more preferably 150 ppm by mass or less.

A combination of nickel ions and manganese ions contains: nickel ions in an amount of usually not less than 1 ppm by mass, preferably not less than 10 ppm by mass, preferably not less than 25 ppm by mass, but usually 300 ppm by mass or less, preferably 220 ppm by mass or less, more preferably 150 ppm by mass or less; and manganese ions in an amount of usually not less than 1 ppm by mass, preferably not less than 2 ppm by mass, but usually 100 ppm by mass or less, preferably 80 ppm by mass or less, more preferably 75 ppm by mass or less.

A combination of nickel ions, cobalt ions, and manganese ions contains: nickel ions in an amount of usually not less than 1 ppm by mass, preferably not less than 10 ppm by mass, more preferably not less than 25 ppm by mass, but usually 300 ppm by mass or less, preferably 220 ppm by mass or less, more preferably 150 ppm by mass or less; cobalt ions in an amount of usually not less than 1 ppm by mass, preferably not less than 5 ppm by mass, more preferably not less than 10 ppm by mass, but usually 300 ppm by mass or less, preferably 220 ppm by mass or less, more preferably 150 ppm by mass or less; and manganese ions in an amount of preferably not less than 1 ppm by mass, but usually 100 ppm by mass or less, preferably 80 ppm by mass or less, more preferably 75 ppm by mass or less.

A combination of nickel ions, copper ions, and manganese ions contains: nickel ions in an amount of usually not less than 1 ppm by mass, preferably not less than 5 ppm by mass, more preferably not less than 10 ppm by mass, but usually 300 ppm by mass or less, preferably 220 ppm by mass or less, more preferably 150 ppm by mass or less; copper ions in an amount of usually not less than 1 ppm by mass, preferably not less than 10 ppm by mass, but usually 300 ppm by mass or less, preferably 220 ppm by mass or less, preferably 150 ppm by mass or less; and manganese ions in an amount of preferably not less than 1 ppm by mass, but usually 100 ppm by mass or less, preferably 80 ppm by mass or less, more preferably 75 ppm by mass or less.

A combination of nickel ions, cobalt ions, copper ions, and manganese ions contains: nickel ions in an amount of usually not less than 1 ppm by mass, preferably not less than 5 ppm by mass, more preferably not less than 10 ppm by mass, but usually 300 ppm by mass or less, preferably 220 ppm by mass or less, still more preferably 150 ppm by mass or less; cobalt ions in an amount of usually not less than 1 ppm by mass, preferably not less than 2 ppm by mass, but usually 300 ppm by mass or less, preferably 220 ppm by mass or less, preferably 150 ppm by mass or less; copper ions in an amount of usually not less than 1 ppm by mass, preferably not less than 5 ppm by mass, more preferably not less than 10 ppm by mass, but usually 300 ppm by mass or less, preferably 220 ppm by mass or less, preferably 150 ppm by mass or less; and manganese ions in an amount of preferably not less than 1 ppm by mass, but usually 100 ppm by mass or less, preferably 80 ppm by mass or less, more preferably 75 ppm by mass or less.

<1-3. Electrolyte>

Similarly to a general non-aqueous electrolyte solution, the non-aqueous electrolyte solution of the present embodiment usually contains an electrolyte as its component. The electrolyte used in the non-aqueous electrolyte solution of the present embodiment is not particularly restricted, and any known electrolyte can be used. Specific examples of the electrolyte will now be described in detail.

<1-3-1. Lithium Salt>

As the electrolyte in the non-aqueous electrolyte solution of the present embodiment, a lithium salt is usually used. The lithium salt is not particularly restricted as long as it is known to be used in this application, and any one or more lithium salts, specific examples of which include the followings, can be used.

Specific examples of the lithium salt include:

lithium fluoroborates, such as $LiBF_4$;

lithium fluorophosphates, such as $LiPF_6$ and $LiPO_2F_2$;

lithium tungstates, such as $LiWOF_5$;

lithium carboxylates, such as $CF_3CO_2Li$;

lithium sulfonates, such as $CH_3SO_3Li$;

lithium imide salts, such as $LiN(FSO_2)_2$ and $LiN(CF_3SO_2)_2$;

lithium methide salts, such as $LiC(FSO_2)_3$;

lithium oxalate salts, such as lithium difluorooxalatoborate; and fluorine-containing organic lithium salts, such as $LiPF_4(CF_3)_2$.

From the standpoint of further enhancing the effects of improving the charge-discharge rate characteristics and the impedance characteristics in addition to the effect of improving the charged storage characteristics under a high-temperature environment that is attained in the present invention, the lithium salt is preferably one selected from lithium fluoroborates, lithium fluorophosphates, lithium sulfonates, lithium imide salts, and lithium oxalate salts, more preferably one selected from lithium fluoroborates, lithium fluorophosphates, lithium imide salts, and lithium oxalate salts.

A total concentration of these electrolytes in the non-aqueous electrolyte solution is not particularly restricted; however, it is usually 8% by mass or higher, preferably 8.5% by mass or higher, more preferably 9% by mass or higher, with respect to a total amount of the non-aqueous electrolyte solution. An upper limit of the total concentration is usually 18% by mass or lower, preferably 17% by mass or lower, more preferably 16% by mass or lower. When the total concentration of the electrolytes is in this range, the non-aqueous electrolyte solution has an electrical conductivity appropriate for battery operation, so that sufficient output characteristics tend to be obtained.

<1-4. Non-Aqueous Solvent>

Similarly to a general non-aqueous electrolyte solution, the non-aqueous electrolyte solution of the present embodiment usually contains, as its main component, a non-aqueous solvent that dissolves the above-described electrolytes. The non-aqueous solvent used in this embodiment is not particularly restricted, and any known organic solvent can be used. The organic solvent may be, for example, a saturated cyclic carbonate, a chain carbonate, a carboxylic acid ester, an ether-based compound, or a sulfone-based compound. The organic solvent is preferably, but not particularly limited to: a saturated cyclic carbonate, a chain carbonate, or a carboxylic acid ester, more preferably a saturated cyclic carbonate or a chain carbonate. These organic solvents may be used singly, or in combination of two or more thereof. As a combination of two or more non-aqueous solvents, a combination of two or more selected from the group consisting of saturated cyclic carbonates, chain carbonates, and carboxylic acid esters is preferred, and a combination of saturated cyclic carbonates or chain carbonates is more preferred.

<1-4-1. Saturated Cyclic Carbonate>

The saturated cyclic carbonate is usually, for example, an alkylene group having 2 to 4 carbon atoms and, from the standpoint of attaining an improvement in the battery characteristics that is attributed to an increase in the degree of lithium ion dissociation, a saturated cyclic carbonate having 2 to 3 carbon atoms is preferably used. The saturated cyclic carbonate may also be a fluorine atom-containing cyclic carbonate, such as monofluoroethylene carbonate.

Examples of the saturated cyclic carbonate include ethylene carbonate, propylene carbonate, and butylene carbonate. Thereamong, ethylene carbonate and propylene carbonate are preferred, and ethylene carbonate, which is unlikely to be oxidized or reduced, is more preferred. Any of these saturated cyclic carbonates may be used singly, or two or more thereof may be used in any combination at any ratio.

The content of a saturated cyclic carbonate is not particularly restricted and may be set arbitrarily as long as the effects of the present invention are not markedly impaired; however, a lower limit thereof is usually not less than 3% by volume, preferably not less than 5% by volume, with respect to a total solvent amount of the non-aqueous electrolyte solution. By controlling the content of the saturated cyclic carbonate to be in this range, a decrease in the electrical conductivity caused by a reduction in the dielectric constant of the non-aqueous electrolyte solution is avoided, so that the high-current discharge characteristics of the non-aqueous electrolyte battery, the stability to a negative electrode, and the cycle characteristics are all likely to be obtained in favorable ranges. Meanwhile, an upper limit of the content of the saturated cyclic carbonate is usually 90% by volume or less, preferably 85% by volume or less, more preferably 80% by volume or less. By controlling the content of the saturated cyclic carbonate to be in this range, the resistance of the non-aqueous electrolyte solution against oxidation and reduction is improved, so that the stability during high-temperature storage tends to be improved.

It is noted here that, in the present invention, "% by volume" means a volume at 25° C. and 1 atm.

<1-4-2. Linear Carbonate>

As the chain carbonate, one having 3 to 7 carbon atoms is usually used and, for the purpose of adjusting the viscosity of the electrolyte solution to be in an appropriate range, a chain carbonate having 3 to 5 carbon atoms is preferably used.

Specific examples of the chain carbonate include dimethyl carbonate, diethyl carbonate, di-n-propyl carbonate, diisopropyl carbonate, n-propyl isopropyl carbonate, ethyl methyl carbonate, methyl-n-propyl carbonate, n-butyl methyl carbonate, isobutyl methyl carbonate, t-butyl methyl carbonate, ethyl-n-propyl carbonate, n-butyl ethyl carbonate, isobutyl ethyl carbonate, and t-butyl ethyl carbonate.

Thereamong, dimethyl carbonate, diethyl carbonate, di-n-propyl carbonate, diisopropyl carbonate, n-propyl isopropyl carbonate, ethyl methyl carbonate and methyl-n-propyl carbonate are preferred, and dimethyl carbonate, diethyl carbonate and ethyl methyl carbonate are particularly preferred.

Further, a fluorine atom-containing chain carbonate (hereinafter, may be simply referred to as "fluorinated chain carbonate") can be preferably used as well. The number of fluorine atoms in the fluorinated chain carbonate is not particularly restricted as long as it is one or more; however, it is usually 6 or less, preferably 4 or less. When the fluorinated chain carbonate has plural fluorine atoms, the fluorine atoms may be bound to the same carbon, or may be bound to different carbons. Examples of the fluorinated chain carbonate include fluorinated dimethyl carbonate derivatives, fluorinated ethyl methyl carbonate derivatives, and fluorinated diethyl carbonate derivatives.

Examples of the fluorinated dimethyl carbonate derivatives include fluoromethyl methyl carbonate, difluoromethyl methyl carbonate, trifluoromethyl methyl carbonate, bis(fluoromethyl)carbonate, bis(difluoro)methyl carbonate, and bis(trifluoromethyl)carbonate.

Examples of the fluorinated ethyl methyl carbonate derivatives include 2-fluoroethyl methyl carbonate, ethyl fluoromethyl carbonate, 2,2-difluoroethyl methyl carbonate, 2-fluoroethyl fluoromethyl carbonate, ethyl difluoromethyl carbonate, 2,2,2-trifluoroethyl methyl carbonate, 2,2-difluoroethyl fluoromethyl carbonate, 2-fluoroethyl difluoromethyl carbonate, and ethyl trifluoromethyl carbonate.

Examples of the fluorinated diethyl carbonate derivatives include ethyl-(2-fluoroethyl)carbonate, ethyl-(2,2-difluoroethyl)carbonate, bis(2-fluoroethyl)carbonate, ethyl-(2,2,2-trifluoroethyl)carbonate, 2,2-difluoroethyl-2'-fluoroethyl carbonate, bis(2,2-difluoroethyl)carbonate, 2,2,2-trifluoroethyl-2'-fluoroethyl carbonate, 2,2,2-trifluoroethyl-2',2'-difluoroethyl carbonate, and bis(2,2,2-trifluoroethyl)carbonate.

Any of the above-described chain carbonates may be used singly, or two or more thereof may be used in any combination at any ratio.

The content of a chain carbonate is not particularly restricted; however, it is usually not less than 15% by volume, preferably not less than 20% by volume, more preferably not less than 25% by volume, but usually 90% by volume or less, preferably 85% by volume or less, more preferably 80% by volume or less, with respect to a total solvent amount of the non-aqueous electrolyte solution. By controlling the content of the chain carbonate to be in this range, the viscosity of the non-aqueous electrolyte solution is kept in an appropriate range and a reduction in the ionic conductivity is inhibited, as a result of which the output characteristics of a non-aqueous electrolyte battery are likely to be attained in a favorable range. When two or more chain carbonates are used in combination, a total amount thereof should satisfy the above-described range.

Moreover, the battery performance can be markedly improved by incorporating a specific amount of ethylene carbonate in combination with a specific chain carbonate.

For example, when dimethyl carbonate and ethyl methyl carbonate are selected as specific chain carbonates, the content of ethylene carbonate is not particularly restricted and may be set arbitrarily as long as the effects of the present invention are not markedly impaired; however, it is usually not less than 15% by volume, preferably not less than 20% by volume, but usually 45% by volume or less, preferably 40% by volume or less, with respect to a total solvent amount of the non-aqueous electrolyte solution; the content of dimethyl carbonate is usually not less than 20% by volume, preferably not less than 30% by volume, but usually 50% by volume or less, preferably 45% by volume or less, with respect to a total solvent amount of the non-aqueous electrolyte solution; and the content of ethyl methyl carbonate is usually not less than 20% by volume, preferably not less than 30% by volume, but usually 50% by volume or less, preferably 45% by volume or less. By controlling the content values of ethylene carbonate, dimethyl carbonate, and ethyl methyl carbonate to be in the above-described respective ranges, excellent high-temperature stability is obtained and gas generation tends to be inhibited.

<1-4-3. Ether-Based Compound>

The ether-based compound is preferably a chain ether having 3 to 10 carbon atoms, or a cyclic ether having 3 to 6 carbon atoms.

Any of these ether-based compounds may be used singly, or two or more thereof may be used in any combination at any ratio.

The content of an ether-based compound is not particularly restricted and may be set arbitrarily as long as the effects of the present invention are not markedly impaired; however, it is usually not less than 1% by volume, preferably not less than 2% by volume, more preferably not less than 3% by volume, but usually 30% by volume or less, preferably 25% by volume or less, more preferably 20% by volume or less, in 100% by volume of the non-aqueous solvent. When two or more ether-based compounds are used in combination, a total amount thereof should satisfy the above-described range. As long as the content of the ether-based compound(s) is in the above-described preferred range, an ionic conductivity-improving effect of a chain ether, which is attributed to an increase in the degree of lithium ion dissociation and a reduction in the viscosity, is likely to be ensured. In addition, when a carbonaceous material is used as a negative electrode active material, the phenomenon of co-intercalation of a chain ether thereto along with lithium ions can be inhibited; therefore, the input-output characteristics and the charge-discharge rate characteristics can be attained in appropriate ranges.

<1-4-4. Sulfone-Based Compound>

The sulfone-based compound is not particularly restricted regardless of whether it is a cyclic sulfone or a chain sulfone. In the case of a cyclic sulfone, the number of its carbon atoms is usually 3 to 6, preferably 3 to 5, while in the case of a chain sulfone, the number of its carbon atoms is usually 2 to 6, preferably 2 to 5. The number of sulfonyl groups in one molecule of the sulfone-based compound is also not particularly restricted; however, it is usually 1 or 2.

Examples of the cyclic sulfone include: monosulfone compounds, such as trimethylene sulfones, tetramethylene sulfones, and hexamethylene sulfones; and disulfone compounds, such as trimethylene disulfones, tetramethylene disulfones, and hexamethylene disulfones. Thereamong, from the standpoints of the dielectric constant and the viscosity, tetramethylene sulfones, tetramethylene disulfones, hexamethylene sulfones and hexamethylene disulfones are more preferred, and tetramethylene sulfones (sulfolanes) are particularly preferred.

As the sulfolanes, sulfolane and sulfolane derivatives (hereinafter, may be simply referred to as "sulfolanes", including sulfolane) are preferred. As the sulfolane derivatives, those in which one or more hydrogen atoms bound to carbon atoms constituting a sulfolane ring are each substituted with a fluorine atom or an alkyl group are preferred.

Any of the above-described sulfone-based compounds may be used singly, or two or more thereof may be used in any combination at any ratio.

The content of a sulfone-based compound is not particularly restricted and may be set arbitrarily as long as the effects of the present invention are not markedly impaired; however, it is usually not less than 0.3% by volume, preferably not less than 0.5% by volume, more preferably not less than 1% by volume, but usually 40% by volume or less, preferably 35% by volume or less, more preferably 30% by volume or less, with respect to a total solvent amount of the non-aqueous electrolyte solution. When two or more sulfone-based compounds are used in combination, a total amount thereof should satisfy the above-described range. As long as the content of the sulfone-based compound(s) is in the above-described range, an electrolyte solution having excellent high-temperature storage stability tends to be obtained.

<1-4-5. Carboxylic Acid Ester>

The carboxylic acid ester is preferably a chain carboxylic acid ester, more preferably a saturated chain carboxylic acid ester. The carboxylic acid ester usually has a total of 3 to 7 carbon atoms and, from the standpoint of attaining an improvement in the battery characteristics that is attributed to an improvement in the output characteristics, a carboxylic acid ester having a total of 3 to 5 carbon atoms is preferably used.

Examples of the carboxylic acid ester include: saturated chain carboxylic acid esters, such as methyl acetate, ethyl acetate, methyl propionate, ethyl propionate, methyl pivalate, and ethyl pivalate; and unsaturated chain carboxylic acid esters, such as methyl acrylate, ethyl acrylate, methyl methacrylate, and ethyl methacrylate. Thereamong, methyl acetate, ethyl acetate, methyl propionate, ethyl propionate, methyl pivalate, and ethyl pivalate are preferred and, from the standpoint of improving the output characteristics, methyl acetate, ethyl acetate, methyl propionate, and ethyl propionate are more preferred. Any of these carboxylic acid esters may be used singly, or two or more thereof may be used in any combination at any ratio.

The content of a carboxylic acid ester is not particularly restricted, and may be set arbitrarily as long as the effects of the present invention are not markedly impaired; however, a lower limit thereof is usually not less than 3% by volume, preferably not less than 5% by volume, with respect to a total solvent amount of the non-aqueous electrolyte solution. By controlling the content of the carboxylic acid ester to be in this range, a decrease in the electrical conductivity caused by a reduction in the dielectric constant of the non-aqueous electrolyte solution is avoided, so that the high-current discharge characteristics, the stability to a negative electrode, and the cycle characteristics of a non-aqueous electrolyte battery are all likely to be obtained in favorable ranges. Meanwhile, an upper limit of the content of the carboxylic acid ester is usually 90% by volume or less, preferably 85% by volume or less, more preferably 80% by volume or less. By controlling the content of the carboxylic acid ester to be in this range, the resistance of the non-aqueous electrolyte solution against oxidation and reduction is improved, so that the stability during high-temperature storage tends to be improved.

It is noted here that, in the present invention, "° by volume" means a volume at 25° C. and 1 atm.

<1-5. Fluorosulfonate Other than $FSO_3Li$>

A counter cation of a fluorosulfonate other than $FSO_3Li$ (hereinafter, simply referred to as "fluorosulfonate") is not particularly restricted, and examples thereof include sodium, potassium, rubidium, cesium, magnesium, calcium, barium, and ammonium represented by $NR^{13}R^{14}R^{15}R^{16}$ wherein, $R^{13}$ to $R^{16}$ each independently represent a hydrogen atom or an organic group having 1 to 12 carbon atoms.

Specific examples of the fluorosulfonate include sodium fluorosulfonate, potassium fluorosulfonate, rubidium fluorosulfonate, and cesium fluorosulfonate.

Any of these fluorosulfonates may be used singly, or two or more thereof may be used in any combination at any ratio. With regard to a total content of a fluorosulfonate and $FSO_3Li$ with respect to the whole non-aqueous electrolyte solution of the present embodiment, it is usually not less than 0.001% by mass, preferably not less than 0.01% by mass, more preferably not less than 0.1% by mass, but usually 15% by mass or less, preferably 10% by mass or less, more preferably 5% by mass or less, still more preferably 3% by mass or less, especially preferably 2% by mass or less, particularly preferably 1% by mass or less, in 100% by mass of the non-aqueous electrolyte solution. When two or more fluorosulfonates are used in combination, a total amount of $FSO_3Li$ and the fluorosulfonates should satisfy the above-described range.

As long as the content of the fluorosulfonate(s) is in above-described range, swelling of a non-aqueous electrolyte battery caused by charging and discharging can be inhibited in a preferred manner.

<1-6. Auxiliary Agent>

The non-aqueous electrolyte solution of the present embodiment may also contain the following auxiliary agent within a range that the effects of the present invention are exerted.

Examples of the auxiliary agent include:

unsaturated cyclic carbonates, such as vinylene carbonate, vinylethylene carbonate, and ethynylethylene carbonate;

carbonate compounds, such as methoxyethyl methyl carbonate;

spiro compounds, such as methyl-2-propynyl oxalate;

sulfur-containing compounds, such as ethylene sulfite;

isocyanate compounds, for example, cycloalkylene group-containing diisocyanates such as 1,3-bis(isocyanatomethyl)cyclohexane;

nitrogen-containing compounds, such as 1-methyl-2-pyrrolidinone;

hydrocarbon compounds, such as cycloheptane;

fluorine-containing aromatic compounds, such as fluorobenzene;

silane compounds, such as tris(trimethylsilyl)borate;

ester compounds, such as 2-propynyl 2-(methanesulfonyloxy)propionate;

lithium salts, such as lithium ethylmethyloxycarbonyl phosphonate; and isocyanic acid esters, such as triallyl isocyanurate.

These auxiliary agents may be used singly, or in combination of two or more thereof. By adding these auxiliary agents, the capacity retention characteristics after high-temperature storage and the cycle characteristics can be improved.

The content of an auxiliary agent is not particularly restricted, and may be set arbitrarily as long as the effects of the present invention are not markedly impaired. The content of the auxiliary agent is usually not less than 0.01% by mass, preferably not less than 0.1% by mass, more preferably not less than 0.2% by mass, but usually 5% by mass or less, preferably 3% by mass or less, more preferably 1% by mass or less, with respect to a total amount of the non-aqueous electrolyte solution. As long as the content of the auxiliary agent is in this range, the effects of the auxiliary agent are likely to be expressed sufficiently, so that the high-temperature storage stability tends to be improved. When two or more auxiliary agents are used in combination, a total amount thereof should satisfy the above-described range.

<2. Non-Aqueous Electrolyte Battery>

The non-aqueous electrolyte battery according to one embodiment of the present invention is a non-aqueous electrolyte battery that includes: a positive electrode and a negative electrode which are capable of occluding and releasing metal ions; and a non-aqueous electrolyte solution which is the above-described non-aqueous electrolyte solution according to one embodiment of the present invention.

More specifically, the non-aqueous electrolyte battery according to one embodiment of the present invention includes: a positive electrode, which includes a current collector and a positive electrode active material layer arranged on the current collector and is capable of occluding and releasing metal ions; a negative electrode, which includes a current collector and a negative electrode active material layer arranged on the current collector and is capable of occluding and releasing metal ions; and a non-aqueous electrolyte solution which contains $FSO_3Li$ and at least one metal ion selected from the group consisting of (a) nickel ions, (b) cobalt ions, (c) copper ions, (d) manganese ions, and (e) aluminum ions, and satisfies at least one of the following conditions (i) to (v):

(i) the concentration of the (a) is 1 ppm by mass to 500 ppm by mass, (ii) the concentration of the (b) is 1 ppm by mass to 500 ppm by mass, (iii) the concentration of the (c) is 1 ppm by mass to 500 ppm by mass, (iv) the concentration of the (d) is 1 ppm by mass to 100 ppm by mass, and (v) the concentration of the (e) is 1 ppm by mass to 100 ppm by mass.

Particularly, the non-aqueous electrolyte battery according to the mode A of the present invention includes: a positive electrode, which includes a current collector and a positive electrode active material layer arranged on the current collector and is capable of occluding and releasing metal ions; a negative electrode, which includes a current collector and a negative electrode active material layer arranged on the current collector and is capable of occluding and releasing metal ions; and a non-aqueous electrolyte solution which contains $FSO_3Li$ and 1 ppm by mass to 500 ppm by mass of nickel ions.

Further, the non-aqueous electrolyte battery according to the mode B of the present invention includes: a positive electrode, which includes a current collector and a positive electrode active material layer arranged on the current collector and is capable of occluding and releasing metal ions; a negative electrode, which includes a current collector and a negative electrode active material layer arranged on the current collector and is capable of occluding and releasing metal ions; and a non-aqueous electrolyte solution which contains $FSO_3Li$ and 1 ppm by mass to 500 ppm by mass of cobalt ions.

Still further, the non-aqueous electrolyte battery according to the mode C of the present invention includes: a positive electrode, which includes a current collector and a positive electrode active material layer arranged on the current collector and is capable of occluding and releasing metal ions; a negative electrode, which includes a current collector and a negative electrode active material layer arranged on the current collector and is capable of occluding and releasing metal ions; and a non-aqueous electrolyte solution which contains $FSO_3Li$ and 1 ppm by mass to 500 ppm by mass of copper ions.

Yet still further, the non-aqueous electrolyte battery according to the mode D of the present invention includes: a positive electrode, which includes a current collector and a positive electrode active material layer arranged on the current collector and is capable of occluding and releasing metal ions; a negative electrode, which includes a current collector and a negative electrode active material layer arranged on the current collector and is capable of occluding and releasing metal ions; and a non-aqueous electrolyte solution which contains $FSO_3Li$ and 1 ppm by mass to 100 ppm by mass of manganese ions.

Yet still further, the non-aqueous electrolyte battery according to the mode E of the present invention includes: a positive electrode, which includes a current collector and a positive electrode active material layer arranged on the current collector and is capable of occluding and releasing metal ions; a negative electrode, which includes a current collector and a negative electrode active material layer arranged on the current collector and is capable of occluding and releasing metal ions; and a non-aqueous electrolyte solution which contains $FSO_3Li$ and 1 ppm by mass to 100 ppm by mass of aluminum ions.

<2-1. Battery Configuration>

The non-aqueous electrolyte battery of the present embodiment has the same configuration as that of a conventionally known non-aqueous electrolyte battery, except for the above-described non-aqueous electrolyte solution. The non-aqueous electrolyte battery usually has a form in which the positive electrode and the negative electrode are laminated via a porous membrane (separator) impregnated with the above-described non-aqueous electrolyte solution, and these components are housed in a casing (outer package). Accordingly, the shape of the non-aqueous electrolyte battery of the present embodiment is not particularly restricted and may be any of, for example, a cylindrical shape, a prismatic shape, a laminated shape, a coin shape, and a large-sized shape.

<2-2. Non-Aqueous Electrolyte Solution>

As the non-aqueous electrolyte solution, the above-described non-aqueous electrolyte solution according to one embodiment of the present invention is used. It is noted here that the above-described non-aqueous electrolyte solution can also be blended with other non-aqueous electrolyte solution within a range that does not depart from the gist of the present invention.

<2-3. Positive Electrode>

In one embodiment of the present invention, the positive electrode includes: a current collector; and a positive electrode active material layer arranged on the current collector.

The positive electrode used in the non-aqueous electrolyte battery of the present embodiment will now be described in detail.

<2-3-1. Positive Electrode Active Material>

First, a positive electrode active material used in the positive electrode will be described.

(1) Composition

The positive electrode active material is not particularly restricted as long as it is lithium cobaltate, or a transition metal oxide containing at least Ni and Co in which Ni and Co account for not less than 50% by mole of transition metals and which is capable of electrochemically occluding and releasing metal ions, and the positive electrode active material is preferably, for example, a transition metal oxide which is capable of electrochemically occluding and releasing lithium ions and contains lithium along with at least Ni and Co and in which Ni and Co account for not less than 60% by mole of transition metals. Ni and Co have a redox potential suitable for the use as positive electrode materials of a secondary battery, and are thus appropriate for high-capacity applications.

As metal components of such a lithium transition metal oxide, at least Ni or Co is contained as an indispensable transition metal element, and examples of other metal elements include Mn, V, Ti, Cr, Fe, Cu, Al, Mg, Zr, and Er, among which, for example, Mn, Ti, Fe, Al, Mg, and Zr are preferred. Specific examples of the lithium transition metal oxide include $LiCoO_2$, $LiNi_{0.85}Co_{0.5}Al_{0.50}O_2$, $LiNi_{0.80}Co_{0.15}Al_{0.05}O_2$, $LiNi_{0.33}Co_{0.33}Mn_{0.33}O_2$, $Li_{1.05}Ni_{0.33}Mn_{0.33}Co_{0.33}O_2$, $LiNi_{0.5}Co_{0.2}Mn_{0.3}O_2$, $Li_{1.05}Ni_{0.50}Mn_{0.29}Co_{0.21}O_2$, $LiNi_{0.6}Co_{0.2}Mn_{0.2}O_2$, and $LiNi_{0.8}Co_{0.1}Mn_{0.1}O_2$.

Especially, a mode in which the positive electrode active material is a transition metal oxide represented by the following composition formula (1) is preferred:

$$Li_{a1}Ni_{b1}Co_{c1}M_{d1}O_2 \quad (1)$$

wherein, a1, b1, c1, and d1 satisfy $0.90 \leq a1 \leq 1.10$, $0 < b1 < 0.4$, and $b1+c1+d1=1$; and M represents at least one element selected from the group consisting of Mn, Al, Mg, Zr, Fe, Ti, and Er.

In the composition formula (1), d1 preferably represents a numerical value of $0.1 \leq d1 < 0.5$.

By controlling the composition ratios of Ni, Co and other metal species to be used in the respective specific ranges, the transition metals are made unlikely to elute out of the positive electrode and, even if they did, Ni and Co would have only a small adverse effect in the non-aqueous secondary battery.

Especially, a mode in which the positive electrode active material is a transition metal oxide represented by the following composition formula (2) is preferred:

$$Li_{a2}Ni_{b2}Co_{c2}M_{d2}O_2 \quad (2)$$

wherein, a2, b2, c2, and d2 satisfy $0.90 \leq a2 \leq 1.10$, $0.4 \leq b2 < 1.0$, and $b2+c2+d2=1$; and M represents at least one element selected from the group consisting of Mn, Al, Mg, Zr, Fe, Ti, and Er.

In the composition formula (2), d2 preferably represents a numerical value of $0.10 \leq d2 < 0.40$, and b2 preferably represents a numerical value of $0.50 \leq b2 \leq 0.96$.

By allowing the lithium transition metal oxide to contain Ni and Co as main components and controlling the composition ratio of Ni to be higher than that of Co, a good stability can be attained and a high capacity can be extracted when the lithium transition metal oxide is used as a positive electrode of a non-aqueous electrolyte battery.

Especially, a mode in which the positive electrode active material is a transition metal oxide represented by the following composition formula (3) is preferred:

$$Li_{a3}Ni_{b3}Co_{c3}M_{d3}O_2 \quad (3)$$

wherein, a3, b3, c3, and d3 represent numerical values of $0.90 \leq a3 \leq 1.10$, $0.50 \leq b3 \leq 0.94$, $0.05 \leq c3 \leq 0.2$ and $0.01 \leq d3 \leq 0.3$, satisfying $b3+c3+d3=1$; and M represents at least one element selected from the group consisting of Mn, Al, Mg, Zr, Fe, Ti, and Er.

In the composition formula (3), d3 preferably represents a numerical value of $0.10 \leq d3 \leq 0.3$.

By allowing the positive electrode active material to have the above-described composition, a particularly high capacity can be extracted when it is used as a positive electrode of a non-aqueous secondary battery.

Two or more of the above-described positive electrode active materials may be used as a mixture. Similarly, at least one of the above-described positive electrode active materials and other positive electrode active material may be used as a mixture. Examples of the other positive electrode active material include transition metal oxides that are not mentioned above, transition metal phosphate compounds, transition metal silicate compounds, and transition metal borate compounds. Thereamong, lithium-manganese composite oxides having a spinel structure and lithium-containing transition metal phosphate compounds having an olivine structure are preferred. Specific examples of the lithium-manganese composite oxides having a spinel structure include $LiMn_2O_4$, $LiMn_{1.8}Al_{0.2}O_4$, and $LiMn_{1.5}Ni_{0.5}O_4$. These lithium-manganese composite oxides have most stable structures and are thus unlikely to release oxygen even in the event of malfunction of the non-aqueous electrolyte battery, providing excellent safety.

The transition metals of the lithium-containing transition metal phosphate compounds are preferably V, Ti, Cr, Mn, Fe, Co, Ni, Cu or the like, and specific examples of such compounds include: iron phosphates, such as $LiFePO_4$, $Li_3Fe_2(PO_4)_3$, and $LiFeP_2O_7$; cobalt phosphates, such as $LiCoPO_4$; manganese phosphates, such as $LiMnPO_4$; and these lithium transition metal phosphate compounds in which some of the transition metal atoms contained as a main constituent are substituted with other metal such as Al, Ti, V, Cr, Mn, Fe, Co, Li, Ni, Cu, Zn, Mg, Ga, Zr, Si, Nb, Mo, Sn, or W.

Among these lithium-containing transition metal phosphate compounds, a lithium iron phosphate compound is preferred since iron is not only abundant in terms of resource amount and thus an extremely cheap metal but also hardly hazardous. In other words, among the above-described specific examples, $LiFePO_4$ can be mentioned as a more preferred specific example.

In one embodiment of the present invention, the positive electrode is an NMC positive electrode. A mode in which the nickel element content in the NMC positive electrode is not less than 30% by mole is preferred and, from the standpoint of increasing the capacity of the non-aqueous electrolyte battery, a mode in which the nickel element content in the NMC positive electrode is not less than 40% by mole is more preferred.

The term "NMC positive electrode" used herein means a positive electrode in which a positive electrode active material is a material represented by the following Formula (I) that contains nickel, manganese, and cobalt (NMC):

$$Li_aNi_bCo_cMn_dO_2 \quad (I)$$

(wherein, a, b, c, and d satisfy $0.90 \leq a \leq 1.10$ and $b+c+d=1$).

(2) Surface Coating

The above-described positive electrode active material may be used in the form that a substance having a composition different from that of the substance mainly constituting the positive electrode active material is adhered to the surface (hereinafter, such a substance is referred to as "surface adhering substance" as appropriate). Examples of the surface adhering substance include: oxides, such as aluminum oxide, silicon oxide, titanium oxide, zirconium oxide, magnesium oxide, calcium oxide, boron oxide, antimony oxide, and bismuth oxide; sulfates, such as lithium sulfate, sodium sulfate, potassium sulfate, magnesium sulfate, calcium sulfate, and aluminum sulfate; carbonates, such as lithium carbonate, calcium carbonate, and magnesium carbonate; and carbon.

The surface adhering substances can be adhered to the surface of the positive electrode active material by, for example, a method in which the surface adhering substance is dissolved or suspended in a solvent, and the resulting solution or suspension is added to and impregnated into the positive electrode active material, followed by drying; a method in which a precursor of the surface adhering substance is dissolved or suspended in a solvent, and the resulting solution or suspension is added to and impregnated into the positive electrode active material and then allowed to react by heating or the like; or a method in which a precursor of the positive electrode active material is fired simultaneously with addition of the surface adhering substance thereto. For adhesion of carbon, a method of mechanically adhering a carbonaceous material afterward in the form of activated carbon or the like may be employed.

The mass of the surface adhering substance on the surface of the positive electrode active material is preferably not less than 0.1 ppm, more preferably not less than 1 ppm, still more preferably not less than 10 ppm, but preferably 20% or less, more preferably 10% or less, still more preferably 5% or less, with respect to the mass of the positive electrode active material.

The surface adhering substance can inhibit an oxidation reaction of the non-aqueous electrolyte solution on the surface of the positive electrode active material, so that the battery life can be extended. Further, when the amount of the surface adhering substance is in the above-described range, the effect thereof can be sufficiently expressed, and this makes the resistance unlikely to increase, without inhibiting the movement of lithium ions in and out of the positive electrode active material.

(3) Shape

The positive electrode active material may be in the form of particles. The particles of the positive electrode active material can have any conventionally used shape, such as a lump shape, a polyhedral shape, a spherical shape, an ellipsoidal shape, a plate shape, a needle shape, or a columnar shape. Further, primary particles may be aggregated to form secondary particles that have a spherical or ellipsoidal shape.

(4) Method of Producing Positive Electrode Active Material

A method of producing the positive electrode active material is not particularly restricted within a range that does not depart from the gist of the present invention. Examples thereof include several methods, and a general method of producing an inorganic compound may be employed.

Particularly, for the production of a spherical or ellipsoidal active material, a variety of methods can be considered. One example thereof is a method in which a transition metal raw material substance (e.g., a nitrate or sulfate of a transition metal) and, as required, a raw material substance of other element are dissolved, or pulverized and dispersed in a solvent such as water, the pH of the resulting solution or dispersion is adjusted with stirring to produce and recover a spherical precursor, and this precursor is subsequently dried as required, after which a Li source such as LiOH, $Li_2CO_3$, or $LiNO_3$ is added thereto and the resultant is fired at a high temperature to obtain an active material.

Another example is a method in which a transition metal raw material substance (e.g., a nitrate, sulfate, hydroxide, oxide or the like of a transition metal) and, as required, a raw material substance of other element are dissolved, or pulverized and dispersed in a solvent such as water, and the resulting solution or dispersion is dried and shaped using a spray dryer or the like to produce a spherical or ellipsoidal precursor, after which a Li source such as LiOH, $Li_2CO_3$, or $LiNO_3$ is added thereto and the resultant is fired at a high temperature to obtain an active material.

Yet another example is a method in which a transition metal raw material substance (e.g., a nitrate, sulfate, hydroxide, oxide or the like of a transition metal), a Li source (e.g., LiOH, $Li_2CO_3$, or $LiNO_3$) and, as required, a raw material substance of other element are dissolved, or pulverized and dispersed in a solvent such as water, and the resulting solution or dispersion is dried and shaped using a spray dryer or the like to produce a spherical or ellipsoidal precursor, after which this precursor is fired at a high temperature to obtain an active material.

<2-3-2. Constitution and Production Method of Positive Electrode>

The constitution of the positive electrode used in the present invention and a method of producing the positive electrode will now be described.

(Method of Producing Positive Electrode)

The positive electrode is produced by forming a positive electrode active material layer containing particles of the positive electrode active material and a binder on a current collector. Such production of the positive electrode using the positive electrode active material can be carried out by any known method. For example, a positive electrode active material layer is formed on a current collector by dry-mixing the positive electrode active material and a binder with, as required, a conductive material, a thickening agent and the like to form a sheet and subsequently press-bonding this sheet onto a positive electrode current collector, or by dissolving or dispersing these materials in a liquid medium to prepare a slurry and subsequently applying and drying this slurry onto a positive electrode current collector, whereby the positive electrode can be obtained.

The content of the positive electrode active material in the positive electrode active material layer is preferably not less than 60% by mass, more preferably not less than 70% by mass, still more preferably not less than 80% by mass, but preferably 99.9% by mass or less, more preferably 99% by mass or less. When the content of the positive electrode active material is in this range, the capacitance of the non-aqueous electrolyte battery can be sufficiently ensured. In addition, the resulting positive electrode has a sufficient strength. In the present embodiment, a single kind of positive electrode active material powder (particle) may be used alone, or two or more kinds of positive electrode active material powders (particles) having different compositions or physical properties may be used in any combination at any ratio. When two or more kinds of active materials are used in combination, it is preferred to use the above-described composite oxide containing lithium and manganese as a powder component. In large-sized batteries for automotive applications and the like where a large capacity is required and a large amount of active material is used, cobalt and nickel are not preferred from the cost standpoint since they are not abundant in terms of resource amount and are thus expensive metals. Therefore, in such large-sized batteries, it is desirable to use manganese, which is a less expensive transition metal, as a main component in the positive electrode active material.

<Conductive Material>

As the conductive material, any known conductive material can be used. Specific examples thereof include: metal materials, such as copper and nickel; and carbonaceous materials, for example, graphites such as natural graphites and artificial graphites, carbon blacks such as acetylene black, and amorphous carbon such as needle coke. Any of these conductive materials may be used singly, or two or more thereof may be used in any combination at any ratio.

The content of the conductive material in the positive electrode active material layer is preferably not less than 0.01% by mass, more preferably not less than 0.1% by mass, still more preferably not less than 1% by mass, but preferably 50% by mass or less, more preferably 30% by mass or less, still more preferably 15% by mass or less. When the content of the conductive material is in this range, a sufficient electrical conductivity can be ensured. In addition, a reduction in the battery capacity is likely to be inhibited.

<Binder>

The binder used in the production of the positive electrode active material layer is not particularly restricted as long as it is a material that is stable against the non-aqueous electrolyte solution and the solvent used in the electrode production.

When a coating method is employed, the binder is not particular restricted as long as it is a material that can be dissolved or dispersed in the liquid medium used in the electrode production, and specific examples of such a binder include: resin-based polymers, such as polyethylene, polypropylene, polyethylene terephthalate, polymethyl methacrylate, aromatic polyamides, cellulose, and nitrocellulose; rubbery polymers, such as SBR (styrene-butadiene rubbers), NBR (acrylonitrile-butadiene rubbers), fluororubbers, isoprene rubbers, butadiene rubbers, and ethylene-propylene rubbers; thermoplastic elastomeric polymers, such as styrene-butadiene-styrene block copolymers and hydrogenation products thereof, EPDM (ethylene-propylene-diene terpolymers), styrene-ethylene-butadiene-ethylene copolymers, and styrene-isoprene-styrene block copolymers and hydrogenation products thereof; soft resinous polymers, such as syndiotactic 1,2-polybutadiene, polyvinyl acetate, ethylene-vinyl acetate copolymers, and propylene-α-olefin copolymers; fluorine-based polymers, such as polyvinylidene fluoride (PVdF), polytetrafluoroethylene, fluorinated polyvinylidene fluoride, and tetrafluoroethylene-ethylene copolymers; and polymer compositions having ionic conductivity for alkali metal ions (particularly lithium ions). Any of these substances may be used singly, or two or more thereof may be used in any combination at any ratio.

The content of the binder in the positive electrode active material layer is preferably not less than 0.1% by mass, more preferably not less than 1% by mass, still more preferably not less than 3% by mass, but preferably 80% by mass or less, more preferably 60% by mass or less, still more preferably 40% by mass or less, particularly preferably 10% by mass or less. When the ratio of the binder is in this range, the positive electrode active material can be sufficiently retained, and the mechanical strength of the positive electrode can be ensured; therefore, favorable battery performance such as cycle characteristics are obtained. This also leads to avoidance of a reduction in the battery capacity and conductivity.

<Liquid Medium>

The type of the liquid medium used in the preparation of a slurry for forming the positive electrode active material layer is not particularly restricted as long as it is a solvent that is capable of dissolving or dispersing the positive electrode active material, the conductive material and the binder as well as the thickening agent used as required, and either an aqueous solvent or an organic solvent may be used.

Examples of the aqueous solvent include water, and a mixed solvent of alcohol and water. Examples of the organic solvent include: aliphatic hydrocarbons, such as hexane; aromatic hydrocarbons, such as benzene, toluene, xylene, and methylnaphthalene; heterocyclic compounds, such as quinoline and pyridine; ketones, such as acetone, methyl ethyl ketone, and cyclohexanone; esters, such as methyl acetate and methyl acrylate; amines, such as diethylenetriamine and N,N-dimethylaminopropylamine; ethers, such as diethyl ether and tetrahydrofuran (THF); amides, such as N-methylpyrrolidone (NMP), dimethylformamide, and dimethylacetamide; and aprotic polar solvents, such as hexamethylphosphoramide and dimethyl sulfoxide. Any of these solvents may be used singly, or two or more thereof may be used in any combination at any ratio.

<Thickening Agent>

When an aqueous solvent is used as the liquid medium for the formation of a slurry, it is preferred to prepare the slurry using a thickening agent and a latex such as a styrene-butadiene rubber (SBR). The thickening agent is usually used for the purpose of adjusting the viscosity of the resulting slurry.

The thickening agent is not particularly restricted as long as it does not markedly limit the effects of the present invention, and specific examples of the thickening agent include carboxymethyl cellulose, methyl cellulose, hydroxymethyl cellulose, ethyl cellulose, polyvinyl alcohol, oxidized starch, phosphorylated starch, casein, and salts thereof. Any of these thickening agents may be used singly, or two or more thereof may be used in any combination at any ratio.

In cases where a thickening agent is used, the ratio thereof with respect to the positive electrode active material is preferably not less than 0.1% by mass, more preferably not less than 0.5° by mass, still more preferably not less than 0.6% by mass, but preferably 5% by mass or lower, more preferably 3% by mass or lower, still more preferably 2% by mass or lower. When the ratio of the thickening agent is in this range, a favorable coating property is obtained, and the resulting positive electrode active material layer has a sufficient ratio of the active material; therefore, problems of a reduction in the battery capacity and an increase in the resistance between particles of the positive electrode active material are likely to be avoided.

<Consolidation>

The positive electrode active material layer obtained by applying and drying the above-described slurry onto a current collector is preferably consolidated by means of hand pressing, roller pressing or the like so as to increase the packing density of the positive electrode active material. The density of the positive electrode active material layer is preferably 1 $g \cdot cm^{-3}$ or higher, more preferably 1.5 $g \cdot cm^{-3}$ or higher, particularly preferably 2 $g \cdot cm^{-3}$ or higher, but preferably 4 $g \cdot cm^{-3}$ or lower, more preferably 3.5 $g \cdot cm^{-3}$ or lower, particularly preferably 3 $g \cdot cm^{-3}$ or lower.

When the density of the positive electrode active material layer is in this range, the permeability of the non-aqueous electrolyte solution to the vicinity of an interface between the current collector and the active material is not reduced, so that favorable charge-discharge characteristics are attained particularly at high current densities. In addition, neither a reduction in the conductivity between particles of the active material nor an increase in the battery resistance is likely to occur.

<Current Collector>

The material of the positive electrode current collector is not particularly restricted, and any known material can be used. Specific examples thereof include: metal materials, such as aluminum, stainless steel, nickel-plated steel, titanium, and tantalum; and carbonaceous materials, such as carbon cloth and carbon paper. Thereamong, a metal material, particularly aluminum, is preferred.

When the current collector is a metal material, the current collector may have any shape of, for example, a metal foil, a metal cylinder, a metal coil, a metal sheet, a metal thin film, an expanded metal, a punched metal, and a foamed metal and, when the current collector is a carbonaceous material, examples thereof include a carbon sheet, a carbon thin film, and a carbon cylinder. Thereamong, the current collector is preferably a metal thin film. This thin film may be in the form of a mesh as appropriate.

The current collector may have any thickness; however, the thickness is preferably 1 μm or greater, more preferably 3 μm or greater, still more preferably 5 μm or greater, but preferably 1 mm or less, more preferably 100 μm or less, still more preferably 50 μm or less. When the thickness of the current collector is in this range, a sufficient strength required as a current collector can be ensured. In addition, the current collector has good ease of handling.

The thickness ratio of the current collector and the positive electrode active material layer is not particularly restricted; however, the value of "(Thickness of active material layer on one side immediately before injection of non-aqueous electrolyte solution)/(Thickness of current collector)" is preferably 150 or smaller, more preferably 20 or smaller, particularly preferably 10 or smaller, but preferably 0.1 or larger, more preferably 0.4 or larger, particularly preferably 1 or larger. When the thickness ratio of the current collector and the positive electrode active material layer is in this range, heat generation by the current collector due to Joule's heat during high-current-density charging/discharging is unlikely to occur. In addition, the volume ratio of the current collector with respect to the positive electrode active material is hardly increased, so that a reduction in the battery capacity can be inhibited.

<Electrode Area>

From the standpoint of improving the stability under high-output and high-temperature conditions, the positive electrode active material layer preferably has a large area relative to the outer surface area of a battery outer casing. Specifically, a total area of the positive electrode is, in terms of area ratio, preferably 20 times or larger, more preferably 40 times or larger, with respect to the surface area of the outer casing of the non-aqueous electrolyte battery. The "outer surface area of outer casing" refers to, in the case of a closed-bottom prism-shaped casing, a total area calculated from the length, the width and the thickness of a portion of the casing that is filled with a power-generating element, excluding the projecting parts of terminals. In the case of a closed-bottom cylindrical casing, the "outer surface area of outer casing" refers to a geometric surface area determined by approximation of a portion of the casing that is filled with a power-generating element, excluding the projecting parts of terminals, to a cylinder. The "total area of the positive electrode", which is a geometric surface area of a positive electrode mixture layer facing a mixture layer containing a negative electrode active material, refers to a sum of the areas that are separately calculated for each side in a structure in which positive electrode layer mixture layers are formed on both sides via a current collector foil.

<Discharge Capacity>

When the above-described non-aqueous electrolyte solution is used, the capacitance of the elements of the non-aqueous electrolyte battery that are housed in a single battery casing (the capacitance measured in the course of discharging the battery from a fully-charged state to a discharged state) is preferably 1 ampere hour (Ah) or higher since this leads to an enhanced effect of improving the low-temperature discharge characteristics. Accordingly, a positive electrode plate is designed to have a discharge capacity of preferably 3 Ah (ampere hour) or higher, more preferably 4 Ah or higher, but preferably 100 Ah or less, more preferably 70 Ah or less, particularly preferably 50 Ah or less, in a fully-charged state.

When the discharge capacity is in this range, a voltage drop caused by electrode reaction resistance during extraction of a large current is not overly large, so that a reduction in the power efficiency can be inhibited. In addition, since the temperature distribution caused by internal heat generation of the battery during pulse charging and discharging is not excessively wide, phenomena of deterioration in the durability against repeated charging and discharging and a reduction in the heat dissipation efficiency against abrupt heat generation in the event of a defect such as overcharging or internal short-circuiting can be avoided.

<Thickness of Positive Electrode Plate>

The thickness of the positive electrode plate is not particularly restricted; however, from the standpoint of attaining a high capacity and a high output as well as excellent rate characteristics, the thickness of the positive electrode active material layer excluding the thickness of the current collector is preferably 10 μm or greater, more preferably 20 μm or greater, but preferably 200 μm or less, more preferably 100 μm or less, on one side of the current collector.

<2-4. Negative Electrode>

In one embodiment of the present invention, the negative electrode includes: a current collector; and a negative electrode active material layer arranged on the current collector.

A negative electrode active material used in the negative electrode will now be described. The negative electrode active material is not particularly restricted as long as it is capable of electrochemically occluding and releasing metal ions. Specific examples thereof include: materials containing carbon as a constituent element, such as carbonaceous materials; and alloy-based materials. Any of these materials may be used singly, or two or more thereof may be used in any combination.

<2-4-1. Negative Electrode Active Material>

As described above, the negative electrode active material is, for example, a carbonaceous material or an alloy-based material.

Examples of the carbonaceous material include (1) natural graphite, (2) artificial graphite, (3) amorphous carbon, (4) carbon-coated graphite, (5) graphite-coated graphite, and (6) resin-coated graphite.

Examples of the (1) natural graphite include scaly graphite, flake graphite, earthy graphite, and graphite particles obtained by performing a treatment, such as spheronization or densification, on any of these graphites as a raw material. Thereamong, a spherical or ellipsoidal graphite obtained by a spheronization treatment is particularly preferred from the standpoints of the packing property of its particles and the charge-discharge rate characteristics.

For the spheronization treatment, for example, an apparatus that repeatedly applies mechanical actions, such as compression, friction, shearing force and the like including particle interactions, mainly through impact force to particles can be used.

Specifically, it is preferred to use an apparatus which is equipped with a rotor having a large number of blades inside a casing and performs a spheronization treatment by rotating the rotor at a high speed and thereby applying mechanical actions, such as impact compression, friction and shearing force, to a raw material of the natural graphite (1) introduced to the inside. An apparatus that has a mechanism for repeatedly applying mechanical actions by circulation of the raw material is also preferred.

For example, when a spheronization treatment is performed using the above-described apparatus, the peripheral speed of the rotating rotor is set at preferably 30 to 100 m/sec, more preferably 40 to 100 m/sec, still more preferably 50 to 100 m/sec. The spheronization treatment can be performed by simply passing the raw material through the apparatus; however, it is preferred to perform the treatment by circulating or retaining the raw material in the apparatus for at least 30 seconds, and it is more preferred to perform the treatment by circulating or retaining the raw material in the apparatus for 1 minute or longer.

Examples of the (2) artificial graphite include those produced by graphitizing an organic compound, such as coal-tar pitch, a coal-based heavy oil, an atmospheric residue oil, a petroleum-based heavy oil, an aromatic hydrocarbon, a nitrogen-containing cyclic compound, a sulfur-containing cyclic compound, a polyphenylene, a polyvinyl chloride, a polyvinyl alcohol, a polyacrylonitrile, a polyvinyl butyral, a natural polymer, a polyphenylene sulfide, a polyphenylene oxide, a furfuryl alcohol resin, a phenol-formaldehyde resin or an imide resin, at a temperature in a range of usually 2,500° C. to 3,200° C., followed by pulverization and/or classification as required.

In this process, a silicon-containing compound, a boron-containing compound or the like can be used as a graphitization catalyst. Examples of the (2) artificial graphite also include those obtained by graphitizing mesocarbon microbeads separated in a pitch heat treatment process. Another example is an artificial graphite of granulated particles composed of primary particles. Examples of such an artificial graphite include graphite particles in which plural flat particles are aggregated or bound with each other such that their orientation planes are not parallel, which flat particles are obtained by, for example, mixing graphitizable carbonaceous material powder (e.g., mesocarbon microbeads or coke powder) with a graphitizable binder (e.g., tar or pitch) and a graphitization catalyst to perform graphitization, followed by pulverization of the resultant as required.

Examples of the (3) amorphous carbon include: amorphous carbon particles obtained by heat-treating an easily graphitizable carbon precursor used as a raw material, such as tar or pitch, at least once in a temperature range where graphitization does not occur (in a range of 400 to 2,200° C.); and amorphous carbon particles obtained by heat-treating a hardly graphitizable carbon precursor used as a raw material, such as a resin.

Examples of the (4) carbon-coated graphite include those obtained in the following manner. A natural graphite and/or an artificial graphite is/are mixed with a carbon precursor, which is an organic compound such as tar, pitch or a resin, and the resulting mixture is heat-treated at least once in a range of 400 to 2,300° C. Using the thus heat-treated natural graphite and/or artificial graphite as core graphite, a carbon-graphite composite is obtained by coating the core graphite with amorphous carbon. This carbon-graphite composite is exemplified as the (4) carbon-coated graphite.

The above-described composite may take a form in which the surface of the core graphite is entirely or partially coated with amorphous carbon, or a form in which plural primary particles are combined using carbon derived from the above-described carbon precursor as a binder. Alternatively, the carbon-graphite composite can be obtained by allowing a natural graphite and/or an artificial graphite to react with a hydrocarbon gas, such as benzene, toluene, methane, propane, or an aromatic volatile component, at a high temperature and thereby depositing carbon on the graphite surface (CVD).

Examples of the (5) graphite-coated graphite include those obtained in the following manner. A natural graphite and/or an artificial graphite is/are mixed with a carbon precursor, which is an easily graphitizable organic compound such as tar, pitch or a resin, and the resulting mixture is heat-treated at least once in a range of 2,400 to 3,200° C. Using the thus heat-treated natural graphite and/or artificial graphite as core graphite, the (5) graphite-coated graphite is obtained by entirely or partially coating the surface of the core graphite with a graphitized product.

The (6) resin-coated graphite is obtained by, for example, coating a core graphite, which is obtained by mixing a natural graphite and/or an artificial graphite with a resin or the like and then drying the resulting mixture at a temperature of lower than 400° C., with a resin or the like.

Any of the above-described carbonaceous materials of (1) to (6) may be used singly, or two or more thereof may be used in any combination at any ratio.

The organic compound such as tar, pitch or a resin that is used in the above-described carbonaceous materials of (2) to (5) is, for example, a carbonizable organic compound selected from the group consisting of coal-based heavy oils, straight-run heavy oils, cracked petroleum heavy oils, aromatic hydrocarbons, N-ring compounds, S-ring compounds, polyphenylenes, organic synthetic polymers, natural polymers, thermoplastic resins, and thermosetting resins. In order to adjust the viscosity during mixing, the raw material organic compound may be used in the form of being dissolved in a low-molecular-weight organic solvent.

As the natural graphite and/or artificial graphite used as a raw material of the core graphite, a natural graphite which has been subjected to a spheronization treatment is preferred.

Next, the above-described alloy-based material used as the negative electrode active material is not particularly restricted as long as it is capable of occluding and releasing lithium ions, and may be simple lithium, a lithium alloy-forming simple metal or alloy thereof, or any compound thereof such as an oxide, a carbide, a nitride, a silicide, a sulfide, or a phosphide. The lithium alloy-forming simple metal or alloy thereof is preferably a material containing a metal or metalloid element of the periodic table Group 13 or 14 (i.e. excluding carbon), more preferably a simple metal of aluminum, silicon or tin, or an alloy or compound that contains these atoms, still more preferably a compound containing silicon or tin as a constituent element, such as a simple metal of silicon or tin, or an alloy or compound that contains these atoms.

Any of these materials may be used singly, or two or more thereof may be used in any combination at any ratio.

<Metal Particles Alloyable with Li>

When a lithium alloy-forming simple metal or an alloy thereof, or any compound thereof such as an oxide, a carbide, a nitride, a silicide, a sulfide, or a phosphide is used as the negative electrode active material, the metal alloyable with Li is in the form of particles. Examples of a method for confirming that the metal particles are alloyable with Li include identification of a metal particle phase by X-ray diffractometry, observation of the particle structure under an electron microscope, EDX elemental analysis, and elemental analysis with fluorescent X-ray.

As the metal particles alloyable with Li, any conventionally known such metal particles can be used; however, from the standpoints of the capacity and the cycle life of the non-aqueous electrolyte battery, the metal particles are preferably particles of, for example, a metal selected from the group consisting of Fe, Co, Sb, Bi, Pb, Ni, Ag, Si, Sn, Al, Zr, Cr, P, S, V, Mn, As, Nb, Mo, Cu, Zn, Ge, In, Ti and W, or a compound thereof. Further, the metal particles may be alloy particles formed by two or more metal elements. Thereamong, particles of a metal selected from the group consisting of Si, Sn, As, Sb, Al, Zn and W, or a metal compound thereof are preferred.

Examples of the metal compound include metal oxides, metal nitrides, and metal carbides. An alloy composed of two or more metals may be used as well.

Among these metal particles alloyable with Li, from the standpoint of increasing the battery capacity, Si or an Si metal compound is preferred. The Si metal compound is preferably an Si metal oxide. In the present specification, Si and an Si metal compound are collectively referred to as "Si compound". Specific examples of an Si compound include $SiO_x$, $SiN_x$, $SiC_x$, and $SiZ_xO_y$ (wherein, Z=C or N). The Si compound is preferably an Si metal oxide which is represented by a general formula $SiO_x$. A compound represented by this general formula $SiO_x$ is obtained using silicon dioxide ($SiO_2$) and metal silicon (Si) as raw materials, and the value of x is usually 0<x<2. $SiO_x$ has a higher theoretical capacity than graphite, and amorphous Si or nano-sized Si crystals facilitate the migration of alkali ions such as lithium ions, so that a high-capacity battery can be obtained.

Specifically, a Si metal oxide is represented by $SiO_x$, wherein x is 0≤x<2, more preferably 0.2 to 1.8, still more preferably 0.4 to 1.6, particularly preferably 0.6 to 1.4. When x is in this range, the battery has a high capacity and, at the same time, the irreversible capacity attributed to binding between Li and oxygen can be reduced.

<Oxygen Content of Metal Particles Alloyable with Li>

The oxygen content of the metal particles alloyable with Li is not particularly restricted; however, it is usually 0.01% by mass to 8% by mass, preferably 0.05% by mass to 5% by mass. As for the distribution state of oxygen in the particles, oxygen may exist in the vicinity of the surface or in the interior of the particles, or may uniformly exist throughout the particles; however, it is particularly preferred that oxygen exist in the vicinity of the surface. When the oxygen content of the metal particles alloyable with Li is in the above-described range, an increase in the volume of the non-aqueous electrolyte battery associated with secondary charging and discharging is inhibited because of strong bonds between the metal particles and O (oxygen atoms), so that the non-aqueous electrolyte battery can be provided with excellent cycle characteristics, which is preferred.

<Negative Electrode Active Material that Contain Metal Particles Alloyable with Li and Graphite Particles>

The negative electrode active material may contain metal particles alloyable with Li, and graphite particles. This negative electrode active material may be a mixture in which the metal particles alloyable with Li and the graphite particles are mixed in a state of mutually independent particles, or may be a composite in which the metal particles alloyable with Li exist on the surface of the graphite particles and/or inside the graphite particles.

The composite of metal particles alloyable with Li and graphite particles (hereinafter, also referred to as "composite particles") is not particularly restricted as long as it contains metal particles alloyable with Li and graphite particles in particular; however, the composite particles are preferably particles in which the metal particles alloyable with Li and the graphite particles are integrated together by physical and/or chemical bonds. In a more preferred form, the metal particles alloyable with Li and the graphite particles are in a state where their solid components are dispersed in the composite particles to such an extent that allows them to exist at least both on the surface of the composite particles and inside of the bulk, and the graphite particles exist in a manner to integrate the solid components via physical and/or chemical bonds. In a still more preferred form, the composite is a composite material (negative electrode active material) which is constituted by at least metal particles alloyable with Li and graphite particles, and in which the graphite particles, preferably natural graphite exist inside particles having a folded structure with a curved surface, and the metal particles alloyable with Li exist in gaps inside the structure. The gaps may be voids, and a substance that mitigates expansion and contraction of the metal particles alloyable with Li, such as amorphous carbon, a graphitic material or a resin, may exist in the gaps.

<Content Ratio of Metal Particles Alloyable with Li>

The content ratio of the metal particles alloyable with Li is usually 0.1% by mass or higher, preferably 0.5% by mass or higher, more preferably 1.0% by mass or higher, still more preferably 2.0% by mass or higher, but usually 99% by mass or lower, preferably 50% by mass or lower, more preferably 40% by mass or lower, still more preferably 30% by mass or lower, yet still more preferably 25% by mass or lower, yet still more preferably 20% by mass or lower, particularly preferably 15% by mass or lower, most preferably 10% by mass or lower, with respect to a total amount of the metal particles alloyable with Li and the graphite particles. When the content ratio of the metal particles alloyable with Li is in this range, side reactions on the Si surface can be controlled, so that the non-aqueous electrolyte battery can attain a sufficient capacity, which is preferred.

<Coverage>

In the present embodiment, the negative electrode active material may be covered with a carbonaceous material or a graphitic material. Particularly, from the standpoint of the lithium ion acceptability, the negative electrode active material is preferably covered with an amorphous carbonaceous material. The coverage is usually 0.5% to 30%, preferably 1% to 25%, more preferably 2% to 20%. It is preferred that an upper limit of the coverage be in this range from the standpoint of the reversible capacity when the negative electrode active material is incorporated into a battery, while a lower limit of the coverage be in this range from the standpoint of allowing the carbonaceous material serving as a core to be uniformly coated with amorphous carbon and thereby achieving strong granulation as well as from the standpoint of the size of the particles obtained by post-firing pulverization.

The coverage (content ratio) of a carbide derived from an organic compound of the ultimately obtained negative electrode active material can be calculated by the following formula based on the amount of the negative electrode active material, the amount of the organic compound, and the residual carbon ratio determined by the micro method according to JIS K2270.

Coverage (%) of carbide derived from organic compound=(Mass of organic compound×Residual carbon ratio×100)/{Mass of negative electrode active material+(Mass of organic compound×Residual carbon ratio)}

<Internal Porosity>

The internal porosity of the negative electrode active material is usually 1% or higher, preferably 3% or higher, more preferably 5% or higher, still more preferably 7% or higher, but usually lower than 50%, preferably 40% or lower, more preferably 30% or lower, still more preferably 20% or lower. When the internal porosity is excessively low, the liquid amount inside the particles of the negative electrode active material in the non-aqueous electrolyte battery tends to be small. Meanwhile, an excessively high internal porosity tends to result in a small amount of gaps between the particles when the negative electrode active material is used as an electrode. It is preferred that the lower limit of the internal porosity be in the above-described range from the standpoint of the charge-discharge characteristics, while the upper limit of the internal porosity be in the above-described range from the standpoint of diffusion of the non-aqueous electrolyte solution. Further, as described above, the gaps may be voids, and a substance that mitigates expansion and contraction of the metal particles alloyable with Li, such as amorphous carbon, a graphitic material or a resin, may exist in the gaps, or the gaps may be filled with such a substance.

<2-4-2. Constitution and Production Method of Negative Electrode>

For the production of the negative electrode, any known method can be employed as long as it does not markedly impair the effects of the present invention. For example, a binder, a solvent and, as required, a thickening agent, a conductive material, a filler and the like are added to the negative electrode active material to prepare a slurry, and this slurry is subsequently coated and dried onto a current collector, followed by pressing of the resultant, whereby the negative electrode can be formed.

Further, a negative electrode made of an alloy-based material can also be produced by any known method. Specifically, examples of a method of producing the negative electrode include: a method of producing a sheet electrode by adding a binder, a conductive material and the like to the above-described negative electrode active material and then directly roll-molding the resulting mixture; and a method of producing a pellet electrode by compression-molding the mixture; however, a method of forming a thin film layer containing the above-described negative electrode active material (negative electrode active material layer) on a current collector for negative electrode (hereinafter, may be referred to as "negative electrode current collector") by means of coating, vapor deposition, sputtering, plating or the like is usually employed. In this case, a binder, a thickening agent, a conductive material, a solvent and the like are added to the above-described negative electrode active material to prepare a slurry, and this slurry is coated and dried onto a negative electrode current collector, after which the resultant is pressed to increase the density, whereby a negative electrode active material layer is formed on the negative electrode current collector.

Examples of the material of the negative electrode current collector include steel, copper, a copper alloy, nickel, a nickel alloy, and stainless steel. Thereamong, copper is preferred from the standpoints of the ease of processing into a thin film and the cost, and it is more preferred to use a copper foil.

The thickness of the negative electrode current collector is usually 1 μm or greater, preferably 5 μm or greater, but usually 100 μm or less, preferably 50 μm or less. This is because an overly thick negative electrode current collector may cause an excessive reduction in the capacity of the whole non-aqueous electrolyte battery, while an overly thin negative electrode current collector may be difficult to handle.

The surface of the negative electrode current collector is preferably subjected to a roughening treatment in advance for the purpose of improving its binding with the negative electrode active material layer formed thereon. Examples of a surface roughening method include: blasting; rolling with a surface-roughened roll; mechanical polishing in which the current collector surface is polished with a polishing cloth or paper on which abrasive particles are fixed, a whetstone, an emery buff, or a wire brush equipped with steel wires or the like; electrolytic polishing; and chemical polishing.

Alternatively, in order to reduce the mass of the negative electrode current collector and thereby increase the energy density of the battery per unit mass, a perforated negative electrode current collector in the form of an expanded metal or a punched metal can be used as well. In the negative electrode current collector of this type, the mass can be modified as desired by changing its opening ratio. In addition, when a negative electrode active material layer is formed on both sides of the negative electrode current collector of this type, a riveting effect through perforations makes the negative electrode active material layer unlikely to be detached. However, an excessively high opening ratio rather reduces the adhesive strength due to a small contact surface area between the negative electrode active material layer and the negative electrode current collector.

The slurry used for the formation of the negative electrode active material layer is usually prepared by adding a binder, a thickening agent and the like to a negative electrode material. It is noted here that the term "negative electrode material" used herein refers to a material obtained by combining a negative electrode active material and a conductive material.

In the negative electrode material, the content of the negative electrode active material is usually not less than 70% by mass, particularly not less than 75% by mass, but usually 97% by mass or less, particularly preferably 95% by mass or less. When the content of the negative electrode active material is excessively low, the capacity of a secondary battery using the resulting negative electrode tends to be insufficient, whereas when the content of the negative electrode active material is excessively high, a relatively insufficient amount of the conductive material tends to make it difficult to ensure the resulting negative electrode to have an adequate conductivity. In the case of using two or more negative electrode active materials in combination, a total amount of the negative electrode active materials should satisfy the above-described range.

Examples of the conductive material used in the negative electrode include: metal materials, such as copper and nickel; and carbon materials, such as graphite and carbon black. Any of these conductive materials may be used singly, or two or more thereof may be used in any combination at any ratio. Particularly, it is preferred to use a carbon material as the conductive material since the carbon material also acts as an active material. The content of the conductive material in the negative electrode material is usually not less than 3% by mass, particularly preferably not less than 5% by mass, but usually 30% by mass or less, preferably 25% by mass or less. An excessively low content of the conductive material tends to make the conductivity insufficient, while an excessively high content of the conductive material tends to result in a reduction in the battery capacity and strength due to a relatively insufficient amount of the negative electrode active material and the like. In the case of using two or more conductive materials in combination, a total amount of the conductive materials should satisfy the above-described range.

The binder used in the negative electrode may be any binder as long as it is a material that is stable against the solvent and the electrolyte solution that are used in the electrode production. Examples of the binder include polyvinylidene fluoride, polytetrafluoroethylene, polyethylene, polypropylene, styrene-butadiene rubbers, isoprene rubbers, butadiene rubbers, ethylene-acrylic acid copolymers, and ethylene-methacrylic acid copolymers. Any of these binders may be used singly, or two or more thereof may be used in any combination at any ratio. The content of the binder is usually not less than 0.5 parts by mass, preferably not less than 1 part by mass, but usually 10 parts by mass or less, preferably 8 parts by mass or less, with respect to 100 parts by mass of the negative electrode material. When the content of the binder is excessively low, the strength of the resulting negative electrode tends to be insufficient, whereas when the content of the binder is excessively high, the battery capacity and conductivity tend to be insufficient due to a relatively insufficient amount of the negative electrode active material and the like. In the case of using two or more binders in combination, a total amount of the binders should satisfy the above-described range.

Examples of the thickening agent used in the negative electrode include carboxymethyl cellulose, methyl cellulose, hydroxymethyl cellulose, ethyl cellulose, polyvinyl alcohol, oxidized starch, phosphorylated starch, and casein. Any of these thickening agents may be used singly, or two or more thereof may be used in any combination at any ratio. The thickening agent may be used as required; however, when used, usually, the content thereof in the negative electrode active material layer is preferably in a range of 0.5% by mass to 5% by mass.

The slurry used for the formation of the negative electrode active material layer is prepared by mixing the above-described negative electrode active material with a conductive material, a binder and a thickening agent as required, using an aqueous solvent or an organic solvent as a dispersion medium. Water is usually used as the aqueous solvent; however, an organic solvent, for example, an alcohol such as ethanol or a cyclic amide such as N-methylpyrrolidone, can also be used in combination in a range of 30% by mass or less with respect to water. Examples of the organic solvent usually include: cyclic amides, such as N-methylpyrrolidone; linear amides, such as N,N-dimethylformamide and N,N-dimethylacetamide; aromatic hydrocarbons, such as anisole, toluene, and xylene; and alcohols, such as butanol and cyclohexanol, among which cyclic amides such as N-methylpyrrolidone, and linear amides such as N,N-dimethylformamide and N,N-dimethylacetamide are preferred. Any of these organic solvents may be used singly, or two or more thereof may be used in any combination at any ratio.

The resulting slurry is coated and dried onto the above-described negative electrode current collector, and the resultant is subsequently pressed to form a negative electrode active material layer, whereby a negative electrode is obtained. A coating method is not particularly restricted, and any known method can be employed. A drying method is also not particularly restricted, and any known method such as air drying, heat drying, or vacuum drying can be employed.

<Electrode Density>

The structure of an electrode formed from the negative electrode active material is not particularly restricted, and the density of the negative electrode active material existing on the current collector is preferably 1 $g\cdot cm^{-3}$ or higher, more preferably 1.2 $g\cdot cm^{-3}$ or higher, particularly preferably 1.3 $g\cdot cm^{-3}$ or higher, but preferably 2.2 $g\cdot cm^{-3}$ or lower, more preferably 2.1 $g\cdot cm^{-3}$ or lower, still more preferably 2.0 $g\cdot cm^{-3}$ or lower, particularly preferably 1.9 $g\cdot cm^{-3}$ or lower. When the density of the negative electrode active material existing on the current collector is higher than this range, particles of the negative electrode active material may be destructed to cause an increase in the initial irreversible capacity of the non-aqueous electrolyte battery and a reduction in the permeability of the non-aqueous electrolyte solution to the vicinity of the interface between the current collector and the negative electrode active material, as a result of which the high-current-density charge-discharge characteristics may be deteriorated. Meanwhile, when the density of the negative electrode active material is lower than the above-described range, the conductivity between the particles of the negative electrode active material is reduced and the battery resistance is thus increased, as a result of which the capacity per unit volume may be reduced.

<2-5. Separator>

A separator is usually arranged between the positive electrode and the negative electrode for the purpose of inhibiting a short circuit. In this case, the separator is usually impregnated with the non-aqueous electrolyte solution of the present invention.

The material and the shape of the separator are not particularly restricted, and any known material and shape can be employed as long as the separator does not markedly impair the effects of the present invention. Particularly, a separator formed from a material stable against the non-aqueous electrolyte solution of the present invention, such as a resin, a glass fiber or an inorganic material, can be preferably used, and it is preferred to use a separator in the form of, for example, a porous sheet or nonwoven fabric that has excellent liquid retainability.

As the material of a resin or glass fiber separator, for example, polyolefins such as polyethylene and polypropylene, polytetrafluoroethylenes, polyether sulfones, and glass filters can be used. Thereamong, glass filters and polyolefins are preferred, and polyolefins are more preferred. Any of these materials may be used singly, or two or more thereof may be used in any combination at any ratio.

The separator may have any thickness; however, the thickness is usually 1 μm or greater, preferably 5 μm or greater, more preferably 10 μm or greater, but usually 50 μm or less, preferably 40 μm or less, more preferably 30 μm or less. When the separator is overly thinner than this range, the insulation and the mechanical strength may be reduced. Meanwhile, when the separator is overly thicker than this range, not only the battery performance such as the rate characteristics may be deteriorated, but also the energy density of the non-aqueous electrolyte battery as a whole may be reduced.

In cases where a porous material such as a porous sheet or a nonwoven fabric is used as the separator, the porosity of the separator may be set arbitrarily; however, it is usually 20% or higher, preferably 35% or higher, more preferably 45% or higher, but usually 90% or lower, preferably 85% or lower, more preferably 75% or lower. When the porosity is overly lower than this range, the membrane resistance is increased, and this tends to deteriorate the rate characteristics. Meanwhile, when the porosity is overly higher than this range, the mechanical strength and the insulation of the separator tend to be reduced.

The average pore size of the separator may also be set arbitrarily; however, it is usually 0.5 μm or smaller, preferably 0.2 μm or smaller, but usually 0.05 μm or larger. When the average pore size is larger than this range, a short circuit is likely to occur. Meanwhile, when the average pore size is smaller than this range, the membrane resistance is increased, and this may lead to deterioration of the rate characteristics.

As the material of an inorganic separator, for example, an oxide such as alumina or silicon dioxide, a nitride such as aluminum nitride or silicon nitride, or a sulfate such as barium sulfate or calcium sulfate is used.

With regard to the shape of the separator to be used, the separator may have a shape of a thin film, such as a nonwoven fabric, a woven fabric or a microporous film. As a thin-film separator, one having a pore size of 0.01 to 1 μm and a thickness of 5 to 50 μm is preferably used. Aside from such an independent thin-film separator, a separator obtained by forming a composite porous layer that contains an inorganic material in the form of particles or fibers on the surface layer of the positive electrode and/or the negative electrode using a resin binder can be used. For example, a porous layer containing alumina particles having a 90% particle size of smaller than 1 μm may be formed on both sides of the positive electrode using a fluorine resin as a binder.

<2-6. Battery Design>

[Electrode Group]

An electrode group may have either a layered structure in which the above-described positive electrode plate and negative electrode plate are layered with the above-described separator being interposed therebetween, or a wound structure in which the above-described positive electrode plate and negative electrode plate are spirally wound with the above-described separator being interposed therebetween. The volume ratio of the electrode group with respect to the internal volume of the battery (this volume ratio is hereinafter referred to as “electrode group occupancy”) is usually 40% or higher, preferably 50% or higher, but usually 90% or lower, preferably 80% or lower. From the standpoint of the battery capacity, a lower limit of the electrode group occupancy is preferably set in this range. Further, from the standpoint of the various properties of the battery, such as the repeated charge-discharge performance and the high-temperature storage characteristics, as well as from the standpoint of avoiding activation of a gas release valve that relieves the internal pressure to the outside, an upper limit of the electrode group occupancy is preferably set in this range so as to ensure a sufficient gap space. When the amount of gap space is excessively small, there are cases where an increase in the battery temperature causes swelling of members and increases the vapor pressure of an electrolyte liquid component, as a result of which the internal pressure is increased to deteriorate the various properties of the battery, such as the repeated charge-discharge performance and the high-temperature storage characteristics, and to activate a gas release valve that relieves the internal pressure to the outside.

[Current Collector Structure]

A current collector structure is not particularly restricted; however, in order to more effectively realize an improvement in the discharge characteristics attributed to the above-described non-aqueous electrolyte solution, it is preferred to adopt a structure that reduces the resistance of wiring and joint parts. By reducing the internal resistance in this manner, the effects of using the above-described non-aqueous electrolyte solution are particularly favorably exerted.

In an electrode group having the above-described layered structure, the metal core portions of the respective electrode layers are preferably bundled and welded to a terminal. When the area of one electrode is large, the internal resistance is high; therefore, it is also preferred to reduce the resistance by arranging plural terminals in each electrode. In an electrode group having the above-described wound structure, the internal resistance can be reduced by arranging plural lead structures on each of the positive electrode and the negative electrode and bundling them to a terminal.

[Protective Element]

Examples of a protective element include a PTC (Positive Temperature Coefficient) element whose resistance increases in the event of abnormal heat generation or excessive current flow, a thermal fuse, a thermistor, and a valve (current cutoff valve) that blocks a current flowing into a circuit in response to a rapid increase in the battery internal pressure or internal temperature in the event of abnormal heat generation. The protective element is preferably selected from those that are not activated during normal use at a high current and, from the standpoint of attaining a high output, it is more preferred to design the battery such that neither abnormal heat generation nor thermal runaway occurs even without a protective element.

[Outer Package]

The non-aqueous electrolyte battery of the present embodiment is usually constructed by housing the above-described non-aqueous electrolyte solution, negative electrode, positive electrode, separator and the like in an outer package (outer casing). This outer package is not restricted, and any known outer package can be employed as long as it does not markedly impair the effects of the present invention.

The material of the outer casing is not particularly restricted as long as it is a substance that is stable against the non-aqueous electrolyte solution to be used. Specifically, a metal such as a nickel-plated steel sheet, stainless steel, aluminum, an aluminum alloy, a magnesium alloy, nickel or titanium, or a laminated film composed of a resin and an aluminum foil can be preferably used.

Examples of an outer casing using any of the above-described metals include those having a hermetically sealed structure obtained by welding metal pieces together by laser welding, resistance welding or ultrasonic welding, and those having a caulked structure obtained using the above-described metals via a resin gasket. Examples of an outer casing using the above-described laminated film include those having a hermetically sealed structure obtained by heat-fusing resin layers together. In order to improve the sealing performance, a resin different from the resin used in the laminated film may be interposed between the resin layers. Particularly, in the case of forming a sealed structure by heat-fusing resin layers via a collector terminal, since it involves bonding between a metal and a resin, a polar group-containing resin or a resin modified by introduction of a polar group is preferably used as the resin to be interposed.

Further, the shape of the outer package may be selected arbitrarily, and the outer package may have any of, for example, a cylindrical shape, a prismatic shape, a laminated shape, a coin shape, and a large-sized shape.

EXAMPLES

Experiment A

One mode of the present invention will now be described more concretely by way of Examples and Reference Examples; however, the present invention is not restricted to the below-described Examples within the gist of the present invention.

Examples A1-1 to A1-4 and Comparative Examples A1-1 to A1-7

[Preparation of $Ni(PF_6)_2$-Containing EC Solution]

In an argon glove box, 0.5 g (3.9 mmol) of $NiCl_2$ was weighed in a 50-mL beaker and suspended in acetonitrile (AN). While stirring the resulting suspension, 1.95 g (7.7 mmol) of $AgPF_6$ was slowly added thereto in small fractions, followed by 3-hour stirring at room temperature. White solids of AgCl were generated with the progress of reaction. The resultant was left to stand overnight as is, and AgCl was subsequently removed by filtration, and the thus obtained filtrate was concentrated under reduced pressure using a rotary evaporator, whereby blue solids of $[Ni(AN)_n](PF_6)_2$ (n=0 to 6) were obtained. To the thus obtained solids, 5.0 g (56.8 mmol) of ethylene carbonate (EC) melted at 45° C. was added to dissolve the solids, and the resulting solution was vacuumed at 35° C. for 6 hours to remove AN serving as a coordinating solvent, whereby a $Ni(PF_6)_2$-containing EC solution was obtained.

[Production of Positive Electrode]

A slurry was prepared by mixing 85 parts by mass of $Li(Ni_{1/3}Mn_{1/3}Co_{1/3})O_2$ as a positive electrode active material, 10 parts by mass of acetylene black as a conductive material, and 5 parts by mass of polyvinylidene fluoride (PVdF) as a binder in an N-methylpyrrolidone solvent using a disperser. One side of a 15 μm-thick aluminum foil was coated with the thus obtained slurry, and this aluminum foil was dried and then pressed to produce a positive electrode.

[Production of Negative Electrode]

To 98 parts by mass of natural graphite, 1 part by mass of an aqueous dispersion of sodium carboxymethyl cellulose (concentration of sodium carboxymethyl cellulose=1% by mass) and 1 part by mass of an aqueous dispersion of a styrene-butadiene rubber (concentration of styrene-butadiene rubber=50% by mass) were added as a thickening agent and a binder, respectively, and these materials were mixed using a disperser to prepare a slurry. One side of a 10 μm-thick copper foil was uniformly coated with the thus obtained slurry, and this copper foil was dried and then pressed to produce a negative electrode.

[Preparation of Non-Aqueous Electrolyte Solutions]

Under a dry argon atmosphere, the above-obtained $Ni(PF_6)_2$-containing EC solution was diluted with ethylene carbonate (EC), ethyl methyl carbonate (EMC), and dimethyl carbonate (DMC) such that the resulting mixed solvent had the respective nickel ion concentrations shown in Table 1 and the solvent composition had a mixture volume ratio (EC:EMC:DMC) of 3:4:3, and thoroughly dried $LiPF_6$ was dissolved therein at 1 mol/L (in terms of the concentration in the resulting non-aqueous electrolyte solutions). A non-aqueous electrolyte solution not containing $Ni(PF_6)_2$ is hereinafter referred to as "reference electrolyte solution A1". The non-aqueous electrolyte solutions shown in Table 1 below were prepared by adding $FSO_3Li$ to the above-obtained respective $Ni(PF_6)_2$-containing non-aqueous electrolyte solutions or the reference electrolyte solution A1. It is noted here that Comparative Example A1-1 is the very reference electrolyte solution A1. In Table 1, the content of $FSO_3Li$ indicates an added amount, and the content of nickel element (nickel ions) is a value determined based on the measurement results of the below-described inductively-coupled high-frequency plasma emission spectrometric analysis (ICP-AES). In Table 1, "Content (% by mass)" and "Content (ppm by mass)" each indicate the content taking the amount of the reference electrolyte solution A1 as 100% by mass.

<Measurement of Nickel Element Content in Non-Aqueous Electrolyte Solutions>

The thus obtained non-aqueous electrolyte solutions were each fractionated in an amount of 100 μL (about 130 mg). The thus fractionated non-aqueous electrolyte solution was weighed in a PTFE beaker, and an appropriate amount of concentrated nitric acid was added thereto to perform wet decomposition on a hot plate to a constant volume of 50 mL, after which the nickel element content was measured by a Li and acid concentration matching calibration curve method using an inductively-coupled high-frequency plasma emission spectrometer (ICP-AES, iCAP 7600duo manufactured by Thermo Fischer Scientific, Inc.).

[Production of Non-Aqueous Electrolyte Secondary Batteries]

A battery element was prepared by laminating the above-obtained positive electrode and negative electrode along with a polyethylene separator in the order of the negative electrode, the separator, and the positive electrode. This battery element was inserted into a pouch made of a laminated film obtained by covering both sides of an aluminum sheet (thickness: 40 μm) with a resin layer, with the terminals of the positive and negative electrodes protruding out of the pouch. Thereafter, the above-prepared non-aqueous electrolyte solutions were each injected into the pouch, and the pouch was vacuum-sealed, whereby laminate-type non-aqueous electrolyte secondary batteries were produced.

<Evaluation of Non-Aqueous Electrolyte Secondary Batteries>

[Initial Conditioning]

In a 25° C. thermostat chamber, the thus obtained non-aqueous electrolyte secondary batteries were subjected to constant current-constant voltage charging (hereinafter, referred to as "CC-CV charging") up to 4.2 V at a current equivalent to ⅙ C (a current value of 1 C means the current value at which charging or discharging of a battery requires one hour; the same applies below), and subsequently discharged to 2.5 V at ⅙ C. The non-aqueous electrolyte secondary batteries were then subjected to CC-CV charging up to 4.1 V at ⅙ C, followed by aging at 60° C. for 12 hours. Thereafter, the non-aqueous electrolyte secondary batteries were discharged to 2.5 V at ⅙ C and stabilized, after which the non-aqueous electrolyte secondary batteries were further subjected to CC-CV charging up to 4.2 V at ⅙ C and then discharged to 2.5 V at ⅙ C, whereby initial conditioning was completed.

[Charged Storage Test]

After the initial conditioning, the non-aqueous electrolyte secondary batteries were again subjected to CC-CV charging up to 4.2 V at ⅙ C and subsequently stored at a high temperature of 60° C. for 168 hours. After this high-temperature storage, the non-aqueous electrolyte secondary batteries were allowed to cool, after which the discharge capacity was measured when each battery was discharged to 2.5 V at ⅙ C under 25° C., and the thus obtained value was defined as "residual capacity (one week)". Table 1 below shows the values of the residual capacity (one week), taking that of Comparative Example A1-1 as 100.

After this charged storage test, the non-aqueous electrolyte secondary batteries were again subjected to CC-CV charging up to 4.2 V at ⅙ C and subsequently stored at a high temperature of 60° C. for 336 hours. The discharge capacity was measured when each non-aqueous electrolyte secondary battery was discharged to 2.5 V at ⅙ C under 25° C., and the thus obtained value was defined as "residual capacity (two weeks)". Table 1 below also shows the values of the residual capacity (two weeks), taking that of Comparative Example A1-1 as 100.

TABLE 1

| | $FSO_3Li$ (% by mass) | Ni elements (ppm by mass) | residual capacity (one week) | residual capacity (two weeks) |
|---|---|---|---|---|
| Comparative Example A1-1 | 0 | 0 | 100 | 100 |
| Comparative Example A1-2 | 1 | 0 | 100.2 | 103.6 |

TABLE 1-continued

| | $FSO_3Li$ (% by mass) | Ni elements (ppm by mass) | residual capacity (one week) | residual capacity (two weeks) |
|---|---|---|---|---|
| Comparative Example A1-3 | 1 | 515 | 99.3 | |
| Comparative Example A1-4 | 0 | 206 | 99.5 | — |
| Example A1-1 | 1 | 206 | 101.2 | — |
| Comparative Example A1-5 | 0 | 103 | 99.9 | 99.0 |
| Example A1-2 | 1 | 103 | 102.4 | 106.4 |
| Comparative Example A1-6 | 0 | 50 | 100.5 | — |
| Example A1-3 | 1 | 50 | 102.5 | — |
| Comparative Example A1-7 | 0 | 5 | 99.5 | — |
| Example A1-4 | 1 | 5 | 101.0 | — |

From a comparison between Comparative Example A1-1 and Comparative Example A1-2, it was shown that the battery residual capacity was increased when the electrolyte solution contained $FSO_3Li$. On the other hand, from Comparative Examples A1-1 to A1-3, it was shown that the residual capacity was reduced when the electrolyte solution contained nickel ions in excess of a prescribed amount even if the electrolyte solution contained $FSO_3Li$. Further, from Comparative Examples A1-4 to A1-7, it was shown that, although the residual capacity was improved when the electrolyte solution contained about 50 ppm by mass of nickel ions (Comparative Example A1-6), the residual capacity was reduced when the electrolyte solution contained nickel ions in either a smaller amount or a larger amount. According to Examples A1-2 to A1-4, in those cases where each electrolyte solution contained $FSO_3Li$, a higher effect of improving the residual capacity was exerted even when the electrolyte solution contained nickel ions in the same amount as in Comparative Examples A1-4, A1-5 or A1-7, as compared to when the electrolyte solution contained $FSO_3Li$ alone. In other words, it was shown that the charged storage characteristics of a non-aqueous electrolyte secondary battery under a high-temperature environment are improved by incorporating $FSO_3Li$ and a prescribed amount of nickel ions into a non-aqueous electrolyte solution of the battery.

Examples A2-1 to A2-3 and Comparative Examples A2-1 to A2-3

[Production of Positive Electrode]

A positive electrode was produced in the same manner as in Example A1-1.

[Production of Negative Electrode]

A negative electrode was produced in the same manner as in Example A1-1.

[Preparation of Non-Aqueous Electrolyte Solutions]

The non-aqueous electrolyte solutions shown in Table 2 below were prepared in the same manner as in Example A1-1 and the like by adding $FSO_3Li$ to the respective $Ni(PF_6)_2$-containing non-aqueous electrolyte solutions or the reference electrolyte solution A1.

[Production of Non-Aqueous Electrolyte Secondary Batteries]

Laminate-type non-aqueous electrolyte secondary batteries were produced in the same manner as in Example A1-1, except that the thus obtained non-aqueous electrolyte solutions were used.

<Evaluation of Non-Aqueous Electrolyte Secondary Batteries>

Initial conditioning and charged storage test were performed in the same manner as in Example A1-1. The residual capacity was also determined in the same manner as in Example A1-1. Table 2 below shows the values of the residual capacity (one week) of Examples A2-1 to A2-3 and Comparative Examples A2-1 to A2-3 along with the results of Comparative Examples A1-1 and A1-5, taking the residual capacity (one week) of Comparative Example A1-1 as 100.

TABLE 2

| | $FSO_3Li$ (% by mass) | Ni elements (ppm by mass) | residual capacity (one week) |
|---|---|---|---|
| Comparative Example A1-1 | 0 | 0 | 100 |
| Comparative Example A1-5 | 0 | 103 | 99.9 |
| Comparative Example A2-1 | 0.025 | 0 | 99.3 |
| Example A2-1 | 0.025 | 103 | 100.5 |
| Comparative Example A2-2 | 0.2 | 0 | 99.2 |
| Example A2-2 | 0.2 | 103 | 100.7 |
| Comparative Example A2-3 | 5 | 0 | 101.2 |
| Example A2-3 | 5 | 103 | 101.6 |

From a comparison between Comparative Example A1-1 and Comparative Example A1-5, it was shown that, as compared to the electrolyte solution containing no nickel ion, the electrolyte solution containing 103 ppm by mass of nickel ions caused a reduction in the battery residual capacity. In addition, from Comparative Examples A2-1 and A2-2, it was shown that, even when the electrolyte solutions contained $FSO_3Li$, an excessively low $FSO_3Li$ content resulted in a reduction, rather than an increase, in the battery residual capacity. From these results, the battery of Example A2-1 is expected to have a lower residual capacity than the batteries of Comparative Examples A1-5 and A2-1. However, in Example A2-1, a prominent effect was exerted in that the residual capacity was improved as compared to Comparative Examples A1-5 and A2-1 and was further improved as compared to Comparative Example A1-1. Moreover, from a comparison between Example A2-2 and Comparative Example A2-2 as well as a comparison between Example A2-3 and Comparative Example A2-3, it was shown that incorporation of $FSO_3Li$ and a prescribed amount of nickel ions into an electrolyte solution exerts a prominent effect of improving the residual capacity of a non-aqueous electrolyte secondary battery, i.e. improving the charged storage characteristics of a non-aqueous electrolyte secondary battery under a high-temperature environment.

Examples A3-1 and A3-2, and Comparative Examples A3-1 to A3-5

[Production of Positive Electrode]

A slurry was prepared by mixing 90 parts by mass of $Li(Ni_{0.5}Mn_{0.3}Co_{0.2})O_2$ as a positive electrode active material, 7 parts by mass of acetylene black as a conductive material, and 3 parts by mass of polyvinylidene fluoride (PVdF) as a binder in an N-methylpyrrolidone solvent using a disperser. One side of a 15 μm-thick aluminum foil was uniformly coated with the thus obtained slurry, and this aluminum foil was dried and then pressed to produce a positive electrode.

[Production of Negative Electrode]

A negative electrode was produced in the same manner as in Example A1-1, except that both sides of a copper foil were coated with the negative electrode active material-containing slurry.

[Preparation of Non-Aqueous Electrolyte Solutions]

The non-aqueous electrolyte solutions shown in Table 3 below were prepared in the same manner as in Example A1-1 and the like by adding $FSO_3Li$ to the respective $Ni(PF_6)_2$-containing non-aqueous electrolyte solutions or the reference electrolyte solution A1. It is noted here that Comparative Example A3-1 is the very reference electrolyte solution A1. In Table 3, "Content (% by mass)" and "Content (ppm by mass)" each indicate the content taking the amount of the reference electrolyte solution A1 as 100% by mass.

[Production of Non-Aqueous Electrolyte Secondary Batteries]

Laminate-type non-aqueous electrolyte secondary batteries were produced in the same manner as in Example A1-1, except that the thus obtained positive electrode, negative electrode, and respective non-aqueous electrolyte solutions were used.

<Evaluation of Non-Aqueous Electrolyte Secondary Batteries>

Initial conditioning and charged storage test were performed in the same manner as in Example A1-1. The residual capacity (one week) and the residual capacity (two weeks) were also determined in the same manner as in Example A1-1. Table 3 below shows the values of the residual capacity taking the residual capacity (one week) of Comparative Example A3-1 as 100, as well as the values of the residual capacity (two weeks) taking the residual capacity (two weeks) of Comparative Example A3-1 as 100.

TABLE 3

| | $FSO_3Li$ (% by mass) | Ni elements (ppm by mass) | residual capacity (one week) | residual capacity (two weeks) |
|---|---|---|---|---|
| Comparative Example A3-1 | 0 | 0 | 100 | 100 |
| Comparative Example A3-2 | 1 | 0 | 101.7 | 104.0 |
| Comparative Example A3-3 | 1 | 515 | 100.3 | — |
| Comparative Example A3-4 | 0 | 206 | 98.8 | 98.5 |
| Example A3-1 | 1 | 206 | 101.9 | 104.6 |
| Comparative Example A3-5 | 0 | 5 | 100.5 | 100.4 |
| Example A3-2 | 1 | 5 | 102.2 | 105.0 |

From Comparative Examples A3-1, A3-4 and A3-5, it is seen that the electrolyte solution containing 5 ppm by mass of nickel ions improved the residual capacity of the non-aqueous electrolyte battery, while a nickel ion content of more than 515 ppm by mass caused a reduction in the residual capacity. On the other hand, from Examples A3-1 and A3-2 and Comparative Example A3-2, it was shown that, when the electrolyte solution contained $FSO_3Li$ along with a prescribed amount of nickel ions, the residual capacity was increased as compared to when the electrolyte solution contained $FSO_3Li$ alone. In addition, from the values of the residual capacity measured after two-week storage, it was shown that deterioration of each non-aqueous electrolyte battery due to change over time was inhibited, i.e. the charged storage characteristics of each non-aqueous electrolyte secondary battery under a high-temperature environment were improved, by incorporating $FSO_3Li$ and a prescribed amount of nickel ions into the non-aqueous electrolyte solution of each battery. Moreover, from a comparison between Comparative Example A3-3 and Comparative Example A3-2, it is seen that, when the amount of nickel ions contained in the electrolyte solution was outside a prescribed range, the effect of adding $FSO_3Li$ was impaired and the residual capacity of the non-aqueous electrolyte battery was reduced.

The storage period of a battery is usually about 200 days for, for example, vehicle manufacturers. The difference between the residual capacity after one-week storage and the residual capacity after two-week storage increases with time; therefore, the effects of the present invention are considered to be more prominent as the storage period is extended.

Experiment B

One mode of the present invention will now be described more concretely by way of Examples and Reference Examples; however, the present invention is not restricted to the below-described Examples within the gist of the present invention.

Examples B1-1 to B1-3 and Comparative Examples B1-1 to B1-5

[Preparation of $Co(PF_6)_2$-Containing EC Solution]

In an argon glove box, 0.30 g (2.3 mmol) of $COCl_2$ was weighed in a 50-mL beaker and suspended in acetonitrile (AN). While stirring the resulting suspension, 1.168 g (4.6 mmol) of $AgPF_6$ was slowly added thereto in small fractions, followed by 3-hour stirring at room temperature. White solids of AgCl were generated with the progress of reaction. The resultant was left to stand overnight as is, and AgCl was subsequently removed by filtration, and the thus obtained filtrate was concentrated under reduced pressure using a rotary evaporator, whereby orange solids of $[Co(AN)_n](PF_6)_2$ (n=0 to 6) were obtained. Thereafter, 0.5 g of the thus obtained solids was dissolved in 2.0 g (22.7 mmol) of ethylene carbonate (EC) melted at 45° C., and the resulting solution was vacuumed at 35° C. for 6 hours to remove AN serving as a coordinating solvent, whereby a $Co(PF_6)_2$-containing EC solution was obtained.

[Production of Positive Electrode]

A positive electrode was produced in the same manner as in Example A1-1.

[Production of Negative Electrode]

A negative electrode was produced in the same manner as in Example A1-1.

[Preparation of Non-Aqueous Electrolyte Solutions]

Under a dry argon atmosphere, the above-obtained $Co(PF_6)_2$-containing EC solution was diluted with ethylene carbonate (EC), ethyl methyl carbonate (EMC), and dimethyl carbonate (DMC) such that the resulting mixed solvent had the respective cobalt ion concentrations shown in Table 4 and the solvent composition had a mixture volume ratio (EC:EMC:DMC) of 3:4:3, and thoroughly dried $LiPF_6$ was dissolved therein at 1 mol/L (in terms of the concentration in the resulting non-aqueous electrolyte solutions). A non-aqueous electrolyte solution not containing $Co(PF_6)_2$ is hereinafter referred to as "reference electrolyte solution B1". The non-aqueous electrolyte solutions shown in Table 4 below were prepared by adding $FSO_3Li$ to the above-obtained respective $Co(PF_6)_2^-$ containing non-aqueous electrolyte solutions or the reference electrolyte solution B1. It is noted here Comparative Example B1-1 is the very reference electrolyte solution B1. In Table 4, the content of $FSO_3Li$ indicates an added amount, and the content of cobalt element (cobalt ions) is a value determined based on the measurement results of the below-described inductively-coupled high-frequency plasma emission spectrometric analysis (ICP-AES). In Table 4, "Content (% by mass)" and "Content (ppm by mass)" each indicate the content taking the amount of the reference electrolyte solution B1 as 100% by mass.

<Measurement of Cobalt Element Content in Non-Aqueous Electrolyte Solutions>

The thus obtained non-aqueous electrolyte solutions were each fractionated in an amount of 100 μL (about 130 mg). The thus fractionated non-aqueous electrolyte solution was weighed in a PTFE beaker, and an appropriate amount of concentrated nitric acid was added thereto to perform wet decomposition on a hot plate to a constant volume of 50 mL, after which the cobalt element content was measured by a Li and acid concentration matching calibration curve method using an inductively-coupled high-frequency plasma emission spectrometer (ICP-AES, iCAP 7600duo manufactured by Thermo Fischer Scientific, Inc.).

[Production of Non-Aqueous Electrolyte Secondary Batteries]

Laminate-type non-aqueous electrolyte secondary batteries were produced in the same manner as in Example A1-1, except that the thus obtained non-aqueous electrolyte solutions were used.

<Evaluation of Non-Aqueous Electrolyte Secondary Batteries>

Initial conditioning and charged storage test were performed in the same manner as in Example A1-1. The residual capacity was also determined in the same manner as in Example A1-1. Table 4 below shows the values of the residual capacity, taking the residual capacity (one week) of Comparative Example B1-1 as 100. Table 4 below also shows the values of the residual capacity, taking the residual capacity (two weeks) of Comparative Example B1-1 as 100.

TABLE 4

| | $FSO_3Li$ (% by mass) | Co elements (ppm by mass) | residual capacity (one week) | residual capacity (two weeks) |
|---|---|---|---|---|
| Comparative Example B1-1 | 0 | 0 | 100 | 100 |
| Comparative Example B1-2 | 1 | 0 | 100.2 | 103.6 |
| Comparative Example B1-3 | 0 | 190 | 98.4 | — |
| Example B1-1 | 1 | 190 | 100.6 | — |
| Comparative Example B1-4 | 0 | 78 | 98.3 | 99.0 |
| Example B1-2 | 1 | 78 | 100.8 | 105.9 |
| Comparative Example B1-5 | 0 | 4 | 99.5 | — |
| Example B1-3 | 1 | 4 | 101.7 | — |

From a comparison between Comparative Example B1-1 and Comparative Example B1-2, it was shown that the residual capacity of the non-aqueous electrolyte secondary battery was increased when the non-aqueous electrolyte solution contained $FSO_3Li$. Further, from Comparative Examples B1-3 to B1-5, it was shown that the residual capacity of the non-aqueous electrolyte secondary battery was reduced when the non-aqueous electrolyte solution contained only cobalt ions in an amount of 4 to 190 ppm by mass without $FSO_3Li$. On the other hand, according to Examples B1-1 to B1-3, in those cases where each electrolyte solution contained $FSO_3Li$, a higher effect of improving the residual capacity was exerted even when the electrolyte solution contained cobalt ions in the same amount as in Comparative Example B1-3 to B1-5, as compared to when the electrolyte solution contained $FSO_3Li$ alone. Moreover, from a comparison between Comparative Example B1-2 and Example B1-2, it is seen that the difference between the residual capacity after the 168-hour (one-week) high-temperature storage and the residual capacity after the 336-hour (two-week) high-temperature storage was further increased by the presence of cobalt ions. In other words, it was shown that a change over time during high-temperature storage is markedly inhibited and the charged storage characteristics of a non-aqueous electrolyte secondary battery under a high-temperature environment are thus improved by incorporating $FSO_3Li$ and a prescribed amount of cobalt ions into a non-aqueous electrolyte solution of the battery.

Examples B2-1 to B2-3 and Comparative Examples B2-1 to B2-3

[Production of Positive Electrode]

A positive electrode was produced in the same manner as in Example B1-1.

[Production of Negative Electrode]

A negative electrode was produced in the same manner as in Example B1-1.

[Preparation of Non-Aqueous Electrolyte Solutions]

The non-aqueous electrolyte solutions shown in Table 5 below were prepared in the same manner as in Example B1-1 and the like by adding $FSO_3Li$ to the respective $Co(PF_6)_2$-containing non-aqueous electrolyte solutions or the reference electrolyte solution B1.

[Production of Non-Aqueous Electrolyte Secondary Batteries]

Laminate-type non-aqueous electrolyte secondary batteries were produced in the same manner as in Example B1-1, except that the thus obtained non-aqueous electrolyte solutions were used.

<Evaluation of Non-Aqueous Electrolyte Secondary Batteries>

Initial conditioning and charged storage test were performed in the same manner as in Example B1-1. The residual capacity was also determined in the same manner as in Example B1-1. Table 5 below shows the values of the residual capacity (one week) of Examples B2-1 to B2-3 and Comparative Examples B2-1 to B2-3 along with the results of Comparative Examples B1-1 and B1-4, taking the residual capacity (one week) of Comparative Example B1-1 as 100.

TABLE 5

| | $FSO_3Li$ (% by mass) | Co elements (ppm by mass) | residual capacity (one week) |
|---|---|---|---|
| Comparative Example B1-1 | 0 | 0 | 100 |
| Comparative Example B1-4 | 0 | 78 | 98.3 |
| Comparative Example B2-1 | 0.025 | 0 | 99.3 |
| Example B2-1 | 0.025 | 78 | 101.0 |
| Comparative Example B2-2 | 0.2 | 0 | 100.2 |
| Example B2-2 | 0.2 | 78 | 101.7 |
| Comparative Example B2-3 | 5 | 0 | 100.6 |
| Example B2-3 | 5 | 78 | 101.3 |

From a comparison between Comparative Example B1-1 and Comparative Example B1-4, it was shown that, as compared to the non-aqueous electrolyte solution containing no cobalt ion, the non-aqueous electrolyte solution containing 78 ppm by mass of cobalt ions without $FSO_3Li$ caused a reduction in the residual capacity of the non-aqueous electrolyte secondary battery. In addition, from Comparative Examples B2-1 and B2-2, it was shown that, even when the non-aqueous electrolyte solutions contained $FSO_3Li$, an excessively low $FSO_3Li$ content resulted in a reduction, rather than an increase, in the residual capacity of the non-aqueous electrolyte secondary battery. From these results, the non-aqueous electrolyte secondary battery of Example B2-1 is expected to have a lower residual capacity than the non-aqueous electrolyte secondary batteries of Comparative Examples B1-4 and B2-1. However, in Example B2-1, a prominent effect was exerted in that the residual capacity was improved as compared to Comparative Examples B1-4 and B2-1 and was further improved as compared to Comparative Example B1-1. Moreover, from a comparison between Example B2-2 and Comparative Example B2-2 as well as a comparison between Example B2-3 and Comparative Example B2-3, it was shown that incorporation of $FSO_3Li$ and a prescribed amount of cobalt ions into a non-aqueous electrolyte solution exerts a prominent effect of improving the residual capacity of a non-aqueous electrolyte secondary battery, i.e. improving the charged storage characteristics of a non-aqueous electrolyte secondary battery under a high-temperature environment.

Examples B3-1 to B3-3 and Comparative Examples B3-1 to B3-6

[Production of Positive Electrode]

A positive electrode was produced in the same manner as in Example A3-1.

[Production of Negative Electrode]

A negative electrode was produced in the same manner as in Example A3-1.

[Preparation of Non-Aqueous Electrolyte Solutions]

The non-aqueous electrolyte solutions shown in Table 6 below were prepared in the same manner as in Example B1-1 and the like by adding $FSO_3Li$ to the respective $Co(PF_6)_2$-containing non-aqueous electrolyte solutions or the reference electrolyte solution B1. It is noted here that Comparative Example B3-1 is the very reference electrolyte solution B1. In Table 6, "Content (% by mass)" and "Content (ppm by mass)" each indicate the content taking the amount of the reference electrolyte solution B1 as 100% by mass.

[Production of Non-Aqueous Electrolyte Secondary Batteries]

Laminate-type non-aqueous electrolyte secondary batteries were produced in the same manner as in Example B1-1, except that the thus obtained positive electrode, negative electrode, and respective non-aqueous electrolyte solutions were used.

<Evaluation of Non-Aqueous Electrolyte Secondary Batteries>

Initial conditioning and charged storage test were performed in the same manner as in Example B1-1. The residual capacity (one week) and the residual capacity (two weeks) were also determined in the same manner as in Example B1-1. Table 6 below shows the values of the residual capacity (one week) taking the residual capacity (one week) of Comparative Example B3-1 as 100, as well as the values of the residual capacity (two weeks) taking the residual capacity (two weeks) of Comparative Example B3-1 as 100.

TABLE 6

| | $FSO_3Li$ (% by mass) | Co elements (ppm by mass) | residual capacity (one week) | residual capacity (two weeks) |
|---|---|---|---|---|
| Comparative Example B3-1 | 0 | 0 | 100 | 100 |
| Comparative Example B3-2 | 1 | 0 | 100.2 | 104.0 |
| Comparative Example B3-3 | 1 | 760 | 99.5 | — |
| Comparative Example B3-4 | 0 | 476 | 98.1 | 100.0 |
| Example B3-1 | 1 | 476 | 102.0 | 106.7 |
| Comparative Example B3-5 | 0 | 190 | 97.9 | 101.4 |
| Example B3-2 | 1 | 190 | 101.6 | 108.1 |
| Comparative Example B3-6 | 0 | 4 | 100.7 | 106.1 |
| Example B3-3 | 1 | 4 | 101.8 | 110.4 |

From Comparative Examples B3-1, B3-4 and B3-6, it was shown that the non-aqueous electrolyte solution containing 4 ppm by mass of cobalt ions improved the residual capacity of a non-aqueous electrolyte secondary battery, while a cobalt ion content of more than 476 ppm by mass caused a reduction in the residual capacity after the 168-hour (one-week) high-temperature storage, and the residual capacity of this case after the 336-hour (two-week) high-temperature storage was the same as in the case where the electrolyte solution contained no cobalt ion. Further, from a comparison between Comparative Example B3-3 and Comparative Example B3-2, it was shown that, even in those cases where each non-aqueous electrolyte solution contained $FSO_3Li$, the effect of adding $FSO_3Li$ was impaired when the non-aqueous electrolyte solution contained 760 ppm by mass of cobalt ions, resulting in a reduction in the residual capacity of the non-aqueous electrolyte solution secondary battery after the 168-hour (one-week) high-temperature storage. Moreover, from Examples B3-1 to B3-3 and Comparative Examples B3-1 to B3-6, it was shown that, by using a non-aqueous electrolyte solution containing $FSO_3Li$ and a prescribed amount of cobalt ions, the residual capacity of a non-aqueous electrolyte secondary battery after high-temperature storage was increased as compared to a case where the non-aqueous electrolyte solution contained $FSO_3Li$ or cobalt ions alone and, particularly, comparing the ratios of the residual capacity after the 168-hour (one-week) high-temperature storage and the residual capacity after the 336-hour (two-week) high-temperature storage, it was shown that deterioration of a non-aqueous electrolyte secondary battery due to change over time was markedly inhibited, and the charged storage characteristics of the non-aqueous electrolyte secondary battery under a high-temperature environment were thus improved.

The storage period of a battery is usually about 200 days for, for example, vehicle manufacturers. The difference between the residual capacity after one-week storage and the residual capacity after two-week storage increases with time; therefore, the effects of the present invention are considered to be more prominent as the storage period is extended.

Experiment C

One mode of the present invention will now be described more concretely by way of Examples and Reference Examples; however, the present invention is not restricted to the below-described Examples within the gist of the present invention.

Examples C1-1 to C1-4 and Comparative Examples C1-1 to C1-7

[Preparation of $Cu(PF_6)_2$-Containing EC Solution]

In an argon glove box, 0.50 g (3.7 mmol) of $CuCl_2$ was weighed in a 50-mL beaker and suspended in acetonitrile (AN). While stirring the resulting suspension, 1.88 g (7.4 mmol) of $AgPF_6$ was slowly added thereto in small fractions, followed by 3-hour stirring at room temperature. White solids of AgCl were generated with the progress of reaction. The resultant was left to stand overnight as is, and AgCl was subsequently removed by filtration, and the thus obtained filtrate was concentrated under reduced pressure using a rotary evaporator, whereby blue solids of $[Cu(AN)_n](PF_6)_2$ (n=0 to 6) were obtained. To the thus obtained solids, 5.0 g (56.8 mmol) of ethylene carbonate (EC) melted at 45° C. was added to dissolve the solids, and the resulting solution was vacuumed at 35° C. for 6 hours to remove AN serving as a coordinating solvent, whereby a $Cu(PF_6)_2$-containing EC solution was obtained.

[Production of Positive Electrode]

A positive electrode was produced in the same manner as in Example A1-1.

[Production of Negative Electrode]

A negative electrode was produced in the same manner as in Example A1-1.

[Preparation of Non-Aqueous Electrolyte Solutions]

Under a dry argon atmosphere, the above-obtained $Cu(PF_6)_2$-containing EC solution was diluted with ethylene carbonate (EC), ethyl methyl carbonate (EMC), and dimethyl carbonate (DMC) such that the resulting mixed solvent had the respective copper ion concentrations shown in Table 7 and the solvent composition had a mixture volume ratio (EC:EMC:DMC) of 3:4:3, and thoroughly dried $LiPF_6$ was dissolved therein at 1 mol/L (in terms of the concentration in the resulting non-aqueous electrolyte solutions). A non-aqueous electrolyte solution not containing $Cu(PF_6)_2$ is hereinafter referred to as "reference electrolyte solution C1". The non-aqueous electrolyte solutions shown in Table 7 below were prepared by adding $FSO_3Li$ to the above-obtained respective $Cu(PF_6)_2$-containing non-aqueous electrolyte solutions or the reference electrolyte solution C1. It is noted here that Comparative Example C1-1 is the very reference electrolyte solution C1. In Table 7, the content of $FSO_3Li$ indicates an added amount, and the content of copper element (copper ions) is a value determined based on the measurement results of the below-described inductively-coupled high-frequency plasma emission spectrometric analysis (ICP-AES). In Table 7, "Content (% by mass)" and "Content (ppm by mass)" each indicate the content taking the amount of the reference electrolyte solution C1 as 100% by mass.

<Measurement of Copper Element Content in Non-Aqueous Electrolyte Solutions>

The thus obtained non-aqueous electrolyte solutions were each fractionated in an amount of 100 μL (about 130 mg). The thus fractionated non-aqueous electrolyte solution was weighed in a PTFE beaker, and an appropriate amount of concentrated nitric acid was added thereto to perform wet decomposition on a hot plate to a constant volume of 50 mL, after which the copper element content was measured by a Li and acid concentration matching calibration curve method using an inductively-coupled high-frequency plasma emission spectrometer (ICP-AES, iCAP 7600duo manufactured by Thermo Fischer Scientific, Inc.).

[Production of Non-Aqueous Electrolyte Secondary Batteries]

Laminate-type non-aqueous electrolyte secondary batteries were produced in the same manner as in Example A1-1, except that the thus obtained non-aqueous electrolyte solutions were used.

<Evaluation of Non-Aqueous Electrolyte Secondary Batteries>

Initial conditioning and charged storage test were performed in the same manner as in Example A1-1. The residual capacity was also determined in the same manner as in Example A1-1. Table 7 below shows the values of the residual capacity (one week), taking the residual capacity of Comparative Example C1-1 as 100. Table 7 below also shows the values of the residual capacity, taking the residual capacity (two weeks) of Comparative Example C1-1 as 100.

TABLE 7

| | $FSO_3Li$ (% by mass) | Cu elements (ppm by mass) | residual capacity (one week) | residual capacity (two weeks) |
|---|---|---|---|---|
| Comparative Example C1-1 | 0 | 0 | 100 | 100 |
| Comparative Example C1-2 | 1 | 0 | 100.2 | 103.6 |
| Comparative Example C1-3 | 1 | 615 | 100 | — |
| Comparative Example C1-4 | 0 | 308 | 97.0 | — |
| Example C1-1 | 1 | 308 | 100.7 | — |
| Comparative Example C1-5 | 0 | 123 | 98.4 | 97.4 |
| Example C1-2 | 1 | 123 | 102.2 | 106.0 |
| Comparative Example C1-6 | 0 | 62 | 100.2 | — |
| Example C1-3 | 1 | 62 | 100.6 | — |
| Comparative Example C1-7 | 0 | 5 | 100 | — |
| Example C1-4 | 1 | 5 | 101.0 | — |

From a comparison between Comparative Example C1-1 and Comparative Example C1-2, it was shown that a battery had an increased residual capacity when its electrolyte solution contained $FSO_3Li$. On the other hand, from Comparative Examples C1-1 to C1-3, it was shown that, even if the electrolyte solution contained $FSO_3Li$, the residual capacity did not change and the effect of containing $FSO_3Li$ was not exerted when the electrolyte solution contained copper ions in excess of a prescribed amount. Further, from Comparative Examples C1-4 to C1-7, it was shown that the residual capacity did not change between a case where the electrolyte solution contained 5 ppm by mass of copper ions and a case where the electrolyte solution contained no copper ion, and that the residual capacity was improved when the electrolyte solution contained about 60 ppm by mass of copper ions; however, it was also shown that the residual capacity was reduced when the electrolyte solution contained a larger amount of copper ions (Comparative Examples C1-4 and C1-5). On the other hand, according to Examples C1-1 to C1-4, in those cases where each electrolyte solution contained $FSO_3Li$, a higher effect of improving the residual capacity was exerted even when the electrolyte solution contained copper ions in the same amount as in Comparative Examples C1-5 to C1-7, as compared to when the electrolyte solution contained $FSO_3Li$ alone. In other words, it was shown that the charged storage characteristics of a non-aqueous electrolyte secondary battery under a high-temperature environment are improved by incorporating $FSO_3Li$ and a prescribed amount of copper ions into a non-aqueous electrolyte solution of the battery. Moreover, it was shown that, in Comparative Example C1-5, the residual capacity was reduced after the high-temperature storage performed at 60° C. for 168 hours and the value of the residual capacity was further reduced after the high-temperature storage performed at 60° C. for 336 hours; however, in Example C1-2 where the non-aqueous electrolyte battery contained the same amount of copper ions along with $FSO_3Li$, the residual capacity ratio was improved after the high-temperature storage performed at 60° C. for 168 hours, and the residual capacity ratio was further improved after the high-temperature storage performed at 60° C. for 336 hours. In other words, it was shown that deterioration of a non-aqueous electrolyte battery due to change over time is markedly inhibited by incorporating a prescribed amount of copper ions along with $FSO_3Li$ into a non-aqueous electrolyte solution of the battery.

Examples C2-1 to C2-3 and Comparative Examples C2-1 to C2-3

[Production of Positive Electrode]

A positive electrode was produced in the same manner as in Example C1-1.

[Production of Negative Electrode]

A negative electrode was produced in the same manner as in Example C1-1.

[Preparation of Non-Aqueous Electrolyte Solutions]

The non-aqueous electrolyte solutions shown in Table 8 below were prepared in the same manner as in Example C1-1 and the like by adding $FSO_3Li$ to the respective $Cu(PF_6)_2$-containing non-aqueous electrolyte solutions or the reference electrolyte solution C1.

[Production of Non-Aqueous Electrolyte Secondary Batteries]

Laminate-type non-aqueous electrolyte secondary batteries were produced in the same manner as in Example C1-1, except that the thus obtained non-aqueous electrolyte solutions were used.

<Evaluation of Non-Aqueous Electrolyte Secondary Batteries>

Initial conditioning and charged storage test were performed in the same manner as in Example C1-1. The residual capacity (one week) was also determined in the same manner as in Example C1-1. Table 8 below shows the values of the residual capacity (one week) of Examples C2-1 to C2-3 and Comparative Examples C2-1 to C2-3 along with the results of Comparative Examples C1-1 and C1-5, taking the residual capacity (one week) of Comparative Example C1-1 as 100.

TABLE 8

| | $FSO_3Li$ (% by mass) | Cu elements (ppm by mass) | residual capacity (one week) |
|---|---|---|---|
| Comparative Example C1-1 | 0 | 0 | 100 |
| Comparative Example C1-5 | 0 | 123 | 98.4 |
| Comparative Example C2-1 | 0.025 | 0 | 99.6 |
| Example C2-1 | 0.025 | 123 | 100.8 |
| Comparative Example C2-2 | 0.2 | 0 | 98.6 |
| Example C2-2 | 0.2 | 123 | 102.6 |
| Comparative Example C2-3 | 5 | 0 | 100.6 |
| Example C2-3 | 5 | 123 | 101.3 |

From a comparison between Comparative Example C1-1 and Comparative Example C1-5, it was shown that, as compared to the non-aqueous electrolyte solution containing no copper ion, the non-aqueous electrolyte solution containing 123 ppm by mass of copper ions without $FSO_3Li$ caused a reduction in the battery residual capacity. Further, from Comparative Examples C2-1 to C2-3, it was shown that, even when the non-aqueous electrolyte solutions contained $FSO_3Li$, an excessively low $FSO_3Li$ content resulted in a reduction, rather than an increase, in the battery residual capacity. From these results, the non-aqueous electrolyte batteries of Examples C2-1 and C2-2 are expected to have a lower residual capacity than the non-aqueous electrolyte batteries of Comparative Example C1-5 and Comparative Example C2-1 or C2-2. However, in the non-aqueous electrolyte battery of Example C2-1, a prominent effect was exerted in that the residual capacity was improved as compared to Comparative Examples C1-5 and C2-1 and was further improved as compared to Comparative Example C1-1. In addition, in the non-aqueous electrolyte battery of Example C2-2, a prominent effect was exerted in that the residual capacity was improved as compared to Comparative Examples C1-5 and C2-2 and was further improved as compared to Comparative Example C1-1. Moreover, from Examples C2-1 to C2-3, it was shown that incorporation of $FSO_3Li$ and a prescribed amount of copper ions into an electrolyte solution exerts a prominent effect of improving the residual capacity of a non-aqueous electrolyte secondary battery, i.e. improving the charged storage characteristics of a non-aqueous electrolyte secondary battery under a high-temperature environment.

Examples C3-1 and C3-2, and Comparative Examples C3-1 to C3-5

[Production of Positive Electrode]

A positive electrode was produced in the same manner as in Example A3-1.

[Production of Negative Electrode]

A negative electrode was produced in the same manner as in Example A3-1.

[Preparation of Non-Aqueous Electrolyte Solutions]

The non-aqueous electrolyte solutions shown in Table 9 below were prepared in the same manner as in Example C1-1 and the like by adding $FSO_3Li$ to the respective $Cu(PF_6)_2$-containing non-aqueous electrolyte solutions or the reference electrolyte solution C1. It is noted here that Comparative Example C3-1 is the very reference electrolyte solution C1. In Table 9, "Content (% by mass)" and "Content (ppm by mass)" each indicate the content taking the amount of the reference electrolyte solution D1 as 100% by mass.

[Production of Non-Aqueous Electrolyte Secondary Batteries]

Laminate-type non-aqueous electrolyte secondary batteries were produced in the same manner as in Example C1-1, except that the thus obtained positive electrode, negative electrode, and respective non-aqueous electrolyte solutions were used.

<Evaluation of Non-Aqueous Electrolyte Secondary Batteries>

Initial conditioning and charged storage test were performed in the same manner as in Example C1-1. The residual capacity (one week) and the residual capacity (two weeks) were also determined in the same manner as in Example C1-1. Table 9 below shows the values of the residual capacity (one week) taking the residual capacity (one week) of Comparative Example C3-1 as 100, as well as the values of the residual capacity (two weeks) taking the residual capacity (two weeks) of Comparative Example C3-1 as 100.

TABLE 9

| | $FSO_3Li$ (% by mass) | Cu elements (ppm by mass) | residual capacity (one week) | residual capacity (two weeks) |
|---|---|---|---|---|
| Comparative Example C3-1 | 0 | 0 | 100 | 100 |
| Comparative Example C3-2 | 1 | 0 | 100.6 | 104.0 |
| Comparative Example C3-3 | 1 | 615 | 100.3 | — |
| Comparative Example C3-4 | 0 | 308 | 99.3 | 99.7 |
| Example C3-1 | 1 | 308 | 101.1 | 104.6 |
| Comparative Example C3-5 | 0 | 5 | 99.9 | 100.6 |
| Example C3-2 | 1 | 5 | 101.7 | 105.5 |

From Comparative Examples C3-1 and C3-4, it is seen that the non-aqueous electrolyte solution containing 308 ppm by mass of copper ions without $FSO_3Li$ caused a reduction in the residual capacity of the non-aqueous electrolyte secondary battery. In addition, it is seen from Comparative Example C3-5 that, when the non-aqueous electrolyte solution contained copper ions in a small amount of 5 ppm by mass without $FSO_3Li$, although the residual capacity ratio was reduced after the high-temperature storage performed at 60° C. for 168 hours, the residual capacity ratio was improved after the high-temperature storage performed at 60° C. for 336 hours. Further, from a comparison between Comparative Example C3-3 and Comparative Example C3-2, it is seen that, when the amount of copper ions contained in the non-aqueous electrolyte solution was outside a prescribed range, the effect of adding $FSO_3Li$ was impaired, and the residual capacity of the non-aqueous electrolyte battery was reduced. Moreover, from Examples C3-1 and C3-2 and Comparative Examples C3-1 to C3-5, it was shown that, by using a non-aqueous electrolyte solution containing $FSO_3Li$ and a prescribed amount of copper ions, the residual capacity after the 168-hour (one-week) high-temperature storage was increased as compared to a case where the non-aqueous electrolyte solution contained $FSO_3Li$ or cobalt ions alone, and that, from a comparison between the residual capacity after the 168-hour (one-week) high-temperature storage and the residual capacity after the 336-hour (two-week) high-temperature storage, deterioration of the respective non-aqueous electrolyte secondary batteries due to change over time was markedly inhibited. In other words, it was shown that the charged storage characteristics of a non-aqueous electrolyte secondary battery under a high-temperature environment are improved by incorporating $FSO_3Li$ and a prescribed amount of copper ions into a non-aqueous electrolyte solution of the battery.

The storage period of a battery is usually about 200 days for, for example, vehicle manufacturers. The difference between the residual capacity after one-week storage and the residual capacity after two-week storage increases with time; therefore, the effects of the present invention are considered to be more prominent as the storage period is extended.

Experiment D

One mode of the present invention will now be described more concretely by way of Examples and Reference Examples; however, the present invention is not restricted to the below-described Examples within the gist of the present invention.

Examples D1-1 and D1-2, and Comparative Examples D1-1 to D1-5

[Preparation of $Mn(PF_6)_2$-Containing EC Solution]

In an argon glove box, 0.10 g (0.8 mmol) of $MnCl_2$ was weighed in a 50-mL beaker and suspended in acetonitrile (AN). While stirring the resulting suspension, 0.402 g (1.6 mmol) of $AgPF_6$ was slowly added thereto in small fractions, followed by 3-hour stirring at room temperature. White solids of AgCl were generated with the progress of reaction. The resultant was left to stand overnight as is, and AgCl was subsequently removed by filtration, and the thus obtained filtrate was concentrated under reduced pressure using a rotary evaporator, whereby white solids of $[Mn(AN)_n](PF_6)_2$ (n=0 to 6) were obtained. To the thus obtained solids, 5.0 g (56.8 mmol) of ethylene carbonate (EC) melted at 45° C. was added to dissolve the solids, and the resulting solution was vacuumed at 35° C. for 6 hours to remove AN serving as a coordinating solvent, whereby a $Mn(PF_6)_2$-containing EC solution was obtained.

[Production of Positive Electrode]

A positive electrode was produced in the same manner as in Example A1-1.

[Production of Negative Electrode]

A negative electrode was produced in the same manner as in Example A1-1.

[Preparation of Non-Aqueous Electrolyte Solutions]

Under a dry argon atmosphere, the above-obtained $Mn(PF_6)_2$-containing EC solution was diluted with ethylene carbonate (EC), ethyl methyl carbonate (EMC), and dimethyl carbonate (DMC) such that the resulting mixed solvent had the respective manganese ion concentrations shown in Table 10 and the solvent composition had a mixture volume ratio (EC:EMC:DMC) of 3:4:3, and thoroughly dried $LiPF_6$ was dissolved therein at 1 mol/L (in terms of the concentration in the resulting non-aqueous electrolyte solutions). A non-aqueous electrolyte solution not containing $Mn(PF_6)_2$ is hereinafter referred to as "reference electrolyte solution D1". The non-aqueous electrolyte solutions shown in Table 10 below were prepared by adding $FSO_3Li$ to the above-obtained respective $Mn(PF_6)_2$-containing non-aqueous electrolyte solutions or the reference electrolyte solution D1. It is noted here that Comparative Example D1-1 is the very reference electrolyte solution D1. In Table 10, the content of $FSO_3Li$ indicates an added amount, and the content of manganese element (manganese ions) is a value determined based on the measurement results of the below-described inductively-coupled high-frequency plasma emission spectrometric analysis (ICP-AES). In Table 10, "Content (% by mass)" and "Content (ppm by mass)" each indicate the content taking the amount of the reference electrolyte solution D1 as 100% by mass.

<Measurement of Manganese Element Content in Non-Aqueous Electrolyte Solutions>

The thus obtained non-aqueous electrolyte solutions were each fractionated in an amount of 100 μL (about 130 mg). The thus fractionated non-aqueous electrolyte solution was weighed in a PTFE beaker, and an appropriate amount of concentrated nitric acid was added thereto to perform wet decomposition on a hot plate to a constant volume of 50 mL, after which the manganese element content was measured by a Li and acid concentration matching calibration curve method using an inductively-coupled high-frequency plasma emission spectrometer (ICP-AES, iCAP 7600duo manufactured by Thermo Fischer Scientific, Inc.).

[Production of Non-Aqueous Electrolyte Secondary Batteries]

Laminate-type non-aqueous electrolyte secondary batteries were produced in the same manner as in Example A1-1, except that the thus obtained non-aqueous electrolyte solutions were used.

<Evaluation of Non-Aqueous Electrolyte Secondary Batteries>

[Initial Conditioning]

Initial conditioning and charged storage test were performed in the same manner as in Example A1-1. The residual capacity was also determined in the same manner as in Example A1-1. Table 10 below shows the values of the residual capacity (one week), taking the residual capacity (one week) of Comparative Example D1-1 as 100.

Table 10 below also shows the values of the residual capacity, taking the residual capacity (two weeks) of Comparative Example D1-1 as 100.

TABLE 10

| | $FSO_3Li$ (% by mass) | Mn elements (ppm by mass) | residual capacity (one week) | residual capacity (two weeks) |
|---|---|---|---|---|
| Comparative Example D1-1 | 0 | 0 | 100 | 100 |
| Comparative Example D1-2 | 1 | 0 | 101.0 | 100.8 |
| Comparative Example D1-3 | 1 | 131 | 99.0 | — |
| Comparative Example D1-4 | 0 | 26 | 100 | 99.4 |
| Example D1-1 | 1 | 26 | 102.4 | 105.1 |
| Comparative Example D1-5 | 0 | 7 | 100.7 | 93.0 |
| Example D1-2 | 1 | 7 | 103.0 | 105.9 |

From a comparison between Comparative Example D1-1 and Comparative Example D1-2, it was shown that the residual capacity of the non-aqueous electrolyte solution secondary battery after the high-temperature storage was increased when the non-aqueous electrolyte solution contained $FSO_3Li$. On the other hand, from Comparative Examples D1-1 to D1-3, it was shown that the residual capacity after the high-temperature storage was reduced when the non-aqueous electrolyte solution contained manganese ions in excess of a prescribed amount even if the non-aqueous electrolyte solution contained $FSO_3Li$. Further, according to Comparative Example D1-4, when the non-aqueous electrolyte solution contained 26 ppm by mass of manganese ions without $FSO_3Li$, the residual capacity ratio after the 336-hour (two-week) high-temperature storage was reduced although the residual capacity after the high-temperature storage performed at 60° C. for 168 hours (one week); therefore, it is seen that the charged storage characteristics of a non-aqueous electrolyte secondary battery containing manganese ions tends to be deteriorated due to change over time. In addition, from a comparison between Comparative Example D1-1 and Comparative Example D1-5, it was shown that, when the non-aqueous electrolyte solution contained 7 ppm by mass of manganese ions without $FSO_3Li$, although the residual capacity after the high-temperature storage performed at 60° C. for 168 hours (one week) was improved, the residual capacity was markedly reduced after the 336-hour (two-week) high-temperature storage as compared to a case where the non-aqueous electrolyte solution contained no manganese ion. On the other hand, according to Examples D1-1 and D1-2, in those cases where each non-aqueous electrolyte solution contained $FSO_3Li$, a higher effect of improving the residual capacity after high-temperature storage was exerted even when the non-aqueous electrolyte solution contained manganese ions in the same amount as in Comparative Examples D1-4 and D1-5, as compared to when the non-aqueous electrolyte solution contained $FSO_3Li$ alone. In other words, it was shown that deterioration of a non-aqueous electrolyte secondary battery due to change over time is markedly inhibited and the charged storage characteristics of the non-aqueous electrolyte secondary battery under a high-temperature environment are improved by incorporating $FSO_3Li$ and a prescribed amount of manganese ions into a non-aqueous electrolyte solution of the battery.

Examples D2-1 to D2-3 and Comparative Examples D2-1 to D2-3

[Production of Positive Electrode]

A positive electrode was produced in the same manner as in Example D1-1.

[Production of Negative Electrode]

A negative electrode was produced in the same manner as in Example D1-1.

[Preparation of Non-Aqueous Electrolyte Solutions]

The non-aqueous electrolyte solutions shown in Table 11 below were prepared in the same manner as in Example D1-1 and the like by adding $FSO_3Li$ to the respective $Mn(PF_6)_2$-containing non-aqueous electrolyte solutions or the reference electrolyte solution D1.

[Production of Non-Aqueous Electrolyte Secondary Batteries]

Laminate-type non-aqueous electrolyte secondary batteries were produced in the same manner as in Example D1-1, except that the thus obtained non-aqueous electrolyte solutions were used.

<Evaluation of Non-Aqueous Electrolyte Secondary Batteries>

Initial conditioning and charged storage test were performed in the same manner as in Example D1-1. The residual capacity was also determined in the same manner as in Example D1-1. Table 11 below shows the values of the residual capacity (one week) of Examples D2-1 to D2-3 and Comparative Examples D2-1 to D2-3 along with the results of Comparative Examples D1-1 and D1-4, taking the residual capacity (one week) of Comparative Example D1-1 as 100.

TABLE 11

| | $FSO_3Li$ (% by mass) | Mn elements (ppm by mass) | residual capacity (one week) |
|---|---|---|---|
| Comparative Example D1-1 | 0 | 0 | 100 |
| Comparative Example D1-4 | 0 | 26 | 100 |
| Comparative Example D2-1 | 0.025 | 0 | 99.3 |
| Example D2-1 | 0.025 | 26 | 102.5 |
| Comparative Example D2-2 | 0.2 | 0 | 100.2 |
| Example D2-2 | 0.2 | 26 | 102.4 |
| Comparative Example D2-3 | 5 | 0 | 100.6 |
| Example D2-3 | 5 | 26 | 101.3 |

From a comparison between Comparative Example D1-1 and Comparative Example D1-4, it was shown that the residual capacity after the high-temperature storage performed at 60° C. for 168 hours (one week) was equivalent between a case where a non-aqueous electrolyte solution containing 26 ppm by mass of manganese ions without $FSO_3Li$ was used and a case where a non-aqueous electrolyte solution containing no manganese ion was used. Further, from Comparative Example D2-1, it was shown that, even when the non-aqueous electrolyte solution contained $FSO_3Li$, an excessively low $FSO_3Li$ content resulted in a reduction, rather than an increase, in the residual capacity of the non-aqueous electrolyte secondary battery. From these results, the non-aqueous electrolyte secondary battery of Example D2-1 is expected to have a lower residual capacity than the non-aqueous electrolyte secondary batteries of Comparative Examples D1-4 and D2-1. However, in Example D2-1, a prominent effect was exerted in that the residual capacity was improved as compared to Comparative Examples D1-4 and D2-1 and was further improved as compared to Comparative Example D1-1. Moreover, from a comparison between Example D2-2 and Comparative Example D2-2 as well as a comparison between Example D2-3 and Comparative Example D2-3, it was shown that incorporation of $FSO_3Li$ and a prescribed amount of manganese ions into a non-aqueous electrolyte solution exerts a prominent effect of improving the residual capacity of a non-aqueous electrolyte secondary battery after high-temperature storage, i.e. improving the charged storage characteristics of a non-aqueous electrolyte secondary battery under a high-temperature environment.

Examples D3-1 to D3-3 and Comparative Examples D3-1 to D3-6

[Production of Positive Electrode]

A positive electrode was produced in the same manner as in Example A3-1.

[Production of Negative Electrode]

A negative electrode was produced in the same manner as in Example A3-1.

[Preparation of Non-Aqueous Electrolyte Solutions]

The non-aqueous electrolyte solutions shown in Table 12 below were prepared in the same manner as in Example D1-1 and the like by adding $FSO_3Li$ to the respective $Mn(PF_6)_2$-containing non-aqueous electrolyte solutions or the reference electrolyte solution D1. It is noted here that Comparative Example D3-1 is the very reference electrolyte solution D1. In Table 12, "Content (% by mass)" and "Content (ppm by mass)" each indicate the content taking the amount of the reference electrolyte solution D1 as 100% by mass.

[Production of Non-Aqueous Electrolyte Secondary Batteries]

Laminate-type non-aqueous electrolyte secondary batteries were produced in the same manner as in Example D1-1, except that the above-described positive electrode, negative electrode, and respective non-aqueous electrolyte solutions were used.

<Evaluation of Non-Aqueous Electrolyte Secondary Batteries>

Initial conditioning and charged storage test were performed in the same manner as in Example D1-1. The residual capacity (one week) and the residual capacity (two weeks) were also determined in the same manner as in Example D1-1. Table 12 below shows the values of the residual capacity taking the residual capacity of Comparative Example D3-1 as 100, as well as the values of the residual capacity (two weeks) taking the residual capacity (two weeks) of Comparative Example D3-1 as 100.

TABLE 12

| | $FSO_3Li$ (% by mass) | Mn elements (ppm by mass) | residual capacity (one week) | residual capacity (two weeks) |
|---|---|---|---|---|
| Comparative Example D3-1 | 0 | 0 | 100 | 100 |
| Comparative Example D3-2 | 1 | 0 | 100.2 | 104.0 |
| Comparative Example D3-3 | 1 | 131 | 99.5 | — |
| Comparative Example D3-4 | 0 | 66 | 99.6 | 104.2 |
| Example D3-1 | 1 | 66 | 101.2 | 109.9 |
| Comparative Example D3-5 | 0 | 26 | 99.3 | 103.3 |
| Example D3-2 | 1 | 26 | 103.1 | 109.2 |
| Comparative Example D3-6 | 0 | 7 | 100.2 | — |
| Example D3-3 | 1 | 7 | 101.9 | — |

From a comparison between Comparative Example D3-1 and Comparative Example D3-2, it was shown that the charged storage characteristics of the non-aqueous electrolyte secondary battery after high-temperature storage were improved when the non-aqueous electrolyte solution of the battery contained $FSO_3Li$. On the other hand, from Comparative Examples D3-1 to D3-3 and Examples D3-1 to D3-3, it was shown that the residual capacity of each non-aqueous electrolyte secondary battery after high-temperature storage was reduced when the non-aqueous electrolyte solution of the battery contained manganese ions in excess of a prescribed amount even if the non-aqueous electrolyte solution contained $FSO_3Li$. Further, from Comparative Examples D3-1, D3-4 and D3-5, it is seen that the non-aqueous electrolyte solution containing 10 ppm by mass or more of manganese ions reduced the residual capacity of the non-aqueous electrolyte secondary battery after the 168-hour (one-week) high-temperature storage; however, it improved the residual capacity of the battery after the 336-hour (two-week) high-temperature storage as compared to a case where the non-aqueous electrolyte solution contained no manganese ion. Moreover, from Examples D3-1 to D3-3, it was shown that, by using a non-aqueous electrolyte solution containing $FSO_3Li$ and a prescribed amount of manganese ions, the residual capacity after the 168-hour (one week)high-temperature storage was increased as compared to a case where the non-aqueous electrolyte solution contained $FSO_3Li$ or manganese ions alone and, comparing the ratios of the residual capacity after the 168-hour (one-week) high-temperature storage and the residual capacity after the 336-hour (two-week) high-temperature storage, it was shown that deterioration of a non-aqueous electrolyte secondary battery due to change over time was markedly inhibited, and the charged storage characteristics of the non-aqueous electrolyte secondary battery under a high-temperature environment were thus improved.

The storage period of a battery is usually about 200 days for, for example, vehicle manufacturers. The difference between the residual capacity after one-week storage and the residual capacity after two-week storage increases with time; therefore, the effects of the present invention are considered to be more prominent as the storage period is extended.

Experiment E

One mode of the present invention will now be described more concretely by way of Examples and Reference Examples; however, the present mode is not restricted to the below-described Examples within the gist of the present invention.

Examples E1-1 to E1-7 and Comparative Examples E1-1 to E1-10

[Production of Positive Electrode]

A positive electrode was produced in the same manner as in Example A3-1.

[Production of Negative Electrode]

A negative electrode was produced in the same manner as in Example A3-1.

[Preparation of Non-Aqueous Electrolyte Solutions]

Under a dry argon atmosphere, tris(2,4-pentanedionato) aluminum ($Al(acac)_3$) or aluminum fluorosulfonate ($Al(FSO_3)_3$) was dissolved in ethylene carbonate (EC), ethyl methyl carbonate (EMC), and dimethyl carbonate (DMC) such that the resulting mixed solvent had the respective aluminum ion concentrations shown in Table 13 and the solvent composition had a volume ratio (EC:EMC:DMC) of 3:4:3, and thoroughly dried $LiPF_6$ was dissolved was further dissolved therein at 1 mol/L (12.3% by mass in terms of the concentration in the resulting non-aqueous electrolyte solutions). A non-aqueous electrolyte solution containing neither $Al(acac)_3$ nor $Al(FSO_3)_3$ is hereinafter referred to as "reference electrolyte solution E1". The non-aqueous electrolyte solutions of Examples E1-1 to E1-7 and Comparative Examples E1-2 and E1-3 shown in Table 13 below were prepared by adding $FSO_3Li$ to the above-obtained respective non-aqueous electrolyte solutions or the reference electrolyte solution E1. Comparative Example E1-1 is the very reference electrolyte solution E1. Further, $FSO_3Li$ was not added to the non-aqueous electrolyte solutions of Comparative Examples E1-4 to E1-10. In Table 13, the content of $FSO_3Li$ indicates an added amount, and the content of aluminum element (aluminum ions) is a value determined based on the measurement results of the below-described inductively-coupled high-frequency plasma emission spectrometric analysis (ICP-AES). In Table 13, "Content (% by mass)" and "Content (ppm by mass)" each indicate the content taking the amount of the reference electrolyte solution E1 as 100% by mass. $Al(FSO_3)_3$ was synthesized in accordance with the method described in Polyhedron, 1983, Volume 2, Issue 11, pages 1,209-1,210.

<Measurement of Aluminum Element Content in Non-Aqueous Electrolyte Solutions>

The thus obtained non-aqueous electrolyte solutions were each fractionated in an amount of 100 μL (about 130 mg). The thus fractionated non-aqueous electrolyte solution was weighed in a PTFE beaker, and an appropriate amount of concentrated nitric acid was added thereto to perform wet decomposition on a hot plate to a constant volume of 50 mL, after which the content of aluminum element (aluminum ions) was measured by a Li and acid concentration matching calibration curve method using an inductively-coupled high-frequency plasma emission spectrometer (ICP-AES, iCAP 7600duo manufactured by Thermo Fischer Scientific, Inc.).

[Production of Non-Aqueous Electrolyte Secondary Batteries]

Laminate-type non-aqueous electrolyte secondary batteries were produced in the same manner as in Example A1-1, except that the thus obtained non-aqueous electrolyte solutions were used.

<Evaluation of Non-Aqueous Electrolyte Secondary Batteries>

Initial conditioning and charged storage test were performed in the same manner as in Example A1-1. The residual capacity was also determined in the same manner as in Example A1-1. Table 13 below shows the values of the residual capacity (one week) of Examples E1-1 to E1-7 and Comparative Examples E1-1 to E1-10, taking the residual capacity (one week) of Comparative Example E1-1 as 100. Table 13 below also shows the values of the residual capacity (two weeks) of Examples E1-1 to E1-7 and Comparative Examples E1-1 to E1-10, taking the residual capacity (two weeks) of Comparative Example E1-1 as 100.

From a comparison between Comparative Example F1-1 and Comparative Example E1-2, it was shown that the battery residual capacity was increased when the electrolyte solution contained $FSO_3Li$. On the other hand, from Comparative Examples E1-1 to E1-3, it was shown that the residual capacity was reduced when the electrolyte solution contained aluminum ions in excess of a specific amount even if the electrolyte solution contained $FSO_3Li$. According to Examples E1-1 to E1-7, in those cases where each electrolyte solution contained $FSO_3Li$, a higher effect of improving the residual capacity was exerted even when the electrolyte solution contained aluminum ions in the same amount as in Comparative Examples E1-4 to E1-10, as compared to when the electrolyte solution contained $FSO_3Li$ alone (Comparative Example E1-2). Further, based on the values of the residual capacity after two-week storage, it was also shown that, by using an electrolyte solution containing specific amounts of aluminum ions along with $FSO_3Li$, deterioration of a non-aqueous electrolyte battery due to change over time is inhibited, i.e. the charged storage characteristics of a non-aqueous electrolyte secondary battery under a high-temperature environment are improved. From Examples E1-1 to E1-7, it was shown that, by using a non-aqueous electrolyte solution containing specific amounts of aluminum ions along with $FSO_3Li$, the charged storage characteristics of a non-aqueous electrolyte secondary battery under a high-temperature environment are improved, regardless of the type of a counter anion of the aluminum ions. The storage period of a battery is usually about 200 days for, for example, vehicle manufacturers. The difference between the residual capacity after one-week storage and the residual capacity after two-week storage increases with time; therefore, the effects of the present invention are considered to be more prominent as the storage period is extended.

Examples E2-1 to E2-3 and Comparative Examples E2-1 to E2-3

[Production of Positive Electrode]

A positive electrode was produced in the same manner as in Example E1-1.

TABLE 13

| | $FSO_3Li$ (% by mass) | Al complex | Al elements (ppm by mass) | residual capacity (one week) | residual capacity (two weeks) |
|---|---|---|---|---|---|
| Comparative Example E1-1 | 0 | — | 0 | 100 | 100 |
| Comparative Example E1-2 | 1.0 | — | 0 | 100.2 | 103.6 |
| Comparative Example E1-3 | 1.0 | $Al(acac)_3$ | 150 | 98.2 | 96.0 |
| Comparative Example E1-4 | 0 | $Al(acac)_3$ | 42 | 100.6 | 101.1 |
| Example E1-1 | 1.0 | $Al(acac)_3$ | 42 | 102.4 | 106.3 |
| Comparative Example E1-5 | 0 | $Al(acac)_3$ | 8 | 101.2 | 101.8 |
| Example E1-2 | 1.0 | $Al(acac)_3$ | 8 | 102.7 | 106.5 |
| Comparative Example E1-6 | 0 | $Al(acac)_3$ | 0.4 | 101.4 | 102.1 |
| Example E1-3 | 1.0 | $Al(acac)_3$ | 0.4 | 102.7 | 106.5 |
| Comparative Example E1-7 | 0 | $Al(FSO_3)_3$ | 19 | 99.8 | 101.9 |
| Example E1-4 | 1.0 | $Al(FSO_3)_3$ | 19 | 101.3 | 105.2 |
| Comparative Example E1-8 | 0 | $Al(FSO_3)_3$ | 10 | 100.3 | 102.2 |
| Example E1-5 | 1.0 | $Al(FSO_3)_3$ | 10 | 101.3 | 104.8 |
| Comparative Example E1-9 | 0 | $Al(FSO_3)_3$ | 4.8 | 99.8 | 100.8 |
| Example E1-6 | 1.0 | $Al(FSO_3)_3$ | 4.8 | 100.9 | 105.3 |
| Comparative Example E1-10 | 0 | $Al(FSO_3)_3$ | 0.5 | 99.5 | 101.0 |
| Example E1-7 | 1.0 | $Al(FSO_3)_3$ | 0.5 | 101.2 | 104.6 |

[Production of Negative Electrode]

A negative electrode was produced in the same manner as in Example E1-1.

[Preparation of Non-Aqueous Electrolyte Solutions]

The $Al(FSO_3)_3$-containing non-aqueous electrolyte solutions of Examples E2-1 to E2-3 were prepared in the same manner as in Example E1-4, expect that the $FSO_3Li$ content was changed as shown in Table 14 below. In addition, the non-aqueous electrolyte solutions of Comparative Examples E2-1 to E2-3 were prepared by adding $FSO_3Li$ to the reference electrolyte solution E1 as shown in Table 14 below.

[Production of Non-Aqueous Electrolyte Secondary Batteries]

Laminate-type non-aqueous electrolyte secondary batteries were produced in the same manner as in Example E1-4, except that the thus obtained non-aqueous electrolyte solutions were used.

<Evaluation of Non-Aqueous Electrolyte Secondary Batteries>

Initial conditioning and charged storage test were performed in the same manner as in Example E1-4. The residual capacity (one week) was also determined in the same manner as in Example E1-4. Table 14 below shows the values of the residual capacity (one week) of Examples E2-1 to E2-3 and Comparative Examples E2-1 to E2-3 along with the results of Comparative Examples E1-1 and E1-7, taking the residual capacity (one week) of Comparative Example E1-1 as 100.

TABLE 14

| | $FSO_3Li$ (% by mass) | Al elements (ppm by mass) | residual capacity (one week) |
|---|---|---|---|
| Comparative Example E1-1 | 0 | 0 | 100 |
| Comparative Example E1-7 | 0 | 19 | 99.8 |
| Comparative Example E2-1 | 0.025 | 0 | 99.3 |
| Example E2-1 | 0.025 | 19 | 100.4 |
| Comparative Example E2-2 | 0.2 | 0 | 99.2 |
| Example E2-2 | 0.2 | 19 | 101.0 |
| ComparativeExample E2-3 | 5.0 | 0 | 101.2 |
| Example E2-3 | 5.0 | 19 | 101.6 |

From a comparison between Comparative Example E1-1 and Comparative Example E1-7, it was shown that, as compared to the electrolyte solution containing no aluminum ion (Comparative Example E1-1), the electrolyte solution containing a specific amount of aluminum ions without $FSO_3Li$ (Comparative Example E1-7) caused a reduction in the residual capacity of the non-aqueous electrolyte battery. In addition, from Comparative Examples E2-1 and E2-2, it was shown that, even when the electrolyte solutions contained $FSO_3Li$, an excessively low $FSO_3Li$ content resulted in a reduction, rather than an increase, in the battery residual capacity. From these results, the battery of Example E2-1 is expected to have a lower residual capacity than the non-aqueous electrolyte secondary batteries of Comparative Examples E1-7 and E2-1. However, in Example E2-1, a prominent effect was exerted in that the residual capacity was improved as compared to Comparative Examples E1-7 and E2-1 and was further improved as compared to Comparative Example E1-1. Moreover, from a comparison between Example E2-2 and Comparative Example E2-2 as well as a comparison between Example E2-3 and Comparative Example E2-3, it was shown that incorporation of $FSO_3Li$ and a prescribed amount of aluminum ions into a non-aqueous electrolyte solution exerts a prominent effect of improving the residual capacity of a non-aqueous electrolyte secondary battery, i.e. improving the charged storage characteristics of a non-aqueous electrolyte secondary battery under a high-temperature environment.

Experiment F

One mode of the present invention will now be described more concretely by way of Examples and Reference Examples; however, the present invention is not restricted to the below-described Examples within the gist of the present invention.

Examples F1-1 to F1-17 and Comparative Examples F1-1 to F1-19

[Production of Positive Electrode]

A positive electrode was produced in the same manner as in Example A3-1.

[Production of Negative Electrode]

A negative electrode was produced in the same manner as in Example A3-1.

[Preparation of Non-Aqueous Electrolyte Solutions]

The metal ion-containing non-aqueous electrolyte solutions of Examples F1-1 to F1-17 were prepared in the same manner as in Example A3, except that the content of $FSO_3Li$ and that of the respective metal ions were changed as shown in Table 15 below. Similarly to the reference electrolyte solution A1, a reference electrolyte solution F1 is an electrolyte solution obtained by dissolving 1 mol/L of $LiPF_6$ (in terms of the concentration in the resulting non-aqueous electrolyte solution) into a mixture having a volume ratio (EC:EMC:DMC) of 3:4:3. Further, $FSO_3Li$ was added to this reference electrolyte solution F1 as shown in Table 15 below to prepare the non-aqueous electrolyte solution of Comparative Example F1-2. The non-aqueous electrolyte solutions of Comparative Examples F1-3 to F1-19 were prepared with an addition of specific metal ions but without an addition of $FSO_3Li$.

[Production of Non-Aqueous Electrolyte Secondary Batteries]

Laminate-type non-aqueous electrolyte secondary batteries were produced in the same manner as in Example A3-1, except that the thus obtained non-aqueous electrolyte solutions were used.

<Evaluation of Non-Aqueous Electrolyte Secondary Batteries>

Initial conditioning and charged storage test were performed in the same manner as in Example A3-1. The residual capacity (one week) was also determined in the same manner as in Example A3-1. The table below shows the values of the residual capacity (one week) of Examples F1-1 to F1-17 and Comparative Examples F1-1 to F1-19, taking the residual capacity (one week) of Comparative Example F1-1 as 100.

The table below also shows the values of the residual capacity (two weeks) of Examples F1-1 to F1-17 and Comparative Examples F1-1 to F1-19, taking the residual capacity (two weeks) of Comparative Example F1-1 as 100.

TABLE 15

| | $FSO_3Li$ (% by mass) | (a) Ni elements (ppm by mass) | (b) Co elements (ppm by mass) | (c) Cu elements (ppm by mass) | (d) Mn elements (ppm by mass) | (e) Al elements (ppm by mass) | (a) − (e) total (ppm by mass) | residual capacity (one week) | residual capacity (two weeks) |
|---|---|---|---|---|---|---|---|---|---|
| Comparative Example F1-1 | 0 | 0 | 0 | 0 | 0 | 0 | 0 | 100 | 100 |
| Comparative Example F1-2 | 1 | 0 | 0 | 0 | 0 | 0 | 0 | 100.2 | 103.6 |
| Comparative Example F1-3 | 0 | 55 | 24 | 0 | 0 | 0 | 79 | 99.9 | 99.6 |
| Example F1-1 | 1 | 55 | 24 | 0 | 0 | 0 | 79 | 101.4 | 104.5 |
| Comparative Example F1-4 | 0 | 55 | 0 | 75 | 0 | 0 | 130 | 100 | 99.7 |
| Example F1-2 | 1 | 55 | 0 | 75 | 0 | 0 | 130 | 100.8 | 103.2 |
| Comparative Example F1-5 | 0 | 22 | 0 | 30 | 0 | 0 | 52 | 99.8 | 100.1 |
| Example F1-3 | 1 | 22 | 0 | 30 | 0 | 0 | 52 | 101.6 | 104.2 |
| Comparative Example F1-6 | 0 | 48 | 0 | 0 | 3 | 0 | 51 | 100.1 | 99.9 |
| Example F1-4 | 1 | 48 | 0 | 0 | 3 | 0 | 51 | 101.4 | 104 |
| Comparative Example F1-7 | 0 | 0 | 48 | 90 | 0 | 0 | 138 | 99.5 | — |
| Example F1-5 | 1 | 0 | 48 | 90 | 0 | 0 | 138 | 100.9 | — |
| Comparative Example F1-8 | 0 | 0 | 24 | 45 | 0 | 0 | 69 | 99.7 | 99.4 |
| Example F1-6 | 1 | 0 | 24 | 45 | 0 | 0 | 69 | 101.4 | 103.6 |
| Comparative Example F1-9 | 0 | 0 | 24 | 0 | 3 | 0 | 27 | 100 | 99.6 |
| Example F1-7 | 1 | 0 | 24 | 0 | 3 | 0 | 27 | 101.2 | 103.8 |
| Comparative Example F1-10 | 0 | 0 | 0 | 45 | 3 | 0 | 48 | 100 | 99.1 |
| Example F1-8 | 1 | 0 | 0 | 45 | 3 | 0 | 48 | 101.2 | 103.6 |
| Comparative Example F1-11 | 0 | 36 | 16 | 45 | 0 | 0 | 97 | 100.1 | 99.6 |
| Example F1-9 | 1 | 36 | 16 | 45 | 0 | 0 | 97 | 101.3 | 103.8 |
| Comparative Example F1-12 | 0 | 36 | 16 | 0 | 2 | 0 | 54 | 99.7 | 99.3 |
| Example F1-10 | 1 | 36 | 16 | 0 | 2 | 0 | 54 | 101.6 | 104.2 |
| Comparative Example F1-13 | 0 | 11 | 0 | 15 | 2 | 0 | 28 | 100.3 | 100.6 |
| Example F1-11 | 1 | 11 | 0 | 15 | 2 | 0 | 28 | 101.7 | 104.7 |
| Comparative Example F1-14 | 0 | 0 | 34 | 63 | 5 | 0 | 102 | 99.9 | — |
| Example F1-12 | 1 | 0 | 34 | 63 | 5 | 0 | 102 | 100.9 | — |
| Comparative Example F1-15 | 0 | 0 | 16 | 30 | 2 | 0 | 48 | 100 | 99.3 |
| Example F1-13 | I | 0 | 16 | 30 | 2 | 0 | 48 | 101.3 | 103.5 |
| Comparative Example F1-16 | 0 | 11 | 5 | 15 | 1 | 0 | 32 | 99.9 | 99.5 |
| Example F1-14 | 1 | 11 | 5 | 15 | 1 | 0 | 32 | 101.6 | 104.6 |
| Comparative Example F1-17 | 0 | 11 | 5 | 0 | 0 | 10 | 26 | 100.2 | 100.2 |
| Example F1-15 | 1 | 11 | 5 | 0 | 0 | 10 | 26 | 101.1 | 102.7 |
| Comparative Example F1-18 | 0 | 11 | 5 | 15 | 0 | 10 | 41 | 100.1 | 100.4 |
| Example F1-16 | 1 | 11 | 5 | 15 | 0 | 10 | 41 | 101 | 102.7 |
| Comparative Example F1-19 | 0 | 11 | 5 | 15 | 1 | 10 | 42 | 100.3 | 100.7 |
| Example F1-17 | 1 | 11 | 5 | 15 | 1 | 10 | 42 | 101.3 | 102.8 |

In Comparative Examples F1-3 to F1-19, an electrolyte solution containing specific metal ions without $FSO_3Li$ was used. In Comparative Examples F1-3, F1-5, F1-7, F1-8, F1-12, F1-14, and F1-16, the residual capacity of each battery tended to be reduced as compared to Comparative Example F1-1 where the electrolyte solution contained neither a specific metal ion nor $FSO_3Li$. Further, in Comparative Examples F1-4, F1-9, F1-10, and F1-15, although the residual capacity after one week was equivalent to that of Comparative Example F1-1, the residual capacity after two weeks was reduced. In Comparative Examples F1-6, F1-11, F1-13, F1-17, F1-18, and F1-19, the residual capacity after one week was increased as compared to Comparative Example F1-1; however, the residual capacity after two weeks was lower than that of Comparative Example F1-1. From these results, it is seen that the use of a non-aqueous electrolyte solution containing plural kinds of specific metal ions does not necessarily improve the residual capacity of a battery, and that the residual capacity is rather often deteriorated due to change over time.

On the other hand, according to Examples F1-1 to F1-17, in those cases where each electrolyte solution contained both specific metal ions and $FSO_3Li$, a higher effect of improving the residual capacity was exerted even when the electrolyte solution contained the metal ions in the same amount as in Comparative Examples F1-3 to F1-19, as compared to when the electrolyte solution contained $FSO_3Li$ alone (Comparative Example F1-2). Further, based on the values of the residual capacity after two-week storage, it was also shown that, by using an electrolyte solution containing specific amounts of metal ions along with $FSO_3Li$, deterioration of a non-aqueous electrolyte battery due to change over time is inhibited, i.e. the charged storage characteristics of a non-aqueous electrolyte secondary battery under a high-temperature environment are improved. The storage period of a battery is usually about 200 days for, for example, vehicle manufacturers. The difference between the residual capacity after one-week storage and the residual capacity after two-week storage increases with time; therefore, the effects of the present invention are considered to be more prominent as the storage period is extended.

This application is based on a Japanese patent application filed on Jun. 4, 2019 (Japanese Patent Application No. 2019-104306), a Japanese patent application filed on Jun. 26, 2019 (Japanese Patent Application No. 2019-118148), a Japanese patent application filed on Jun. 26, 2019 (Japanese Patent Application No. 2019-118074), a Japanese patent application filed on Jun. 26, 2019 (Japanese Patent Application No. 2019-118145), and a Japanese patent application filed on Apr. 15, 2020 (Japanese Patent Application No. 2020-073075), the entirety of which is hereby incorporated by reference.

INDUSTRIAL APPLICABILITY

The present invention is useful since it can realize a non-aqueous electrolyte battery which has excellent charged storage characteristics under a high-temperature environment.

Further, the non-aqueous electrolyte solution and the non-aqueous electrolyte battery according to the present invention can be used in a variety of known applications where a non-aqueous electrolyte solution or a non-aqueous electrolyte battery is used. Specific examples of such applications include laptop computers, stylus computers, portable computers, electronic book players, mobile phones, portable fax machines, portable copiers, portable printers, headphone stereos, video cameras, liquid crystal TVs, handy cleaners, portable CD players, mini-disc players, transceivers, electronic organizers, calculators, memory cards, portable tape recorders, radios, back-up power supplies, motors, motorcycles, motor-assisted bikes, bicycles, lighting equipment, toys, gaming machines, watches, power tools, strobe lights, cameras, household backup power sources, backup power sources for commercial use, load leveling power sources, power sources for storing natural energy, and lithium ion capacitors.

While the invention has been described in detail and with reference to specific embodiments thereof, it will be apparent to one skilled in the art that various changes and modifications can be made therein without departing from the spirit and scope thereof.

The invention claimed is:

1. A non-aqueous electrolyte solution, comprising:

$FSO_3Li$; and at least one metal ion selected from the group consisting of 1-500 ppm by mass of nickel ions, 1-100 ppm by mass of manganese ions, and 1-100 ppm by mass of aluminum ions.

2. The non-aqueous electrolyte solution according to claim 1, wherein the at least one metal ion includes the nickel ions.

3. The non-aqueous electrolyte solution according to claim 2, wherein the at least one metal ion includes the nickel ions in an amount of 40% by mass or more with respect to a total amount of the at least one metal ion.

4. The non-aqueous electrolyte solution according to claim 3, wherein a total concentration of the at least one metal ion is in a range of 1 ppm by mass to 120 ppm by mass.

5. The non-aqueous electrolyte solution according to claim 1, wherein the content of $FSO_3Li$ is in a range of 0.001% by mass to 10.0% by mass.

6. A non-aqueous electrolyte battery, comprising:

a positive electrode and a negative electrode which are capable of occluding and releasing metal ions; and a non-aqueous electrolyte solution, wherein the non-aqueous electrolyte solution comprises $FSO_3Li$ and at least one metal ion selected from the group consisting of 1-500 ppm by mass of nickel ions, 1-100 ppm by mass of manganese ions, and 1-100 ppm by mass of aluminum ions.

7. The non-aqueous electrolyte battery according to claim 6, wherein:

the positive electrode comprises a current collector and a positive electrode active material layer arranged on the current collector; and the positive electrode active material is a metal oxide of composition formula (1), $Li_{a1}Ni_{b1}CO_{c1}Ma_1O_2$(1), where $0.90 \leq a1 \leq 1.10$, $0<b1<0.4$, $b1+c1+d1=1$, and M is at least one element selected from the group consisting of Mn, Al, Mg, Zr, Fe, Ti, and Er.

8. The non-aqueous electrolyte battery according to claim 6, wherein:

the positive electrode comprises a current collector and a positive electrode active material layer arranged on the current collector, and the positive electrode active material is a metal oxide of composition formula (2), $Li_{a2}Ni_{b2}Co_{c2}Ma_2O_2$(2), where $0.90 \leq a2 \leq 1.10$, $0.4 \leq b2<1.0$, $b2+c2+d2=1$, and M is at least one element selected from the group consisting of Mn, Al, Mg, Zr, Fe, Ti, and Er.

9. The non-aqueous electrolyte battery according to claim 6, wherein:

the positive electrode is an NMC positive electrode, and the NMC positive electrode comprises a nickel element in an amount of not less than 40% by mole.

10. A non-aqueous electrolyte solution, comprising:

$FSO_3Li$; and at least one metal ion selected from the group consisting of 1-100 ppm by mass of manganese ions and 1-100 ppm by mass of aluminum ions.

11. The non-aqueous electrolyte solution according to claim 1, wherein the at least one metal ion includes at least the manganese ions.

12. The non-aqueous electrolyte solution according to claim 1, wherein the at least one metal ion includes at least the aluminum ions.

* * * * *